United States Patent
Isojima et al.

(10) Patent No.: US 12,132,171 B2
(45) Date of Patent: Oct. 29, 2024

(54) INORGANIC SOLID ELECTROLYTE-CONTAINING COMPOSITION, SHEET FOR ALL-SOLID STATE SECONDARY BATTERY, ELECTRODE SHEET FOR ALL-SOLID STATE SECONDARY BATTERY, AND ALL-SOLID STATE SECONDARY BATTERY, AND MANUFACTURING METHODS FOR SHEET FOR ALL-SOLID STATE SECONDARY BATTERY AND ALL-SOLID STATE SECONDARY BATTERY

(71) Applicant: FUJIFILM Corporation, Tokyo (JP)

(72) Inventors: Hiroshi Isojima, Kanagawa (JP); Hideyuki Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 518 days.

(21) Appl. No.: 17/572,543

(22) Filed: Jan. 10, 2022

(65) Prior Publication Data

US 2022/0140395 A1    May 5, 2022

Related U.S. Application Data

(63) Continuation of application No. PCT/JP2020/024291, filed on Jun. 22, 2020.

(30) Foreign Application Priority Data

Jul. 19, 2019    (JP) .................. 2019-133417

(51) Int. Cl.
H01M 10/0568    (2010.01)
H01M 4/62    (2006.01)
(Continued)

(52) U.S. Cl.
CPC ......... *H01M 10/0568* (2013.01); *H01M 4/62* (2013.01); *H01M 10/0525* (2013.01);
(Continued)

(58) Field of Classification Search
CPC ......... H01M 10/0525; H01M 10/0562; H01M 10/0568; H01M 10/0569; H01M 10/0585;
(Continued)

(56) References Cited

U.S. PATENT DOCUMENTS

| | | | |
|---|---|---|---|
| 2009/0081553 | A1 | 3/2009 | Kondo et al. |
| 2017/0352917 | A1 | 12/2017 | Makino et al. |
| 2020/0235426 | A1 | 7/2020 | Kushida et al. |

FOREIGN PATENT DOCUMENTS

| | | |
|---|---|---|
| JP | 5354205 | 11/2013 |
| JP | 6262503 | 1/2018 |

(Continued)

OTHER PUBLICATIONS

"International Search Report (Form PCT/ISA/210) of PCT/JP2020/024291," mailed on Sep. 8, 2020, with English translation thereof, pp. 1-5.
(Continued)

*Primary Examiner* — Victoria H Lynch
(74) *Attorney, Agent, or Firm* — JCIPRNET

(57) ABSTRACT

An inorganic solid electrolyte-containing composition is a composition containing an inorganic solid electrolyte, a binder, and an organic solvent, where the composition contains, as the binder, at least two kinds of binder A and binder B which differ in adsorption rate with respect to the inorganic solid electrolyte, and an adsorption rate of the inorganic solid electrolyte-containing composition is 15% or more, and an adsorption rate of the binder B is less than 10%.

22 Claims, 1 Drawing Sheet

(51) Int. Cl.
   *H01M 10/0525* (2010.01)
   *H01M 10/0569* (2010.01)
   *H01M 10/0585* (2010.01)

(52) U.S. Cl.
   CPC ... *H01M 10/0569* (2013.01); *H01M 10/0585* (2013.01); *H01M 2300/0037* (2013.01)

(58) Field of Classification Search
   CPC ....... H01M 10/4235; H01M 2004/027; H01M 2004/028; H01M 2300/0037; H01M 4/13; H01M 4/139; H01M 4/386; H01M 4/387; H01M 4/525; H01M 4/62; Y02E 60/10; Y02P 70/50
   See application file for complete search history.

(56) References Cited

FOREIGN PATENT DOCUMENTS

| | | |
|---|---|---|
| WO | 2012063827 | 5/2012 |
| WO | 2016136089 | 9/2016 |
| WO | 2019097903 | 5/2019 |

OTHER PUBLICATIONS

"Written Opinion of the International Searching Authority (Form PCT/ISA/237)" of PCT/ JP2020/024291, mailed on Sep. 8, 2020, with English translation thereof, pp. 1-6.
"Search Report of Europe Counterpart Application", issued on Nov. 28, 2022, p. 1-p. 7.

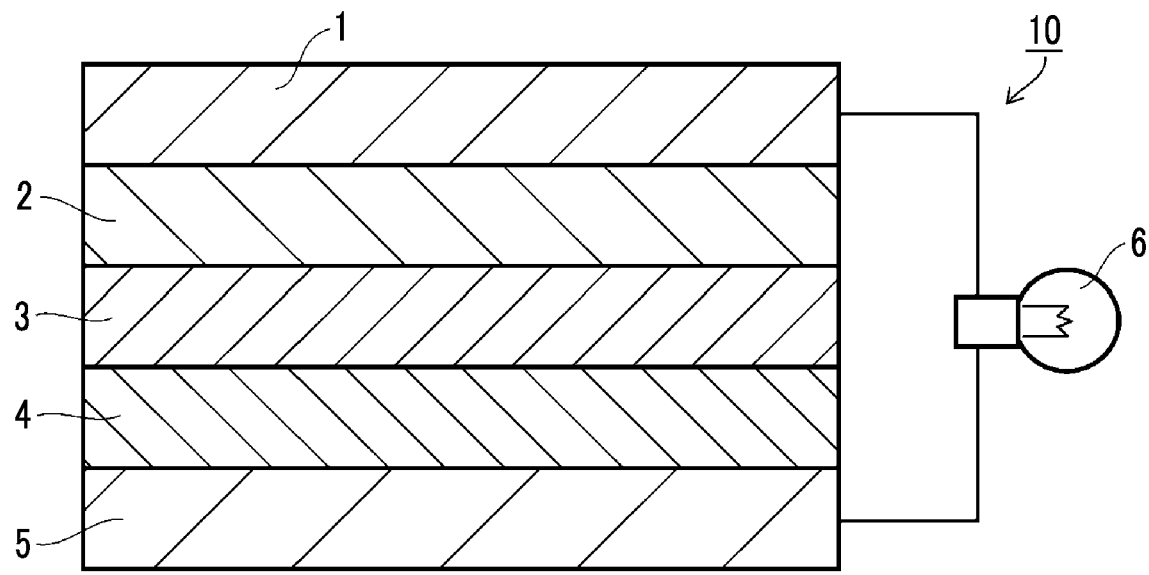

INORGANIC SOLID ELECTROLYTE-CONTAINING COMPOSITION, SHEET FOR ALL-SOLID STATE SECONDARY BATTERY, ELECTRODE SHEET FOR ALL-SOLID STATE SECONDARY BATTERY, AND ALL-SOLID STATE SECONDARY BATTERY, AND MANUFACTURING METHODS FOR SHEET FOR ALL-SOLID STATE SECONDARY BATTERY AND ALL-SOLID STATE SECONDARY BATTERY

CROSS-REFERENCE TO RELATED APPLICATIONS

This application is a Continuation of PCT International Application No. PCT/JP2020/024291 filed on Jun. 22, 2020, which claims priority under 35 U.S.C § 119(a) to Japanese Patent Application No. 2019-133417 filed on Jul. 19, 2019. Each of the above application(s) is hereby expressly incorporated by reference, in its entirety, into the present application.

BACKGROUND OF THE INVENTION

1. Field of the Invention

The present invention relates to an inorganic solid electrolyte-containing composition, a sheet for an all-solid state secondary battery, an electrode sheet for an all-solid state secondary battery, and an all-solid state secondary battery, and manufacturing methods for a sheet for an all-solid state secondary battery and an all-solid state secondary battery.

2. Description of the Related Art

In an all-solid state secondary battery, all of a negative electrode, an electrolyte, and a positive electrode consist of solid, and the all-solid state secondary can improve safety and reliability, which are said to be problems to be solved in a battery in which an organic electrolytic solution is used. It is also said to be capable of extending the battery life. Furthermore, all-solid state secondary batteries can be provided with a structure in which the electrodes and the electrolyte are directly disposed in series. As a result, it becomes possible to increase the energy density to be high as compared with a secondary battery in which an organic electrolytic solution is used, and thus the application to electric vehicles, large-sized storage batteries, and the like is anticipated.

In such an all-solid state secondary battery, it has been proposed to form any layer of the constitutional layers (an inorganic solid electrolyte layer, a negative electrode active material layer, and a positive electrode active material layer) with a material (constitutional layer forming material) containing an inorganic solid electrolyte or an active material and containing a binder (a binding agent). For example, JP6262503B discloses a solid electrolyte mixed solution containing a solid electrolyte, a first binding agent insoluble in a non-polar solvent, and a second binding agent soluble in a non-polar solvent, in which an SP value of the first binding agent is different from that of the second binding agent. In addition, JP5354205B discloses an electrode composition containing an electrode active material, a conductive agent, a binding agent (the solubility parameter is less than 12 $(cal/cm^3)^{1/2}$), and a polymeric substance having a solubility parameter of 12 to 17 $(cal/cm^3)^{1/2}$.

SUMMARY OF THE INVENTION

In a case of forming a constitutional layer of an all-solid state secondary battery with solid particles (an inorganic solid electrolyte, an active material, conductive auxiliary agent, and the like), it is desirable that the constitutional layer forming material exhibits excellent dispersibility by dispersing the solid particles in an organic solvent or the like. However, in general, even in a case where the constitutional layer forming material exhibits excellent dispersibility immediately after preparation, the reaggregation or sedimentation of the solid particles gradually progresses due to the chronological reason, whereby the dispersibility tends to decrease. In particular, in terms of further sophistication of the required characteristics of the all-solid state secondary battery and furthermore, the flexibility of manufacturing conditions and the like, the constitutional layer forming material is demanded to exhibit high dispersion stability by not only improving the initial dispersibility of the constitutional layer forming material but also suppressing the chronological decrease in dispersibility. In such a situation, the constitutional layer forming material in the related art has not been sufficient not only in initial dispersibility but also in dispersion stability, and there is room for improvement.

An object of the present invention is to provide an inorganic solid electrolyte-containing composition excellent in initial dispersibility and dispersion stability. In addition, another object of the present invention is to provide a sheet for an all-solid state secondary battery, an electrode sheet for an all-solid state secondary battery, and an all-solid state secondary battery, and manufacturing methods for a sheet for an all-solid state secondary battery and an all-solid state secondary battery, in which the above inorganic solid electrolyte-containing composition is used.

The inventors of the present invention repeated various studies on the constitutional layer forming materials, focusing on the adsorptivity between the inorganic solid electrolyte which is a dispersoid and the binder and, as a result, found that in a case where two kinds of binders, in which adsorption rates with respect to an inorganic solid electrolyte are set to specific values different from each other and the difference between the adsorption rates is at least 5%, are used in combination with an inorganic solid electrolyte and an organic solvent, it is possible to prepare an inorganic solid electrolyte-containing composition (which is excellent in initial dispersibility) with which it is possible to not only disperse the inorganic solid electrolyte in the organic solvent at a high level but also suppress the reaggregation or sedimentation of the inorganic solid electrolyte (which is excellent in dispersion stability) due to the chronological reason, whereby it is possible to maintain a high level of dispersibility. Furthermore, the inventors of the present invention have found that this inorganic solid electrolyte-containing composition can be suitably used as a constitutional layer forming material of an all-solid state secondary battery or the like since it exhibits excellent initial dispersibility and excellent dispersion stability. The present invention has been completed through further studies based on these findings.

That is, the above problems have been solved by the following means.

<1> An inorganic solid electrolyte-containing composition comprising an inorganic solid electrolyte having an ion conductivity of a metal belonging to Group 1 or Group 2 in the periodic table; a binder; and an organic solvent, in which the binder contains at least two kinds of binder A and binder B which differ in adsorption rate with respect to the inorganic solid electrolyte, and an adsorption rate of the binder A is 15% or more, and an adsorption rate of the binder B is less than 10%.

<2> The inorganic solid electrolyte-containing composition according to <1>, in which the adsorption rate of the binder A is 50% or more, and the adsorption rate of the binder B is less than 5%.

<3> The inorganic solid electrolyte-containing composition according to <1> or <2>, in which at least one of the binder A or the binder B is particulate.

<4> The inorganic solid electrolyte-containing composition according to any one of <1> to <3>, in which the binder A is particulate.

<5> The inorganic solid electrolyte-containing composition according to any one of <1> to <4>, in which a solubility of the binder A in a non-polar solvent is 1% by mass or less.

<6> The inorganic solid electrolyte-containing composition according to any one of <1> to <5>, in which a solubility of the binder B in a non-polar solvent is 2% by mass or more.

<7> The inorganic solid electrolyte-containing composition according to any one of <1> to <6>, in which a content of the binder A in the inorganic solid electrolyte-containing composition is higher than a content of the binder B in the inorganic solid electrolyte-containing composition.

<8> The inorganic solid electrolyte-containing composition according to any one of <1> to <7>, in which a polymer that forms the binder B is a fluorine-based polymer, a hydrocarbon-based polymer, polyurethane, or a (meth) acrylic polymer.

<9> The inorganic solid electrolyte-containing composition according to any one of <1> to <8>, in which a polymer that forms the binder A is polyurethane or a (meth)acrylic polymer.

<10> The inorganic solid electrolyte-containing composition according to any one of <1> to <9>, in which the organic solvent contains at least two kinds of organic solvents.

<11> The inorganic solid electrolyte-containing composition according to any one of <1> to <10>, in which the organic solvent contains at least one kind of organic solvent having a C log P value of 1.5 or more and less than 3.

<12> The inorganic solid electrolyte-containing composition according to any one of <1> to <11>, in which the organic solvent contains an organic solvent having a C log P value of 3 or more and less than 6, and an organic solvent having a C log P value of 1.5 or more and less than 3.

<13> The inorganic solid electrolyte-containing composition according to any one of <1> to <12>, in which at least one of the organic solvents contains at least one selected from an ester compound, a ketone compound, or an ether compound.

<14> The inorganic solid electrolyte-containing composition according to any one of <1> to <13>, in which a viscosity difference $\eta\alpha-\eta\beta$ between a slurry viscosity $\eta\alpha$ at a shear rate of 10/s and a slurry viscosity $\eta\beta$ at a shear rate of 200/s is 400 mPa·s or more.

<15> The inorganic solid electrolyte-containing composition according to any one of <1> to <14>, further comprising an active material.

<16> The inorganic solid electrolyte-containing composition according to <15>, in which an adsorption rate of the binder A with respect to the active material is 10% or more.

<17> The inorganic solid electrolyte-containing composition according to <15> or <16>, in which a peel strength of the binder B with respect to a collector is 0.1 N/mm or more.

<18> A sheet for an all-solid state secondary battery, comprising a layer formed of the inorganic solid electrolyte-containing composition according to any one of <1> to <17>.

<19> An electrode sheet for an all-solid state secondary battery, comprising an active material layer formed of the inorganic solid electrolyte-containing composition according to any one of <15> to <17>.

<20> An all-solid state secondary battery comprising, in the following order, a positive electrode active material layer; a solid electrolyte layer; and a negative electrode active material layer, in which at least one of the positive electrode active material layer, the solid electrolyte layer, or the negative electrode active material layer is a layer formed of the inorganic solid electrolyte-containing composition according to any one of <1> to <17>.

<21> A manufacturing method for a sheet for an all-solid state secondary battery, the manufacturing method comprising subjecting the inorganic solid electrolyte-containing composition according to any one of <1> to <17> to film formation.

<22> A manufacturing method for an all-solid state secondary battery, comprising manufacturing method for a sheet for an all-solid state secondary battery according to <21>.

According to the present invention, it is possible to provide an inorganic solid electrolyte-containing composition that is excellent in initial dispersibility and dispersion stability and can be suitably used as a constitutional layer forming material of an all-solid state secondary battery or the like. In addition, according to the present invention, it is possible to provide a sheet for an all-solid state secondary battery, an electrode sheet for an all-solid state secondary battery, and an all-solid state secondary battery, which have a layer formed of the above inorganic solid electrolyte-containing composition. Further, according to the present invention, it is possible to provide respective manufacturing methods for a sheet for an all-solid state secondary battery and an all-solid state secondary battery, in which the above inorganic solid electrolyte-containing composition is used.

BRIEF DESCRIPTION OF THE DRAWINGS

FIG. 1 is a vertical cross-sectional view schematically illustrating an all-solid state secondary battery according to a preferred embodiment of the present invention.

DESCRIPTION OF THE PREFERRED EMBODIMENTS

In the present specification, numerical ranges expressed using "to" include numerical values before and after the "to" as the lower limit value and the upper limit value.

In the present specification, the expression of a compound (for example, in a case where a compound is represented by an expression with "compound" added to the end) refers to not only the compound itself but also a salt or an ion thereof. In addition, this expression also refers to a derivative obtained by modifying a part of the compound, for example, by introducing a substituent into the compound within a range where the effects of the present invention are not impaired.

In the present invention, (meth)acryl means one or both of acryl and methacryl. The same applies to (meth)acrylate.

A substituent, a linking group, or the like (hereinafter, referred to as "substituent or the like") is not specified in the present specification regarding whether to be substituted or unsubstituted may have an appropriate substituent. Accordingly, even in a case where a YYY group is simply described in the present specification, this YYY group includes not only an aspect having a substituent but also an aspect not having a substituent. The same shall be applied to a compound that is not specified in the present specification regarding whether to be substituted or unsubstituted. Examples of the preferred examples of the substituent include a substituent Z described below.

In the present specification, in a case where a plurality of substituents or the like represented by a specific reference numeral are present or a plurality of substituents or the like are simultaneously or alternatively defined, the respective substituents or the like may be the same or different from each other. In addition, unless specified otherwise, in a case where a plurality of substituents or the like are adjacent to each other, the substituents may be linked or fused to each other to form a ring.

[Inorganic Solid Electrolyte-Containing Composition]

The inorganic solid electrolyte-containing composition according to the embodiment of the present invention contains an inorganic solid electrolyte having an ion conductivity of a metal belonging to Group 1 or Group 2 in the periodic table; a binder; and an organic solvent.

The inorganic solid electrolyte-containing composition according to the embodiment of the present invention contains, as a binder, at least two kinds of binder A and binder B which differ in adsorption rate with respect to the inorganic solid electrolyte containing the above composition. The binder A and the binder B each have a specific adsorption rate, which will be described later, and the difference in adsorption rate between both binders is at least 5%.

The binder contained in the inorganic solid electrolyte-containing composition according to the embodiment of the present invention has a function of binding solid particles to each other (for example, binding inorganic solid electrolytes to each other, binding an inorganic solid electrolyte to an active material, or binding active materials to each other), such as an inorganic solid electrolyte (additionally, an active material, a conductive auxiliary agent, or the like, which can be present together) in the inorganic solid electrolyte-containing composition and furthermore, stably dispersing the bound particles in an organic solvent. In addition, the binder contained in the inorganic solid electrolyte-containing composition according to the embodiment of the present invention binds solid particles to each other at least in the solid electrolyte layer formed of the inorganic solid electrolyte-containing composition and furthermore, functions as a binding agent that binds a collector to the solid particle.

In the inorganic solid electrolyte-containing composition according to the embodiment of the present invention, it is possible to disperse solid particles in an organic solvent at a high level, and thus the dispersibility (the initial dispersibility) immediately after preparation (for example, 24 hours after preparation) is high. Moreover, it is possible to suppress the reaggregation or sedimentation of solid particles due to the chronological reason, and thus it is possible to maintain the high initial dispersibility over a long period of time.

Although the details of the reason for the above are not yet clear, they are conceived to be as follows. That is, in a case where the binder A that exhibits a high adsorption rate and the binder B that exhibits low adsorption rate are used in a combination in which the difference in adsorption rate is at least 5%, it is possible to differentially impart the improvement of binding property and the improvement of dispersibility of the solid particles in the organic solvent to the respective binders. As a result, it is possible to suppress the excessive (re)aggregation and the precipitation of the solid particles not only immediately after preparation but also chronologically. It is conceived that this makes it possible to achieve both the initial dispersibility and the dispersion stability of the inorganic solid electrolyte-containing composition. In addition, it is also possible to firmly bind solid particles in a case where the inorganic solid electrolyte-containing composition according to the embodiment of the present invention is used for forming a constitutional layer. Moreover, in a case where an active material layer is formed of this inorganic solid electrolyte-containing composition, it is also possible to firmly bind solid particles to a collector in addition to the binding of the solid particles to each other. Due to the improvement of initial dispersibility and dispersion stability of the inorganic solid electrolyte-containing composition and furthermore, the enhancement of the binding property of the solid particles or the like, as described above, an all-solid state secondary battery having a constitutional layer that is formed using the inorganic solid electrolyte-containing composition according to the embodiment of the present invention exhibits excellent battery performance (cycle characteristics).

The inorganic solid electrolyte-containing composition according to the embodiment of the present invention is preferably a slurry in which the inorganic solid electrolyte is dispersed in an organic solvent. In this inorganic solid electrolyte-containing composition (the slurry), a viscosity difference $\eta\alpha-\eta\beta$ between a slurry viscosity $\eta\alpha$ at a shear rate of 10/s and a slurry viscosity $\eta\beta$ at a shear rate of 200/s is preferably 400 mPa·s or more.

In the present invention, the slurry viscosity $\eta\alpha$ is used as an indicator that indicates the difficulty of reaggregation or sedimentation of solid particles in a case where the inorganic solid electrolyte-containing composition is in a high viscosity state, and the slurry viscosity $\eta\beta$ is used as an indicator that indicates the ease of maintenance of the (dispersion) uniformity of the inorganic solid electrolyte-containing composition in a case where the inorganic solid electrolyte-containing composition is subjected to film formation (particularly coating). The slurry viscosities $\eta\alpha$ and $\eta\beta$ are values calculated according to the method described in Examples.

In a case where this inorganic solid electrolyte-containing composition exhibits a viscosity difference in the above range, it is possible to further increase the dispersibility in a high viscosity state and the dispersibility during film formation, and thus it is possible to impart excellent battery performance to an all-solid state secondary battery or the like.

The viscosity difference $\eta\alpha-\eta\beta$ is preferably 500 mPa·s or more, more preferably 700 mPa·s or more, and still more preferably 800 mPa·s or more in terms of the further improvement of the initial dispersibility and the dispersion stability. The upper limit of the viscosity difference $\eta\alpha-\eta\beta$ is not particularly limited; however, it is preferably 100,000 mPa·s or less, and more preferably 2,000 mPa·s or less, in terms of the suppression of uneven film formation.

The slurry viscosity ηα and the slurry viscosity ηβ are each appropriately set within a range that satisfies the above-described viscosity difference ηα–ηβ and are not particularly limited. For example, the slurry viscosity ηα is preferably 600 to 20,000 mPa·s and more preferably 800 to 2,500 mPa·s. The slurry viscosity ηβ is preferably 100 to 3,000 mPa·s and more preferably 200 to 1,000 mPa·s.

The slurry viscosity can be appropriately set by changing or adjusting the solid content concentration of the inorganic solid electrolyte-containing composition, the kind or content of the solid particle or the binder, the kind of the organic solvent, and the like, and furthermore, the dispersion conditions and the like.

The inorganic solid electrolyte-containing composition according to the embodiment of the present invention is preferably used a material (a constitutional layer forming material) for forming a solid electrolyte layer or an active material layer, where the material is for a sheet for an all-solid state secondary battery, an electrode sheet for an all-solid state secondary battery, or an all-solid state secondary battery.

The inorganic solid electrolyte-containing composition according to the embodiment of the present invention is not particularly limited; however, it has a moisture content (also referred to as a water content) of preferably 500 ppm or less, more preferably 200 ppm or less, still more preferably 100 ppm or less, and particularly preferably 50 ppm or less. In a case where the moisture content of the inorganic solid electrolyte-containing composition is low, it is possible to suppress the deterioration of the inorganic solid electrolyte. The moisture content refers to the water amount (the mass proportion to the inorganic solid electrolyte-containing composition) in the inorganic solid electrolyte-containing composition, and specifically, it is a value determined by filtration through a 0.02 μm membrane filter and then by Karl Fischer titration.

Hereinafter, components that are contained and components that can be contained in the inorganic solid electrolyte-containing composition according to the embodiment of the present invention will be described.

<Inorganic Solid Electrolyte>

The inorganic solid electrolyte-containing composition according to the embodiment of the present invention contains an inorganic solid electrolyte.

In the present invention, the inorganic solid electrolyte is an inorganic solid electrolyte, and the solid electrolyte refers to a solid-form electrolyte capable of migrating ions therein. The inorganic solid electrolyte is clearly distinguished from the organic solid electrolyte (the polymeric electrolyte such as polyethylene oxide (PEO) or the organic electrolyte salt such as lithium bis(trifluoromethanesulfonyl)imide (LiTFSI)) since the inorganic solid electrolyte does not include any organic substance as a principal ion conductive material. In addition, the inorganic solid electrolyte is solid in a steady state and thus, typically, is not dissociated or liberated into cations and anions. Due to this fact, the inorganic solid electrolyte is also clearly distinguished from inorganic electrolyte salts of which cations and anions are dissociated or liberated in electrolytic solutions or polymers ($LiPF_6$, $LiBF_4$, lithium bis(fluorosulfonyl)imide (LiFSI), LiCl, and the like). The inorganic solid electrolyte is not particularly limited as long as it has an ion conductivity of a metal belonging to Group 1 or Group 2 in the periodic table and generally does not have electron conductivity. In a case where the all-solid state secondary battery according to the embodiment of the present invention is a lithium ion battery, the inorganic solid electrolyte preferably has an ion conductivity of a lithium ion.

As the inorganic solid electrolyte, a solid electrolyte material that is typically used for an all-solid state secondary battery can be appropriately selected and used. Examples of the inorganic solid electrolyte include (i) a sulfide-based inorganic solid electrolyte, (ii) an oxide-based inorganic solid electrolyte, (iii) a halide-based inorganic solid electrolyte, and (iv) a hydride-based solid electrolyte. The sulfide-based inorganic solid electrolytes are preferably used from the viewpoint that it is possible to form a more favorable interface between the active material and the inorganic solid electrolyte.

(i) Sulfide-Based Inorganic Solid Electrolyte

The sulfide-based inorganic solid electrolyte is preferably an electrolyte that contains a sulfur atom, has an ion conductivity of a metal belonging to Group 1 or Group 2 in the periodic table, and has electron-insulating properties. The sulfide-based inorganic solid electrolytes are preferably inorganic solid electrolytes which, as elements, contain at least Li, S, and P and have an ion conductivity of a lithium ion, but the sulfide-based inorganic solid electrolytes may also include elements other than Li, S, and P depending on the purposes or cases.

Examples of the sulfide-based inorganic solid electrolyte include a lithium ion-conductive inorganic solid electrolyte satisfying the composition represented by Formula (S1).

$$L_{a1}M_{b1}P_{c1}S_{d1}A_{e1}\text{-} \qquad \text{Formula (S1)}$$

In the formula, L represents an element selected from Li, Na, or K and is preferably Li. M represents an element selected from B, Zn, Sn, Si, Cu, Ga, Sb, Al, or Ge. A represents an element selected from I, Br, Cl, or F, and a1 to e1 represent the compositional ratios between the respective elements, and a1:b1:c1:d1:e1 satisfies 1 to 12:0 to 5:1:2 to 12:0 to 10. a1 is preferably 1 to 9 and more preferably 1.5 to 7.5. b1 is preferably 0 to 3 and more preferably 0 to 1. d1 is preferably 2.5 to 10 and more preferably 3.0 to 8.5. e1 is preferably 0 to 5 and more preferably 0 to 3.

The compositional ratios between the respective elements can be controlled by adjusting the amounts of raw material compounds blended to manufacture the sulfide-based inorganic solid electrolyte as described below.

The sulfide-based inorganic solid electrolytes may be non-crystalline (glass) or crystallized (made into glass ceramic) or may be only partially crystallized. For example, it is possible to use Li—P—S-based glass containing Li, P, and S or Li—P—S-based glass ceramic containing Li, P, and S.

The sulfide-based inorganic solid electrolytes can be manufactured by a reaction of at least two raw materials of, for example, lithium sulfide ($Li_2S$), phosphorus sulfide (for example, diphosphorus pentasulfide ($P_2S_5$)), a phosphorus single body, a sulfur single body, sodium sulfide, hydrogen sulfide, lithium halides (for example, LiI, LiBr, and LiCl), or sulfides of an element represented by M (for example, $SiS_2$, SnS, and $GeS_2$).

The ratio of $Li_2S$ to $P_2S_5$ in Li—P—S-based glass and Li—P—S-based glass ceramic is preferably 60:40 to 90:10 and more preferably 68:32 to 78:22 in terms of the molar ratio, $Li_2S$:$P_2S_5$. In a case where the ratio between $Li_2S$ and $P_2S_5$ is set in the above-described range, it is possible to increase an ion conductivity of a lithium ion. Specifically, the ion conductivity of the lithium ion can be preferably set to $1 \times 10^4$ S/cm or more and more preferably set to $1 \times 10^{-3}$ S/cm or more. The upper limit is not particularly limited but realistically $1\times10^{-1}$ S/cm or less.

As specific examples of the sulfide-based inorganic solid electrolytes, combination examples of raw materials will be described below. Examples thereof include $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. The mixing ratio between the individual raw materials does not matter. Examples of the method of synthesizing a sulfide-based inorganic solid electrolyte material using the above-described raw material compositions include an amorphization method. Examples of the amorphization method include a mechanical milling method, a solution method, and a melting quenching method. This is because treatments at a normal temperature become possible, and it is possible to simplify manufacturing processes.

(ii) Oxide-Based Inorganic Solid Electrolytes

The oxide-based inorganic solid electrolyte is preferably an electrolyte that contains an oxygen atom, has an ion conductivity of a metal belonging to Group 1 or Group 2 in the periodic table, and has electron-insulating properties.

The ion conductivity of the oxide-based inorganic solid electrolyte is preferably $1\times10^{-6}$ S/cm or more, more preferably $5\times10^{-6}$ S/cm or more, and particularly preferably $1\times10^{-5}$ S/cm or more. The upper limit is not particularly limited; however, it is practically $1\times10^{-1}$ S/cm or less.

Specific examples of the compound include $Li_{xa}La_{ya}TiO_3$ (LLT) [xa satisfies $0.3 \leq xa \leq 0.7$, and ya satisfies $0.3 \leq ya \leq 0.7$]; $Li_{xb}La_{yb}Zr_{zb}M^{bb}_{mb}O_{nb}$ ($M^{bb}$ is one or more elements selected from Al, Mg, Ca, Sr, V, Nb, Ta, Ti, Ge, In, and Sn, xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$); $Li_{xc}B_{yc}M^{cc}_{zc}O_{nc}$ ($M^{cc}$ is one or more elements selected from C, S, Al, Si, Ga, Ge, In, and Sn, xc satisfies $0<xc \leq 5$, yc satisfies $0<yc \leq 1$, zc satisfies $0<zc \leq 1$, and nc satisfies $0<nc \leq 6$.); $Li_{xd}(Al, Ga)_{yd}(Ti, Ge)_{zd}Si_{ad}P_{md}O_{nd}$ (xd satisfies $1 \leq xd \leq 3$, yd satisfies $0 \leq yd \leq 1$, zd satisfies $0 \leq zd \leq 2$, ad satisfies $0 \leq ad \leq 1$, md satisfies $1 \leq md \leq 7$, and nd satisfies $3 \leq nd \leq 13$.); $Li_{(3-2xe)}M^{ee}_{xe}D^{ee}O$ (x represents a number between 0 and 0.1, and $M^{ee}$ represents a divalent metal atom, $D^{ee}$ represents a halogen atom or a combination of two or more halogen atoms); $Li_{xf}Si_{yf}O_{zf}$ (xf satisfies $1 \leq xf \leq 5$, yf satisfies $0<yf \leq 3$, zf satisfies $1 \leq zf \leq 10$); $Li_{xg}S_{yg}O_{zg}$ (xg satisfies $1 \leq xg \leq 3$, yg satisfies $0<yg \leq 2$, zg satisfies $1 \leq zg \leq 10$); $Li_3BO_3$; $Li_3BO_3$—$Li_2SO_4$; $Li_2O$—$B_2O_3$—$P_2O_5$; $Li_2O$—$SiO_2$; $Li_6BaLa_2Ta_2O_{12}$; $Li_3PO_{(4-3/2w)}N_w$ (w satisfies $w<1$); $Li_{3.5}Zn_{0.25}GeO_4$ having a lithium super ionic conductor (LISICON)-type crystal structure; $La_{0.55}Li_{0.35}TiO_3$ having a perovskite type crystal structure; $LiTi_2P_3O_{12}$ having a natrium super ionic conductor (NASICON)-type crystal structure; $Li_{1+xh+yh}(Al, Ga)_{xh}(Ti, Ge)_{2-xh}Si_{yh}P_{3-yh}O_{12}$ (xh satisfies $0 \leq xh \leq 1$, and yh satisfies $0 \leq yh \leq 1$); and $Li_7La_3Zr_2O_{12}$ (LLZ) having a garnet-type crystal structure.

In addition, a phosphorus compound containing Li, P, or O is also desirable. Examples thereof include lithium phosphate ($Li_3PO_4$); LiPON in which a part of oxygen in lithium phosphate are substituted with nitrogen; and $LiPOD^1$ ($D^1$ is preferably one or more elements selected from Ti, V, Cr, Mn, Fe, Co, Ni, Cu, Zr, Nb, Mo, Ru, Ag, Ta, W, Pt, and Au).

Further, It is also possible to preferably use $LiA^1ON$ ($A^1$ is one or more elements selected from Si, B, Ge, Al, C, and Ga).

(iii) Halide-Based Inorganic Solid Electrolyte

The halide-based inorganic solid electrolyte is preferably a compound that contains a halogen atom, has an ion conductivity of a metal belonging to Group 1 or Group 2 in the periodic table, and has electron-insulating properties.

The halide-based inorganic solid electrolyte is not particularly limited, and examples thereof include LiCl, LiBr, LiI, and compounds such as $Li_3YBr_6$ or $Li_3YCl_6$ described in ADVANCED MATERIALS, 2018, 30, 1803075. In particular, $Li_3YBr_6$ or $Li_3YCl_6$ is preferable.

(iv) Hydride-Based Inorganic Solid Electrolyte

The hydride-based inorganic solid electrolyte is preferably a compound that contains a hydrogen atom, has an ion conductivity of a metal belonging to Group 1 or Group 2 in the periodic table, and has electron-insulating properties.

The hydride-based inorganic solid electrolyte is not particularly limited, and examples thereof include $LiBH_4$, $Li_4(BH_4)_3I$, and $3LiBH_4$—LiCl.

The inorganic solid electrolyte is preferably particulate. In this case, the particle diameter (volume average particle diameter) of the inorganic solid electrolyte is not particularly limited; however, it is preferably 0.01 µm, more and more preferably 0.1 µm or more, and still more preferably 0.3 µm or more. The upper limit thereof is preferably 100 µm or less, more preferably 50 µm or less, and still more preferably 10 µm or less.

The particle diameter of the inorganic solid electrolyte is measured in the following order. The inorganic solid electrolyte particles are diluted and prepared using water (diisobutyl ketone (DIBK) in a case where the inorganic solid electrolyte is unstable in water) in a 20 mL sample bottle to prepare 1% by mass of a dispersion liquid. The diluted dispersion liquid sample is irradiated with 1 kHz ultrasonic waves for 10 minutes and is then immediately used for testing. Data collection is carried out 50 times using this dispersion liquid sample, a laser diffraction/scattering-type particle diameter distribution measurement instrument LA-920 (trade name, manufactured by Horiba Ltd.), and a quartz cell for measurement at a temperature of 25° C. to obtain the volume average particle diameter. Other detailed conditions and the like can be found in JIS Z8828: 2013 "particle diameter Analysis-Dynamic Light Scattering" as necessary. Five samples per level are produced and measured, and the average values thereof are employed.

One kind of inorganic solid electrolyte may be contained, or two or more kinds thereof may be contained.

In a case of forming a solid electrolyte layer, the mass (mg) (mass per unit area) of the inorganic solid electrolyte per unit area ($cm^2$) of the solid electrolyte layer is not particularly limited. It can be appropriately determined according to the designed battery capacity and can be set to, for example, 1 to 100 $mg/cm^2$.

However, in a case where the inorganic solid electrolyte-containing composition contains an active material described later, the mass per unit area of the inorganic solid electrolyte is preferably such that the total amount of the active material and the inorganic solid electrolyte is in the above range.

The content of the inorganic solid electrolyte in the inorganic solid electrolyte-containing composition is not particularly limited. However, in terms of the dispersibility and furthermore, in terms of the reduction of interfacial resistance and the binding property, it is preferably 50% by mass or more, more preferably 70% by mass or more, and still more preferably 90% by mass or more, with respect to 100% by mass of the solid content. From the same viewpoint, the upper limit thereof is preferably 99.9% by mass or less, more preferably 99.5% by mass or less, and particularly preferably 99% by mass or less.

However, in a case where the inorganic solid electrolyte-containing composition contains an active material described below, regarding the content of the inorganic solid electrolyte in the inorganic solid electrolyte-containing composition, the total content of the active material and the inorganic solid electrolyte is preferably in the above-described range.

In the present specification, the solid content (solid component) refers to components that neither volatilize nor evaporate and disappear in a case where the inorganic solid electrolyte-containing composition is subjected to drying treatment at 150° C. for 6 hours in a nitrogen atmosphere at a pressure of 1 mmHg. Typically, the solid content refers to a component other than organic solvents described below.

<Binder>

It is sufficient that the inorganic solid electrolyte-containing composition according to the embodiment of the present invention contains at least a binder (also referred to as a binder A) in which the adsorption rate with respect to the inorganic solid electrolyte is 15% or more and a binder (also referred to as a binder B) in which the adsorption rate with respect to the inorganic solid electrolyte is less than 10%, and it may contain another binder (for example, a binder having in which the adsorption rate with respect to the inorganic solid electrolyte is 10% or more and less than 15%). In the present invention, each of the binder A, the binder B, and the other binder may be one kind or a plurality of kinds.

It is sufficient that the number of kinds of binders contained in the inorganic solid electrolyte-containing composition according to the embodiment of the present invention may be 2 or more and generally is preferably 2 to 4, and one kind of the binder A and one kind of the binder B is more preferable.

In the present invention, the adsorption rate of a binder is an indicator that indicates an extent to which, in an organic solvent, a binder adsorbs to the inorganic solid electrolyte contained in the inorganic solid electrolyte-containing composition in which the binder is used. Here, the adsorption of the binder to the inorganic solid electrolyte includes not only physical adsorption but also chemical adsorption (adsorption by chemical bond formation, adsorption by transfer of electrons, or the like). In addition, DIBK is generally used as an organic solvent, which may be different from the organic solvent contained in the inorganic solid electrolyte-containing composition in which the binder is used.

As a result, in a case where the inorganic solid electrolyte-containing composition contains a plurality of kinds of inorganic solid electrolytes, the adsorption rate is an adsorption rate with respect to the inorganic solid electrolyte having the same composition (kind and content) as the composition of the inorganic solid electrolyte in the inorganic solid electrolyte-containing composition. Similarly, also in a case where a plurality of kinds of binder A or binder B are used, the adsorption rate is an adsorption rate in the case where the plurality of kinds of binder is used.

In the present invention, the adsorption rate of the binder is a value calculated by the method described in Examples.

In the present invention, the adsorption rate with respect to the inorganic solid electrolyte is appropriately set depending on the kind (the structure and the composition of the polymer chain) of polymer that forms a binder, the kind or content of the functional group contained in the polymer, the form of the binder (the particulate binder or the soluble type binder), and the like.

(Binder A)

The adsorption rate of the binder A is 15% or more, and it is preferably 25% or more, more preferably 50% or more, and still more preferably 55% or more. In a case where the binder A exhibits the above adsorption rate, it can adsorb to the inorganic solid electrolyte in the inorganic solid electrolyte-containing composition to form a bound body, whereby the binding property of the inorganic solid electrolyte can be enhanced. On the other hand, the upper limit of the adsorption rate is not particularly limited; however, it is practically 99.9%, and it is preferably 70% or less in terms of dispersibility.

The binder A is not particularly limited in terms of the solubility in a non-polar solvent (generally DIBK), and it may be soluble or insoluble in a non-polar solvent. In the present invention, the solubility of the binder A in the non-polar solvent is preferably 2% by mass or less and more preferably 1% by mass or less in terms of the improvement of the binding property and furthermore, the reduction of the resistance of the all-solid state secondary battery. The binder A that exhibits such a solubility is insoluble in a non-polar solvent, and it is preferable that the binder A is a particulate binder, which will be described later, at least in the inorganic solid electrolyte-containing composition. In the present invention, the solubility of the binder is a value calculated by the method described in Examples.

In a case where the inorganic solid electrolyte-containing composition according to the embodiment of the present invention contains an active material described later (in a case where an active material layer is formed of the inorganic solid electrolyte-containing composition), the adsorption rate of the binder A to the active material is not particularly limited; however, it is preferably 10% or more, more preferably 20% to 99.9%, and still more preferably 30% to 99%, in terms of further improvement of the binding property. In the present invention, the adsorption rate of a binder to an active material is an indicator that indicates the extent to which, in an organic solvent, a binder adsorbs to the active material contained in the inorganic solid electrolyte-containing composition in which the binder is used. Here, the adsorption of the binder to the active material includes not only physical adsorption but also chemical adsorption (adsorption by chemical bond formation, adsorption by transfer of electrons, or the like). In addition, DIBK is generally used as an organic solvent, which may be different from the organic solvent contained in the inorganic solid electrolyte-containing composition in which the binder is used. As a result, in a case where the inorganic solid electrolyte-containing composition contains a plurality of kinds of active materials, the adsorption rate is the same as that of the binder with respect to the inorganic solid electrolyte, described above, in a case where a plurality of kinds of binders are used. In the present invention, the adsorption rate of the binder with respect to the active material is a value calculated by the method described in Examples. In the present invention, the adsorption rate with respect to the active material can be appropriately set in the same manner as the adsorption rate with respect to the inorganic solid electrolyte.

In a case where the inorganic solid electrolyte-containing composition according to the embodiment of the present invention contains an active material, the peel strength of the binder A with respect to the collector is not particularly limited and is appropriately set. For example, it can be set in the same range as that of the peel strength of the binder B, described later, with respect to the collector.

The content of the binder A in the inorganic solid electrolyte-containing composition is not particularly limited. However, in terms of binding property and dispersibility, it is preferably 0.1% to 10.0% by mass, more preferably 0.2% to 5.0% by mass, and still more preferably 0.3% to 4.0% by mass, with respect to 100% by mass of the solid content. In a case where the binder A is a particulate binder, the content thereof is appropriately set within the above range. However, the lower limit thereof is preferably a content in which the binder A is not dissolved in the inorganic solid electrolyte-containing composition (the particulate state can be maintained) in consideration of the solubility of the binder A.

In the inorganic solid electrolyte-containing composition, the content of the binder A may be equal to or may be lower than the content of the binder B described later; however, it is preferably higher than the content of the binder B. This makes it possible to improve the binding property and the dispersibility of the inorganic solid electrolyte-containing composition, and further, it is possible to suppress the increase in the resistance of the all-solid state secondary battery. The difference in content between the binder A and the binder B (the content of the binder A—the content of the binder B) is not particularly limited, it can be, for example, −5.0% to 5.0% by mass, and it is preferably 0.0% by mass or more, more preferably 0.0% to 4.0% by mass, and still more preferably 0.2 to 2.0% by mass.

In addition, the ratio of the content of the binder A to the content of the binder B (the content of the binder A/the content of the binder B) is not particularly limited; however, it is, for example, preferably 0.5 to 30 and more preferably 1.2 to 10.

[Binder B]

The adsorption rate of the binder B with respect to the inorganic solid electrolyte is less than 10%, and it is preferably less than 8%, more preferably less than 5%, still more preferably 4% or less, and particularly preferably 0% or more and 3% or less. In a case where the binder B exhibits the above adsorption rate, it hardly adsorbs to the inorganic solid electrolyte in the inorganic solid electrolyte-containing composition and thus suppresses the excessive formation of the aggregate, whereby the dispersibility can be increased.

The binder B is not particularly limited in terms of the solubility in a non-polar solvent (generally DIBK), and it may be soluble or insoluble in a non-polar solvent. In the present invention, the solubility of the binder B in the non-polar solvent is preferably 2% by mass or more, more preferably 3% by mass or more, and still more preferably 5% by mass or less in terms of dispersibility and binding property. On the other hand, the upper limit of the solubility thereof is not particularly limited, and it can be, for example, 25% by mass or less, and it is preferably 20% by mass or less. The binder B that exhibits such a solubility is preferably a soluble type binder, described later, in the inorganic solid electrolyte-containing composition.

In a case where the inorganic solid electrolyte-containing composition according to the embodiment of the present invention contains an active material described later, the adsorption rate of the binder B with respect to the active material is not particularly limited; however, it is preferably 0% to 99.9%, more preferably 2% to 50%, and still more preferably 3% to 25%, in terms of binding property.

In a case where the inorganic solid electrolyte-containing composition according to the embodiment of the present invention contains an active material, the peel strength of the binder B with respect to the collector is not particularly limited. For example, it is preferably 0.1 N/mm or more, more preferably 0.2 N/mm or more, and still more preferably 0.3 N/mm or more, in terms of the obtainability of high adhesiveness to the collector. The upper limit thereof is not particularly limited; however, it is, for example, practically 10 N/mm or less, and it is preferably 2.0 N/mm or less. The collector to which the above peel strength is applied is not particularly limited as long as it is the one described later; however, examples thereof include copper foil, aluminum foil, and stainless steel (SUS) foil. The peel strength is a value calculated by the same method as the method (the method for peel strength with respect to the copper foil) described in Examples regardless of the kind of collector. In the present invention, the peel strength can be appropriately set in the same manner as the adsorption rate with respect to the inorganic solid electrolyte.

The content of the binder B in the inorganic solid electrolyte-containing composition is not particularly limited. However, in terms of dispersibility and binding property, it is preferably 0.01% to 15% by mass, more preferably 0.05% to 5% by mass, and still more preferably 0.1% to 2.0% by mass, with respect to 100% by mass of the solid content.

In the present invention, the mass ratio [(the mass of the inorganic solid electrolyte+the mass of the active material)/ (the mass of the binder A+the mass of the binder B)] of the total mass (total amount) of the inorganic solid electrolyte and the active material to the total mass of the binder A and the binder B is preferably in a range of 1,000 to 1. This ratio is more preferably 500 to 2 and still more preferably 100 to 10.

(Combination of Binder a and Binder B)

The combination of the binder A and the binder B is not particularly limited. However, it is preferably a combination in which the difference between the adsorption rate of the binder A with respect to the inorganic solid electrolyte and the adsorption rate of the binder B with respect to the inorganic solid electrolyte (the adsorption rate of the binder A—the adsorption rate of the binder B) is more than 5% in terms of binding property and dispersibility. The combination of the binder A and the binder B is more preferably a combination providing 10% or more of a difference in adsorption rate between the two binders, still more preferably a combination providing 45% or more thereof, even still more preferably a combination providing 50% or more, and particularly preferably a combination providing 55% or more, from the viewpoint that the binding property and the dispersibility can be achieved in a well-balanced manner. The upper limit of the difference in this adsorption rate is not particularly limited and can be, for example, 80%. For such a combination in which each difference in adsorption rate is as describe above, the binder A and the binder B can be appropriately combined, and examples of the combination providing 45% or more of difference in adsorption rate include a combination of the binder A in which the difference in adsorption rate is 50% or more and the binder B in which the difference in adsorption rate is less than 5%.

The solubilities of the binder A and the binder B to be used in combination are appropriately set and are not particularly limited. However, in terms of the reduction of the resistance of the all-solid state secondary battery, it is preferable that at least one of the binder A or the binder B is set to become insoluble in a non-polar solvent (become a particulate binder), and it is more preferable that the binder A is set to become insoluble in a non-polar solvent and the binder B is set to become soluble, in a non-polar solvent, The combination of the binder A and the binder B in the polymer kind will be described later.

(Polymer that Forms Binder)

The polymers that form the binders A and B are not particularly limited as long as they satisfy the above adsorption rate with respect to the inorganic solid electrolyte, and examples thereof include sequential polymerization (a polycondensation, a polyaddition, or an addition condensation) type polymers such as polyurethane, polyurea, polyamide, polyimide, polyester, polyether, and polycarbonate, and further include chain polymerization type polymers such as a fluorine-based polymer (a fluorine-containing polymer), a hydrocarbon-based polymer, a vinyl polymer, and (meth) acrylic polymer.

The polymer that forms the binder A is preferably polyurethane or a (meth)acrylic polymer, and polyurethane is more preferable in terms of dispersibility and binding property. The polymer that forms the binder B is preferably a fluorine-based polymer, a hydrocarbon-based polymer, a polyurethane, or a (meth)acrylic polymer, and more preferably a fluorine-based polymer or a hydrocarbon-based polymer, in terms of dispersibility and binding property. Examples of the combination of the binder A and the binder B include a combination of the above-described preferred polymers that form respective binders.

In the present invention, a main chain of the polymer refers to a linear molecular chain in which all the molecular chains that constitute the polymer other than the main chain can be conceived as a branched chain or a pendant with respect to the main chain. Although it depends on the mass average molecular weight of the molecular chain regarded as a branched chain or pendant chain, the longest chain among the molecular chains constituting the polymer is typically the main chain. In this case, a terminal group at the polymer terminal is not included in the main chain. In addition, side chains of the polymer refer to molecular chains other than the main chain and include a short molecular chain and a long molecular chain.

Hereinafter, the polymer that forms a binder will be described.

—Sequential Polymerization Type Polymer—

The sequential polymerization type polymer has at least one bond of a urethane bond, a urea bond, an amide bond, an imide bond, an ester bond, an ether bond, or a carbonate bond in the main chain of the polymer. Examples of the polymer having such a bond include polymers of polyurethane, polyurea, polyamide, polyimide, polyester, polyether, and polycarbonate, and copolymers thereof. The copolymer may be a block copolymer having each of the above polymers as a segment, or a random copolymer in which each constitutional component constituting two or more polymers among the above polymers is randomly bonded.

The above bond contained in the main chain contributes to the improvement of the binding property of solid particles and the like in the constitutional layer of the all-solid state secondary battery and the like by forming a hydrogen bond. In a case where these bonds form a hydrogen bond in the polymer, the hydrogen bond may be formed between the above bonds or may be formed between the above bond and another partial structure of the main chain. From the viewpoint of being capable of forming a hydrogen bond with each other, the above bonds preferably have a hydrogen atom that forms a hydrogen bond (provided that a nitrogen atom of each bond is unsubstituted).

The above bond is not particularly limited as long as it is contained in the main chain of the polymer, and it may have any aspect in which it is contained in the constitutional unit (the repeating unit) and/or an aspect in which it is contained as a bond that connects different constitutional units to each other). Further, the above bond contained in the main chain is not limited to one kind, and it may be two or more kinds. In this case, the binding mode of the main chain is not particularly limited. The main chain may randomly have two or more kinds of bonds and may be a main chain that is segmented to a main chain having a specific bond and a segment having another bond.

The main chain having the above bond is not particularly limited. However, it is preferably a main chain that has at least one segment of a urethane bond, a urea bond, an amide bond, an imide bond, or an ester bond, more preferably a main chain consisting of polyamide, polyurea, or polyurethane, and still more preferably a main chain consisting of polyurethane. Specifically, the main chain having the above bond is a main chain formed by combining 2 or more constitutional components (preferably 2 to 8 constitutional components, more preferably 2 to 4 constitutional components, and still more preferably 3 or 4 constitutional components) represented by any one of Formulae (I-1) to (I-4) or a main chain formed by sequential polymerization of a carboxylic acid dianhydride represented by Formula (I-5) and a diamine compound from which a constitutional component represented by Formula (I-6) is derived. The combination of each of the constitutional components is appropriately selected depending on the kind of polymer. Examples of the main chain consisting of polycarbonate include a main chain having a constitutional component represented by Formula (I-2) in which oxygen atoms are introduced at both end portions of $R^{P1}$ or a constitutional component represented by Formula (I-2) which adopts a constitutional component represented by Formula (I-3) as $R^{P1}$, and a constitutional component represented by Formula (I-3). One constitutional component in the combination of the constitutional components refers to the kind of the constitutional component represented by any one of the following formulae. Even in a case where the polymer includes two constitutional components represented by one of the following formulae, it is not conceived that the polymer includes two kinds of constitutional components.

Formula (I-1)

Formula (I-2)

Formula (I-3)

Formula (I-4)

Formula (I-5)

Formula (I-6)

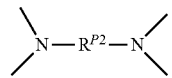

In the formulae, $R^{P1}$ and $R^{P2}$ each independently represent a molecular chain having a molecular weight or mass average molecular weight of 20 to 200,000. The molecular weight of the molecular chain cannot be uniquely determined because it depends on the kind thereof and the like, and is, for example, preferably 30 or higher, more preferably 50 or higher, still more preferably 100 or higher, and still more preferably 150 or higher. The upper limit thereof is preferably 100,000 or less and more preferably 10,000 or less. The molecular weight of the molecular chain is measured for a raw material compound before being incorporated into the main chain of the polymer.

The molecular chain which can be adopted as $R^{P1}$ and $R^{P2}$ is not particularly limited and is preferably a hydrocarbon chain, a polyalkylene oxide chain, a polycarbonate chain, or a polyester chain, more preferably a hydrocarbon chain or a polyalkylene oxide chain, and still more preferably a hydrocarbon chain, a polyethylene oxide chain, or a polypropylene oxide chain.

The hydrocarbon chain which can be adopted as $R^{P1}$ and $R^{P2}$ means a chain of hydrocarbon including a carbon atom and a hydrogen atom, and more specifically means a structure in which at least two atoms (for example, hydrogen atoms) or a group (for example, a methyl group) is desorbed from the compound including a carbon atom and a hydrogen atom. However, in the present invention, the hydrocarbon chain also includes a chain that includes a chain having an oxygen atom, a sulfur atom, or a nitrogen atom, for example, as in a hydrocarbon group represented by Formula (M2). A terminal group that may be present in a terminal of the hydrocarbon chain is not included in the hydrocarbon chain. This hydrocarbon chain may include a carbon-carbon unsaturated bond or may include a ring structure of an aliphatic ring and/or an aromatic ring. That is, the hydrocarbon chain may be a hydrocarbon chain including a hydrocarbon selected from an aliphatic hydrocarbon or an aromatic hydrocarbon.

The hydrocarbon chain only has to satisfy the molecular weight and includes a double hydrocarbon chain including a chain consisting of a hydrocarbon group having a low molecular weight and a hydrocarbon chain (also referred to as "hydrocarbon polymer chain") consisting of a hydrocarbon polymer.

The hydrocarbon chain having a low molecular weight is a chain consisting of a typical (non-polymerizable) hydrocarbon group, and examples of the hydrocarbon group include an aliphatic or aromatic hydrocarbon group. Specifically, an alkylene group (having preferably 1 to 12 carbon atoms, more preferably 1 to 6 carbon atoms, and still more preferably 1 to 3 carbon atoms), an arylene group (having preferably 6 to 22 carbon atoms, more preferably 6 to 14 carbon atoms, and still more preferably 6 to 10 carbon atoms), or a group consisting of a combination of the above-described groups is preferable. As the hydrocarbon group forming the hydrocarbon chain having a low molecular weight which can be adopted as $R^{P2}$, an alkylene group is more preferable, an alkylene group having 2 to 6 carbon atoms is still more preferable, and an alkylene group having 2 or 3 carbon atoms is still more preferable.

The aliphatic hydrocarbon group is not particularly limited, and examples thereof include a hydrogen reduced form of an aromatic hydrocarbon group represented by Formula (M2) and a partial structure (for example, a group consisting of isophorone) in a conventionally known aliphatic diisocyanate compound. In addition, examples thereof also include a hydrocarbon group contained in the constitutional component of each example described later.

Examples of the aromatic hydrocarbon group include a hydrocarbon group contained in the constitutional component of each example described later, and a phenylene group or a hydrocarbon group represented by Formula (M2) is preferable.

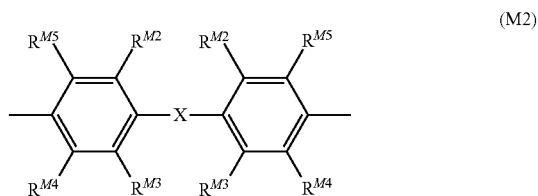

(M2)

In Formula (M2), X represents a single bond, —$CH_2$—, —$C(CH_3)_2$—, —$SO_2$—, —S—, —CO—, or —O— and is preferably —$CH_2$— or —O—, and more preferably —$CH_2$— from the viewpoint of binding property. The above described alkylene group exemplified herein and the alkylene group, may be substituted with a substituent Z and preferably a halogen atom (more preferably a fluorine atom).

$R^{M2}$ to $R^{M5}$ each independently represent a hydrogen atom or a substituent and preferably a hydrogen atom. The substituent which can be adopted as $R^{M2}$ to $R^{M5}$ is not particularly limited, and examples thereof include an alkyl group having 1 to 20 carbon atoms, an alkenyl group having 1 to 20 carbon atoms, —$OR^{M6}$, —$N(R^{M6})_2$, —$SR^{M6}$ ($R^{M6}$ represents a substituent and preferably an alkyl group having 1 to 20 carbon atoms or an aryl group having 6 to 10 carbon atoms), and a halogen atom (for example, a fluorine atom, a chlorine atom, or a bromine atom). Examples of —$N(R^{M6})_2$ include an alkylamino group (having preferably 1 to 20 carbon atoms and more preferably 1 to 6 carbon atoms) and an acylamino group (having preferably 6 to 40 carbon atoms and more preferably 6 to 20 carbon atoms).

The hydrocarbon polymer chain is not particularly limited as long as it is a polymer chain formed by polymerizing (at least two) polymerizable hydrocarbons and a chain consisting of a hydrocarbon polymer having a larger number of carbon atoms than the above-described hydrocarbon chain having a low molecular weight; however, it is preferably a chain consisting of a hydrocarbon polymer consisting of 30 or more carbon atoms and more preferably 50 or more carbon atoms. The upper limit of the number of carbon atoms that constitute the hydrocarbon polymer is not particularly limited and may be, for example, 3,000. The hydrocarbon polymer chain is preferably a chain consisting of a hydrocarbon polymer formed of an aliphatic hydrocarbon in which the main chain satisfies the above-described number of carbon atoms and more preferably a chain consisting of a polymer (preferably an elastomer) formed of an aliphatic saturated hydrocarbon or an unsaturated aliphatic hydrocarbon. Examples of the polymer include a diene polymer having a double bond in the main chain and a non-diene polymer not having a double bond in the main chain. Examples of the diene polymer include a styrene-butadiene copolymer, a styrene-ethylene-butadiene copolymer, a copolymer (preferably butyl rubber (IIR)) of isobutylene and isoprene, a butadiene polymer, an isoprene polymer, and an ethylene-propylene-diene copolymer. Examples of the non-diene polymer include an olefin polymer such as an ethylene-propylene copolymer or a styrene-ethylene-butylene copolymer and a hydrogen reduced form of the above-described diene polymer.

The hydrocarbon forming the hydrocarbon chain preferably has a reactive group at a terminal and more preferably has a terminal reactive group capable of polycondensation. The terminal reactive group capable of polycondensation or polyaddition forms a group bonded to $R^{P1}$ or $R^{P2}$ in each of the formulae by polycondensation or polyaddition. Examples of the terminal reactive group include an isocyanate group, a hydroxy group, a carboxy group, an amino group, and an acid anhydride. In particular, a hydroxy group is preferable.

As the hydrocarbon polymer having a terminal reactive group, for example as trade names, NISSO-PB series (manufactured by NIPPON SODA Co., Ltd.), Krasol series (manufactured by TOMOE Engineering Co., Ltd.), PolyVEST-HT series (manufactured by Evonik Industries AG), Poly-bd series (manufactured by Idemitsu Kosan Co., Ltd.), Poly-ip series (manufactured by Idemitsu Kosan Co., Ltd.), EPOL (manufactured by Idemitsu Kosan Co., Ltd.), and POLY-TAIL series (manufactured by Mitsubishi Chemical Corporation) are suitably used.

Examples of the polyalkylene oxide chain (polyalkyleneoxy chain) include a chain consisting of a conventionally known polyalkylene oxide. The number of carbon atoms in the alkyleneoxy group is preferably 1 to 10, more preferably 1 to 6, and still more preferably 2 or 3 (a polyethylene oxide chain or a polypropylene oxide chain). The polyalkylene oxide chain may be a chain consisting of one alkylene oxide or may be a chain consisting of two or more alkylene oxides (for example, a chain consisting of ethylene oxide and propylene oxide).

Examples of the polycarbonate chain or the polyester chain include a chain consisting of a conventionally known polycarbonate or polyester.

It is preferable that the polyalkylene oxide chain, the polycarbonate chain, or the polyester chain includes an alkyl group (having preferably 1 to 12 carbon atoms and more preferably 1 to 6 carbon atoms) at a terminal.

The terminal of the polyalkylene oxide chain, the polycarbonate chain, or the polyester chain, which can be used as $R^{P1}$ and $R^{P2}$, can be appropriately changed to a typical chemical structure that can be incorporated into the constitutional component represented by each of the formulae as $R^{P1}$ and $R^{P2}$. For example, like the polyurethanes 1 to 6 synthesized in Examples, the terminal oxygen atom of the polyalkylene oxide chain is removed and incorporated as the above-described constitutional component $R^{P1}$ or $R^{P2}$.

In the alkyl group in the molecular chain or at a terminal thereof, an ether group (—O—), a thioether group (—S—), a carbonyl group (>C=O), or an imino group (>$NR^N$: $R^N$ represents a hydrogen atom, an alkyl group having 1 to 6 carbon atoms, or an aryl group having 6 to 10 carbon atoms) may be present.

In each of the formulae, $R^{P1}$ and $R^{P2}$ represent a divalent molecular chain but may represent a trivalent or higher molecular chain in which at least one hydrogen atom is substituted with —NH—CO—, —CO—, —O—, —NH—, or —N<.

Among the above molecular chains, $R^{P1}$ is preferably a hydrocarbon chain, more preferably a hydrocarbon chain having a low molecular weight, still more preferably a hydrocarbon chain consisting of an aliphatic or aromatic hydrocarbon group, and particularly preferably a hydrocarbon chain consisting of an aromatic hydrocarbon group.

Among the above molecular chains, $R^{P2}$ is preferably a low molecular weight hydrocarbon chain (more preferably an aliphatic hydrocarbon group) or a molecular chain other than the hydrocarbon chain having a low molecular weight, and more preferably an aspect including each of a hydrocarbon chain having a low molecular weight and a molecular chain other than the hydrocarbon chain having a low molecular weight. In this aspect, Formula (I-3), a constitutional component represented by any one of Formula (I-4) or Formula (I-6) include at least two kinds of a constitutional component in which $R^{P2}$ is a hydrocarbon chain having a low molecular weight and a constitutional component in which $R^{P2}$ is a molecular chain other than the hydrocarbon chain having a low molecular weight.

Specific examples of the constitutional component represented by Formula (I-1) are shown below. Examples of the raw material compound (the diisocyanate compound) from which the constitutional component represented by Formula (I-1) is derived include the diisocyanate compound represented by Formula (M1) described in WO2018/020827A and the specific example thereof and further include a polymeric 4,4'-diphenylmethane diisocyanate. In the present invention, the constitutional component represented by Formula (I-1) and the raw material compound derived from the constitutional component are not limited to those described in the following specific examples and the above documents.

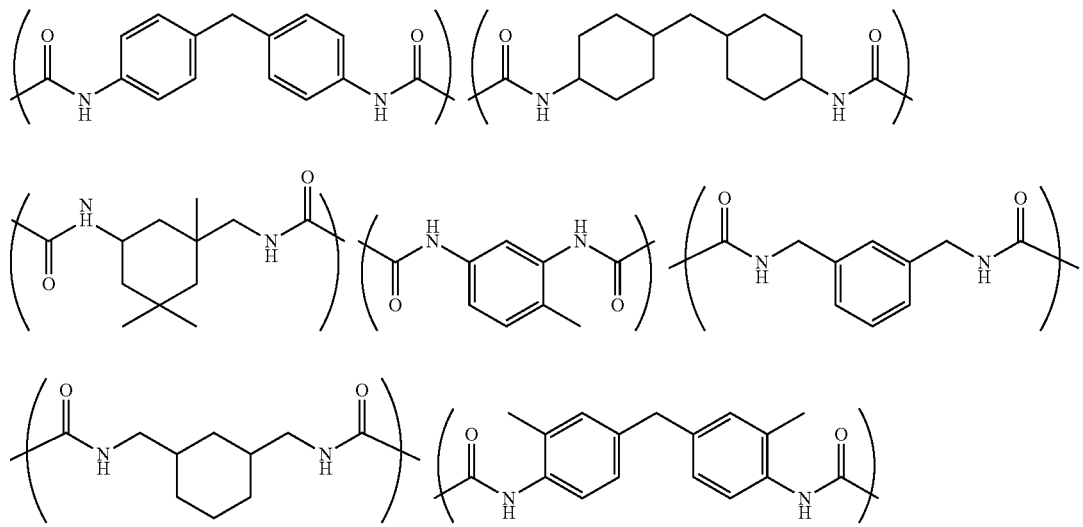

-continued

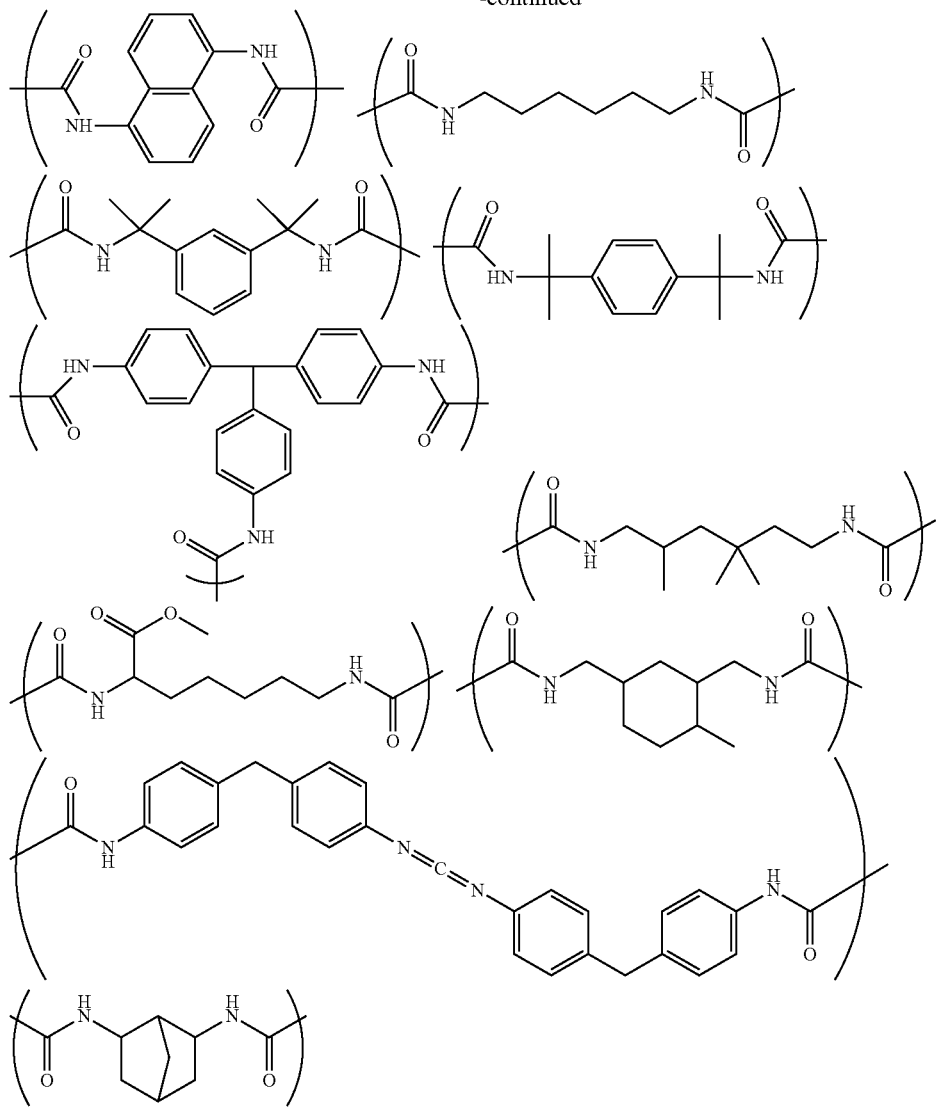

The raw material compound (a carboxylic acid, an acid chloride thereof, or the like) from which the constitutional components represented by Formula (I-2) are derived is not particularly limited, and examples of the raw material include the carboxylic acid or the compound of the acid chloride, and the specific examples thereof, which are described in paragraph [0074] of WO2018/020827A.

Specific examples of the constitutional components represented by Formula (I-3) or Formula (I-4) are shown below. The raw material compound (the diol compound or the diamine compound) from which the constitutional component represented by Formula (I-3) or Formula (I-4) is derived is not particularly limited. Examples thereof include the respective compounds and the specific examples thereof, which are described in WO2018/020827A, and further include dihydroxyoxamide. In the present invention, the constitutional components represented by Formula (I-3) or Formula (I-4) and the raw material compounds from which the compounds are derived are not limited to those described in the following specific examples and the above documents.

In the following specific examples, in a case where the constitutional component has a repeating structure, the number of repetitions is an integer of 1 or more and is appropriately set within a range satisfying the molecular weight or the number of carbon atoms of the molecular chain.

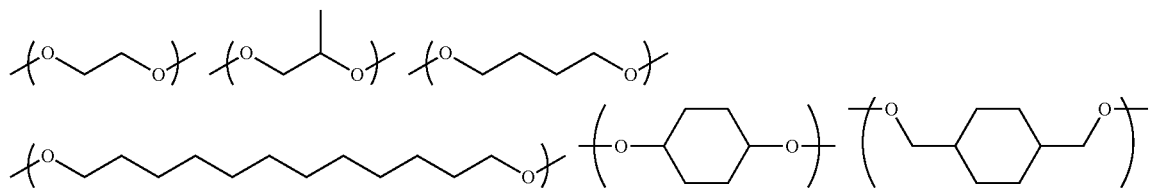

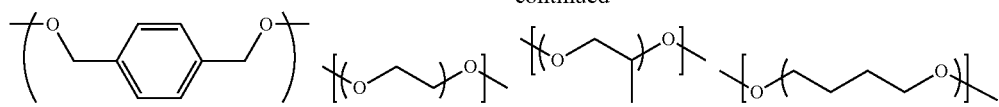
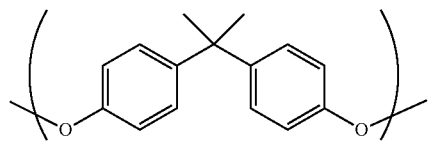
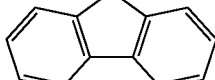
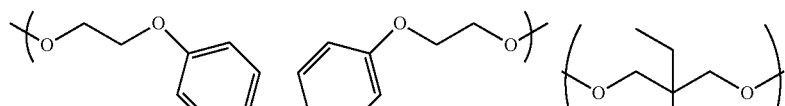
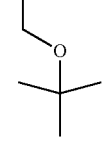
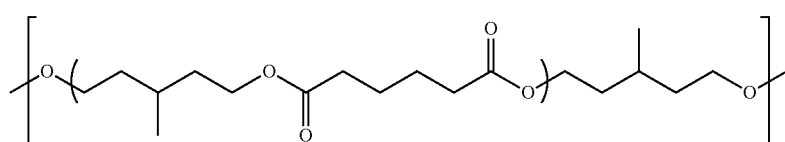
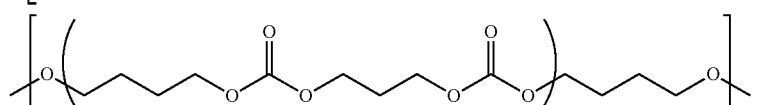
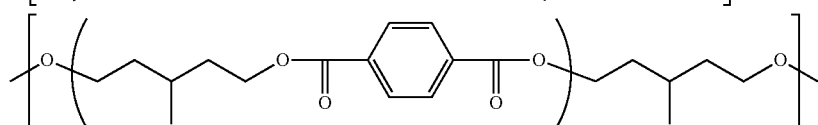
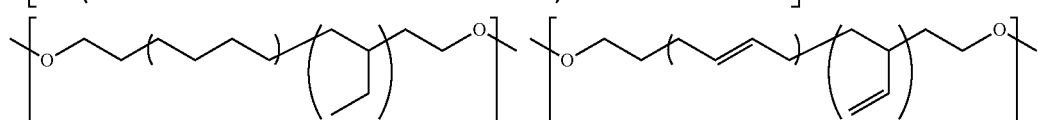
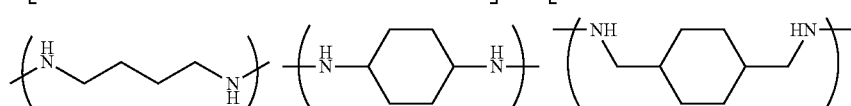
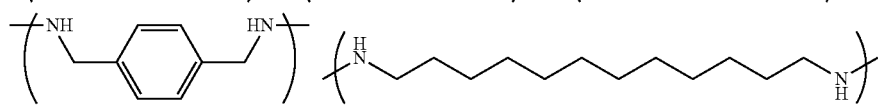
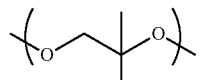
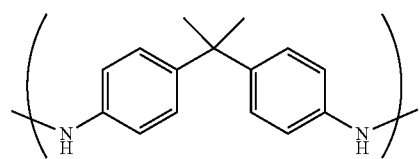
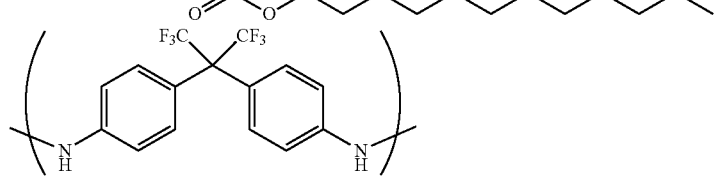
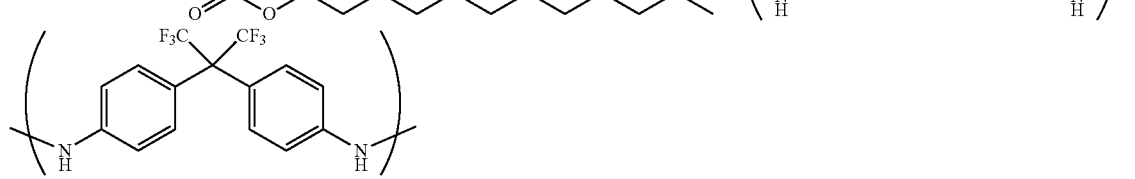

In Formula (I-5), $R^{P3}$ represents an aromatic or aliphatic linking group (tetravalent) and preferably a linking group represented by any one of Formulae (i) to (iix).

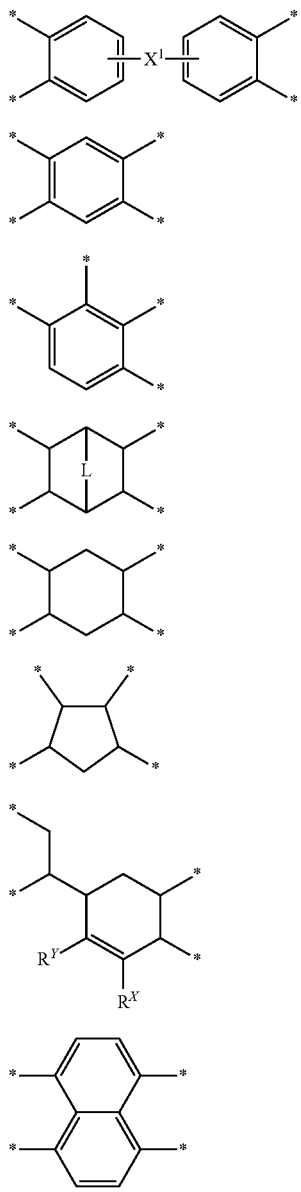

In Formulae (i) to (iix), $X^1$ represents a single bond or a divalent linking group. As the divalent linking group, an alkylene group having 1 to 6 carbon atoms (for example, methylene, ethylene, or propylene) is preferable. The propylene is preferably 1,3-hexafluoro-2,2-propanediyl. L represents —CH$_2$=CH$_2$— or —CH$_2$—. $R^X$ and $R^Y$ each independently represent a hydrogen atom or a substituent. In each of the formulae, * represents a binding position to the carbonyl group in Formula (I-5). The substituent that can be adopted as $R^X$ and $R^Y$ is not particularly limited, and examples thereof include the substituent Z described below. In particular, an alkyl group (having preferably 1 to 12 carbon atoms, more preferably 1 to 6 carbon atoms, still more preferably 1 to 3 carbon atoms) or an aryl group (having preferably 6 to 22 carbon atoms, more preferably 6 to 14 carbon atoms, still more preferably 6 to 10 carbon atoms) is preferable.

The carboxylic acid dianhydride represented by Formula (I-5) and the raw material compound (the diamine compound) from which the constitutional components represented by Formula (I-6) are respectively derived are not particularly limited, and examples thereof include the respective compounds and the specific examples thereof, which are described in WO2018/020827A and WO2015/046313A.

$R^N$, $R^{P2}$, and $R^{P3}$ may each independently have a substituent. The substituent is not particularly limited, and examples thereof include the substituent Z described below. In particular, suitable examples thereof include the substituent that can be adopted as $R^{M2}$.

The polymer that constitutes a binder preferably has, as a constitutional component represented by Formula (I-3) or Formula (I-4) and preferably Formula (I-3), a constitutional component (preferably a constitutional component represented by Formula (I-3A)) in which $R^{P2}$ is a chain (having, as a functional group, preferably a group having an ether group or a carboxy group or having both thereof, and more preferably a group having a carboxy group in a case of a polymer that forms the binder A) consisting of a hydrocarbon group having a low molecular weight and a constitutional component (preferably a constitutional component represented by Formula (I-3B)) in which RP$^2$ is the polyalkylene oxide chain as a molecular chain, and more preferably has at least three kinds of constitutional components (preferably constitutional components represented by Formula (I-3C)) in which RP$^2$ is furthermore the polyalkylene oxide chain as a molecular chain.

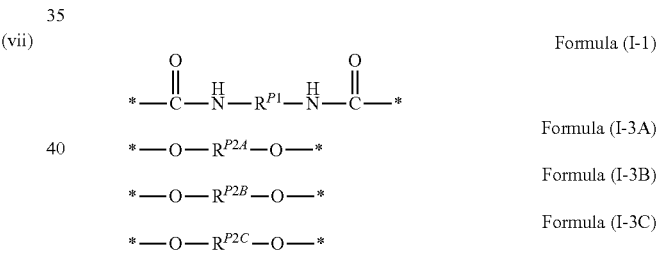

In Formula (I-1), $R^{P1}$ is as described above. In Formula (I-3A), $R^{P2A}$ represents a chain consisting of a hydrocarbon group having a low molecular weight (preferably an aliphatic hydrocarbon group), and it has, as a functional group, preferably at least one group selected from the group (I) of the functional group described later, more preferably a group containing an ether group or a carbonyl group or both thereof, and still more preferably a carboxy group in a case of a polymer that forms the binder A. Examples thereof include a bis(hydroxymethyl) acetic acid compound such as 2,2-bis(hydroxymethyl) butyric acid. In Formula (I-3B), $R^{P2B}$ represents a polyalkylene oxide chain. In Formula (I-3C), $R^{P2C}$ represents a hydrocarbon polymer chain. The chain consisting of a hydrocarbon group having a low molecular weight, which can be adopted as $R^{P2A}$, the polyalkylene oxide chain which can be adopted as $R^{P2C}$, and the hydrocarbon polymer chain which can be adopted as $R^{P2B}$ are respectively the same as the aliphatic hydrocarbon group, the polyalkylene oxide chain, and the hydrocarbon polymer chain, each of which can be adopted as $R^{P2}$ in Formula (I-3), and the same is applied to the preferred ones thereof.

The content of the constitutional component represented by each of the above formulae, in the polymer that constitutes a binder, will be described later.

The sequential polymerization type polymer may have a constitutional component other than the constitutional component represented by the above formulae. Such a constitutional component is not particularly limited as long as it can be subjected to sequential polymerization with a raw material compound from which the constitutional component represented by each of the above formulae is derived.

The (total) content of the constitutional components respectively represented by Formulae (I-1) to (I-6), in the sequential polymerization type polymer, is not particularly limited; however, it is preferably 5% to 100% by mass, more preferably 10% to 100% by mass, still more preferably 50% to 100% by mass, and even still more preferably 80% to 100% by mass. The upper limit value of the content may be, for example, 90% by mass or less regardless of the above 100% by mass.

The content of the constitutional component other than the constitutional component represented by each of the above formulae, in the sequential polymerization type polymer, is not particularly limited; however, it is preferably 50% by mass or less.

In a case where the sequential polymerization type polymer has a constitutional component represented by any of Formulae (I-1) to (I-6), the content thereof is not particularly limited and can be set in the following range.

That is, the content of the constitutional component represented by Formula (I-1) or Formula (I-2) or the constitutional component derived from the carboxylic acid dianhydride represented by Formula (I-5), in the sequential polymerization type polymer, is not particularly limited, and 10% to 50% by mole is preferable, 20% to 50% by mole is more preferable, and 30% to 50% by mole is still more preferable.

The content of the constitutional component represented by Formula (I-3), Formula (I-4), or Formula (I-6), in the sequential polymerization type polymer, is not particularly limited, and it is preferably 10% to 50% by mol, more preferably 20% to 50% by mole, and still more preferably 30% to 50% by mole.

Among the constitutional components represented by Formula (I-3) or Formula (I-4), the content of the constitutional component (for example, the constitutional component represented by Formula (I-3A)) in which $R^{P2}$ a chain consisting of a hydrocarbon group having a low molecular weight, in the sequential polymerization type polymer, is not particularly limited; however, for example, it is preferably 0% to 50% by mole, more preferably 1% to 30% by mole, still more preferably 2% to 20% by mole, and even still more preferably 4% to 10% by mole.

Among the constitutional components represented by Formula (I-3) or Formula (I-4), the content of the constitutional component (for example, the constitutional component represented by Formula (I-3B)) in which $R^2$ is the polyalkylene oxide chain as a molecular chain, in the sequential polymerization type polymer, is not particularly limited; however, for example, it is preferably 0% to 50% by mole, more preferably 10% to 45% by mole, and still more preferably 20% to 43% by mole.

In the constitutional components represented by Formula (I-3) or Formula (I-4), the content of the constitutional component (for example, the constitutional component represented by Formula (I-3C)) in which $R^{P2}$ is the above hydrocarbon polymer chain as a molecular chain, in the sequential polymerization type polymer, is not particularly limited; however, it is, for example, preferably 0% to 50% by mole, more preferably 1% to 45% by mole, still more preferably 3% to 40% by mole, even more preferably 3% to 30% by mole, even still more preferably 3% to 20% by mole, and even further still more 3% to 10% by mole.

It is noted that in a case where the sequential polymerization type polymer has a plurality of constitutional components represented by the respective formulae, the above-described content of each of the constitutional components is the total content.

The sequential polymerization type polymer can be synthesized with a known method by selecting a raw material compound depending on the kind of bond of the main chain and subjecting the raw material compound to polyaddition or polycondensation. As the synthesis method, for example, WO2018/151118A can be referred to.

Examples of the respective polymers of polyurethane, polyurea, polyamide, and polyimide which can be adopted as the sequential polymerization type polymer include, in addition to those synthesized in Examples, each of the polymers described in WO2018/020827A and WO2015/046313A and further include each of the polymers described in JP2015-088480A.

—Chain Polymerization Type Polymer—

The chain polymerization type polymer suitable as a polymer that forms a binder is a polymer obtained by subjecting one or more monomers having a non-aromatic carbon-carbon double bond to chain polymerization. Among the above, the fluorine-containing polymer, the hydrocarbon-based polymer, the vinyl polymer, or the (meth)acrylic polymer, which is described above, is preferable, and the (meth)acrylic polymer is more preferable.

Examples of the fluorine-containing polymer include polytetrafluoroethylene (PTFE), polyvinylene difluoride (PVdF), and a copolymer of polyvinylene difluoride and hexafluoropropylene (PVdF-HFP). In this copolymer, the copolymerization ratio [PVdF:HFP] (mass ratio) of PVdF to HFP is not particularly limited; however, it is preferably 9:1 to 5:5 and more preferably 9:1 to 7:3 in terms of dispersion stability.

Examples of the hydrocarbon-based polymer include polyethylene, polypropylene, natural rubber, polybutadiene, polyisoprene, polystyrene, a polystyrene butadiene copolymer, a styrene-based thermoplastic elastomer, polybutylene, an acrylonitrile butadiene copolymer, and hydrogen-added (hydrogenated) polymers thereof. The styrene-based thermoplastic elastomer or the hydride thereof is not particularly limited. However, examples thereof include a styrene-ethylene-butylene-styrene block copolymer (SEBS), a styrene-isoprene-styrene block copolymer (SIS), a hydrogenated SIS, a styrene-butadiene-styrene block copolymer (SBS), a hydrogenated SBS, a styrene-ethylene-ethylene-propylene-styrene block copolymer (SEEPS), a styrene-ethylene-propylene-styrene block copolymer (SEPS), a styrene-butadiene rubber (SBR), and a hydrogenated a styrene-butadiene rubber (HSBR). In the present invention, the hydrocarbon-based polymer preferably has no unsaturated group (for example, a 1,2-butadiene constitutional component) that is bonded to the main chain from the viewpoint that the formation of chemical crosslink can be suppressed.

Examples of the vinyl polymer include a polymer containing a vinyl monomer other than the (meth)acrylic compound (M1), where the content of the vinyl polymer is, for example, 50% by mole or more. Examples of the vinyl monomer include vinyl compounds described later. Specific examples of the vinyl polymer include polyvinyl alcohol, polyvinyl acetal, polyvinyl acetate, and a copolymer containing these.

In addition to the constitutional component derived from the vinyl monomer, this vinyl polymer preferably has a constitutional component derived from the (meth)acrylic compound (M1) that forms a (meth)acrylic polymer described later and further, a constitutional component (MM) derived from a macromonomer described later. The content of the constitutional component derived from the vinyl monomer is preferably the same as the content of the constitutional component derived from the (meth)acrylic compound (M1) in the (meth)acrylic polymer. The content of the constitutional component derived from the (meth) acrylic compound (M1) in the polymer is not particularly limited as long as it is less than 50% by mole; however, it is preferably 0% to 40% by mole and preferably 5% to 35% by mole. The content of the constitutional component (MM) in the polymer is preferably the same as the content in the (meth)acrylic polymer.

The (meth)acrylic polymer is preferably a polymer obtained by (co)polymerizing at least one (meta)acrylic compound (M1) selected from a (meth)acrylic acid compound, a (meth)acrylic acid ester compound, a (meth)acrylamide compound, or a (meth)acrylonitrile compound. Further, a (meth)acrylic polymer consisting of a copolymer of the (meth)acrylic compound (M1) and another polymerizable compound (M2) is also preferable. The other polymerizable compound (M2) is not particularly limited, and examples thereof include vinyl compounds such as a styrene compound, a vinyl naphthalene compound, a vinyl carbazole compound, an allyl compound, a vinyl ether compound, a vinyl ester compound, and a dialkyl itaconate compound. Examples of the vinyl compound include the "vinyl monomer" disclosed in JP2015-88486A.

The content of the other polymerizable compound (M2) in the (meth)acrylic polymer is not particularly limited; however, it can be, for example, less than 50% by mole.

The (meth)acrylic compound (M1) and the vinyl compound (M2), from which the constitutional component of the (meth)acrylic polymer is derived, are preferably a compound represented by Formula (b-1).

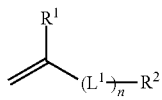

(b-1)

In the formula, $R^1$ represents a hydrogen atom, a hydroxy group, a cyano group, a halogen atom, an alkyl group (preferably having 1 to 24 carbon atoms, more preferably 1 to 12 carbon atoms, and particularly preferably 1 to 6 carbon atoms), an alkenyl group (preferably having 2 to 24 carbon atoms, more preferably 2 to 12 carbon atoms, and particularly preferably 2 to 6 carbon atoms), an alkynyl group (preferably having 2 to 24 carbon atoms, more preferably 2 to 12 carbon atoms, and particularly preferably 2 to 6 carbon atoms), or an aryl group (preferably having 6 to 22 carbon atoms and more preferably 6 to 14 carbon atoms). Among the above, a hydrogen atom or an alkyl group is preferable, and a hydrogen atom or a methyl group is more preferable.

$R^2$ represents a hydrogen atom or a substituent. The substituent that can be adopted as $R^2$ is not particularly limited. However, examples thereof include an alkyl group (preferably having 1 to 30 carbon atoms, more preferably 1 to 24 carbon atoms, and particularly preferably 1 to 12 chains, and preferably a linear chain although it may be a branch chain), an alkenyl group (preferably having 2 to 12 carbon atoms and more preferably 2 to 6 carbon atoms), an aryl group (preferably having 6 to 22 carbon atoms and more preferably 6 to 14 carbon atoms), an aralkyl group (preferably having 7 to 23 carbon atoms and more preferably 7 to 15 carbon atoms), a cyano group, a hydroxy group, a sulfanyl group, and an aliphatic heterocyclic group containing an oxygen atom (preferably having 2 to 12 carbon atoms and more preferably 2 to 6 carbon atoms).

The aliphatic heterocyclic group containing an oxygen atom is preferably an epoxy group-containing group, an oxetane group-containing group, a tetrahydrofuryl group-containing group, or the like is preferable.

$L^1$ is a linking group and is not particularly limited. However, examples thereof include an alkylene group having 1 to 6 carbon atoms (preferably 1 to 3 carbon atoms), an alkenylene group having 2 to 6 carbon atoms (preferably 2 or 3 carbon atoms), an arylene group having 6 to 24 carbon atoms (preferably 6 to 10 carbon atoms), an oxygen atom, a sulfur atom, an imino group (—$NR^N$—), a carbonyl group, and a phosphoric acid linking group (—O—P(OH)(O)—O—), a phosphonic acid linking group (—P(OH)(O)—O—), and a group involved in the combination thereof, and a —CO—O— group or a —CO—N($R^N$)— group ($R^N$ is as described above) is preferable. The above linking group may have any substituent. The number of atoms constituting the linking group and the number of linking atoms are as described later. Examples of any substituent include a substituent Z described later, and examples thereof include an alkyl group and a halogen atom.

n is 0 or 1 and preferably 1. However, in a case where-$(L^1)_n$-$R^2$ represents one kind of substituent (for example, an alkyl group), n is set to 0, and $R^2$ is set to a substituent (an alkyl group).

The (meth)acrylic compound (M1) is preferably a compound represented by Formula (b-2) or (b-3).

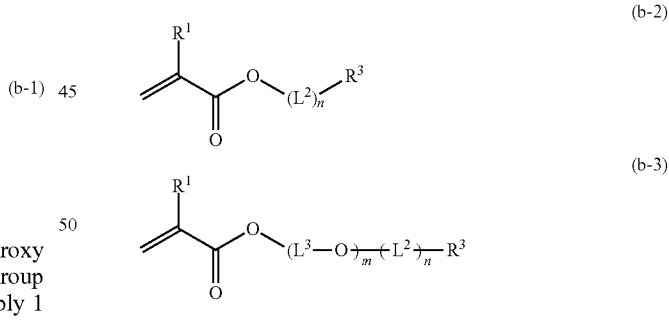

$R^1$ and n are synonymous with Formula (b-1).
$R^3$ is synonymous with $R^2$.
$L^2$ is a linking group and is synonymous with the above $L^1$.
$L^3$ is a linking group and is synonymous with the above $L^1$; however, it is preferably an alkylene group having 1 to 6 carbon atoms (preferably 1 to 3).

m is an integer of 1 to 200, and it is preferably an integer of 1 to 100 and more preferably an integer of 1 to 50.

In Formulae (b-1) to (b-3), the carbon atom which forms a polymerizable group and to which $R^1$ is not bonded is represented as an unsubstituted carbon atom ($H_2C=$); however, it may have a substituent. The substituent is not particularly limited, and examples thereof include the above group that can be adopted as $R^1$.

Further, in Formulae (b-1) to (b-3), the group which may adopt a substituent such as an alkyl group, an aryl group, an alkylene group, or an arylene group may have a substituent within a range in which the effects of the present invention are not impaired. Examples of the substituent include a substituent selected from the substituent Z and the group (I) of the functional group, which will be described later. Specific examples thereof include a halogen atom, a hydroxy group, a sulfanyl group, an acyl group, an acyloxy group, an alkoxy group, an aryloxy group, an aryloyl group, and an aryloyloxy group.

In a case where the polymer that constitutes a binder is a chain polymerization type polymer, preferably an addition polymerization type polymer, it is preferable for the polymer to have a constitutional component (MM) derived from a macromonomer having a mass average molecular weight of 1,000 or more.

The mass average molecular weight of the macromonomer (according to the above measurement method) is preferably 2,000 or more, and more preferably 3,000 or more. The upper limit thereof is preferably 500,000 or less, more preferably 100,000 or less, and particularly preferably 30,000 or less. In a case where the polymer that constitutes a binder has a constitutional component (MM) derived from a macromonomer having a mass average molecular weight in the above range, it can be more uniformly dispersed in an organic solvent, particularly a non-polar solvent. The mass average molecular weight of the constitutional component (MM) can be specified by measuring the mass average molecular weight of the macromonomer that is incorporated when synthesizing the polymer that constitutes a binder.

The SP value of the macromonomer is not particularly limited; however, it is preferably 10 or less and more preferably 9.5 or less. The lower limit is not particularly limited; however, it is practically 5 or more. The SP value is an indicator that indicates a property of being dispersed in an organic solvent. Here, in a case where the macromonomer is set to have a specific molecular weight or more and preferably to have the SP value or more, it is possible to improve the binding property to the solid particle, whereby it is possible to increase the affinity to the solvent, which enables the stable dispersion.

—Definition of SP Value—

In the present invention, the SP value is determined according to the Hoy method unless otherwise specified (refer to H. L. Hoy JOURNAL OF PAINT TECHNOLOGY, Vol. 42, No. 541, 1970, 76-118, and POLYMER HANDBOOK 4$^{th}$, Chapter 59, VII, page 686, Table 5, Table 6, and the following formula in Table 6). In addition, the SP value is shown with the unit being omitted; however, the unit thereof is $cal^{1/2}$ $cm^{3/2}$. The SP value of the constitutional component (MM) is almost the same as the SP value of the macromonomer, with which the evaluation may be carried out.

In the present invention, in a case where SP values of repeating units that constitutes a polymer are respectively denoted by, $SP_1$, $SP_2$, . . . , and mass fractions of the repeating units are denoted by $W_1$, $W_2$, . . . , the SP value ($SP_P$) of the polymer is set to a value calculated according to the following expression.

$$SP_P^2 = (SP_1^2 \times (SP_2^2 \times W_2) + \ldots$$

$$\delta_t = \frac{F_t + \frac{B}{\overline{n}}}{V} : B = 277$$

In the expression, $\delta_t$ indicates an SP value. Ft is a molar attraction function×cm$^3$)$^{1/2}$/mol and represented by the following expression. V is a molar volume (cm$^3$/mol; and represented by the following expression. is represented by the following expression.

$$F_t = \sum n_i F_{t,i}$$

$$V = \sum n_i V_i$$

$$\overline{n} = \frac{0.5}{\Delta_T^{(P)}}$$

$$\Delta_T^{(P)} = \Sigma n_i \Delta_{T,i}^{(P)}$$

In the above formula. $F_{t,i}$ indicates a molar attraction function of each constitutional unit, $V_i$ indicates a molar volume of each constitutional unit, $\Delta^{(P)}_{T,i}$ indicates a correction value of each constitutional unit, and $n_i$ indicates the number of each constitutional unit.

The macromonomer is not particularly limited as long as it has a mass average molecular weight of 1,000 or more; however, it is preferably a macromonomer having a polymerized chain bonded to a polymerizable group such as a group having an ethylenically unsaturated bond. The polymerized chain of the macromonomer constitutes a side chain (a graft chain) with respect to the main chain of the polymer.

The above-described polymerized chain has a function of further improving the dispersibility in an organic solvent. This makes it possible to achieve both the suppression of interfacial resistance between solid particles and the improvement of binding property.

The polymerizable group contained in the macromonomer is not particularly limited. The details thereof will be described later, and examples thereof include various vinyl groups and (meth)acryloyl groups, and a (meth)acryloyl group is preferable.

The polymerized chain contained in the macromonomer is not particularly limited and a general polymer component can be applied. Examples thereof include a (meth)acrylic resin chain, a polyvinyl resin chain, a polysiloxane chain, a polyalkylene ether chain, and a hydrocarbon chain, and a (meth)acrylic resin chain or a polysiloxane chain is preferable.

The (meth)acrylic resin chain preferably contains a constitutional component derived from a (meth)acrylic compound selected from a (meth)acrylic acid compound, a (meth)acrylic acid ester compound, and a (meth)acrylonitrile compound, and it may be a polymer of two or more kinds of (meth)acrylic compounds. The (meth)acrylic compound is synonymous with the above (meth)acrylic compound (M1). The polysiloxane chain is not particularly limited; however, examples thereof include a siloxane polymer having an alkyl group or an aryl group. Examples of the hydrocarbon chain include the chain consisting of the hydrocarbon-based polymer described above.

The above macromonomer preferably has a polymerizable group represented by Formula (b-11). In the following formula, $R^{11}$ is synonymous with $R^1$. * is a bonding position.

(b-11)

The macromonomer preferably has a linking group that links the polymerizable group and the polymerized chain. This linking group is generally incorporated into the side chain of the macromonomer. The linking group is not particularly limited; however, examples thereof include the group described in the linking group $L^1$ in Formula (b-1).

In the present invention, the number of atoms that constitute the linking group is preferably 1 to 36, more preferably 1 to 24, still more preferably 1 to 12, and particularly preferably 1 to 6. The number of linking atoms of the linking group is preferably 10 or less and more preferably 8 or less. The lower limit thereof is 1 or more. The number of linking atoms refers to the minimum number of atoms linking predetermined structural parts. For example, in a case of —CH$_2$—C(=O)—O—, the number of atoms constituting the linking group is 6; however, the number of linking atoms is 3.

The above macromonomer preferably has a polymerizable site represented by any of Formulae (b-12a) to (b-12c).

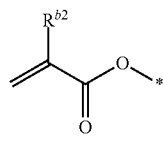
(b-12a)

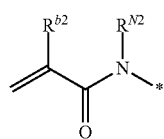
(b-12b)

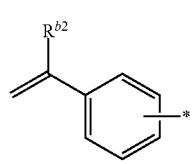
(b-12c)

$R^{b2}$ is synonymous with $R^1$. * is a bonding position. $R^{N2}$ is synonymous with $R^{N1}$ described later. Any substituent Z may be substituted on the benzene ring of the formula (b-12c).

The structural part that is present at the end of the bonding position of * is not particularly limited as long as it satisfies the molecular weight as a macromonomer; however, it is preferably the above-described polymerized chain (which may be preferably bonded through a linking group) is preferable. Here, the linking group and the polymerized chain may each have the substituent Z, for example, a halogen atom (a fluorine atom) or the like.

In the polymerizable group represented by Formula (b-11) and the polymerizable site represented by any one of Formulae (b-12a) to (b-12c), the carbon atom which forms a polymerizable group and to which $R^{11}$ and $R^{b2}$ are not bonded is represented as an unsubstituted carbon atom; however, it may have a substituent as described above. The substituent is not particularly limited, and examples thereof include the above group that can be adopted as $R^1$.

The above macromonomer is preferably a compound represented by Formula (b-13a).

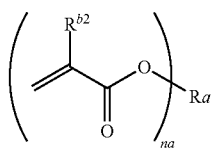
(b-13a)

$R^{b2}$ is synonymous with $R^1$.

na is not particularly limited; however, it is preferably an integer of 1 to 6, more preferably 1 or 2, and still more preferably 1.

Ra represents a substituent in a case where na is 1 and represents a linking group in a case where na is 2 or more.

The substituent that can be adopted as Ra is not particularly limited; however, the above-described polymerized chain is preferable, and the (meth)acrylic resin chain or the polysiloxane chain is more preferable.

Ra may be directly bonded to the oxygen atom (—O—) in Formula (b-13a) or may be bonded through a linking group. The linking group is not particularly limited; however, examples thereof include the above-described linking group that links the polymerizable group and the polymerized chain.

In a case where Ra is a linking group, the linking group is not particularly limited. However, it represents, for example, an alkane linking group having 1 to 30 carbon atoms, a cycloalkane linking group having 3 to 12 carbon atoms, an aryl linking group having 6 to 24 carbon atoms, a heteroaryl linking group with 3 to 12 carbon atoms, an ether group, a sulfide group, a phosphinidene group (—PR—: R represents a hydrogen atom or an alkyl group having 1 to 6 carbon atoms), a silylene group (—Si($R^{Si}$)$_2$—: $R^{Si}$ represents a hydrogen atom or an alkyl group having 1 to 6 carbon atoms), a carbonyl group, an imino group (—$NR^{N1}$—: $R^{N1}$ represents a hydrogen atom or a substituent and it is preferably a hydrogen atom, an alkyl group having 1 to 6 carbon atoms, or an aryl group having 6 to 10 carbon atoms), or a combination thereof.

Examples of the macromonomer other than the above-described macromonomer include the "macromonomer (X)" described in JP2015-88486A.

The (meth)acrylic polymer can contain a constitutional component derived from the (meth)acrylic compound (M1), a constitutional component derived from the vinyl compound (M2), a constitutional component derived from the constitutional component (MM), and another constitutional component that is copolymerizable with a compound from which these constitutional components are derived, and it is preferable that the (meth)acrylic polymer contains a constitutional component derived from the (meth)acrylic compound (M1) and further, a constitutional component (MM) derived from a macromonomer. It may contain a constitutional component derived from the vinyl compound (M2) and another constitutional component.

The content of the constitutional component derived from the (meth)acrylic compound (M1) in the (meth)acrylic polymer is not particularly limited; however, it is preferably 1% to 99.9% by mole, preferably 5% to 99% by mole, and particularly preferably 10% to 99% by mole.

The content of the constitutional component (MM) in the (meth)acrylic polymer is not particularly limited; however, it is preferably 0% to 60% by mole, more preferably 0.2% to 50% by mole, and still more preferably 0.5% to 40% by mole. In a case where the content is in the above range, the dispersibility of the inorganic solid electrolyte-containing composition, the binding property between solid particles, and the ion conductivity can be exhibited at a high level.

The content of the constitutional component derived from the vinyl compound (M2) in the (meth)acrylic polymer is not particularly limited; however, it is preferably 0% to 30% by mole, preferably 0% to 20% by mole, and particularly preferably 0% to 10% by mole.

In a case where the (meth)acrylic polymer has a functional group described later, any one of the above-described constitutional components may have a functional group, and the content of the constitutional component having a functional group is as described later, provided that the above-described content is satisfied as well.

—Functional Group—

The polymer that forms a binder preferably has a functional group for increasing the wettability or adsorptivity to the surface of the solid particle such as the inorganic solid electrolyte, particularly in a case of being applied as the polymer that forms the binder A. Examples of such a functional group include a group that exhibits a physical interaction such as hydrogen bonding on the surface of the solid particle and a group capable of forming a chemical bond with a group that is present on the surface of the solid particle, and specifically, it is more preferable to include at least one group selected from the following group (I) of the functional group. However, from the viewpoint of more effectively exhibiting the wettability or adsorptivity of the solid particle to the surface, it is preferable not to include two or more groups capable of forming a bond between the functional groups.

<Group (I) of Functional Group>

A carboxy group, a sulfonic acid group ($-SO_3H$), a phosphate group ($-PO_4H_2$), an amino group ($-NH_2$), a hydroxy group, a sulfanyl group, an isocyanato group, an alkoxysilyl group, and a group having a fused-ring structure of 3 or more rings The sulfonic acid group and the phosphoric acid group may be a salt thereof, and examples thereof include a sodium salt and a calcium salt.

The alkoxysilyl group may be a silyl group in which a Si atom is substituted with at least one alkoxy group (preferably having 1 to 12 carbon atoms), and another substituent on the Si atom include an alkyl group, an aryl group, and the like. As the alkoxysilyl group, for example, the description for the alkoxysilyl group in the substituent Z described later can be preferably applied.

The group having a fused-ring structure of 3 or more rings is preferably a group having a cholesterol ring structure or a group having a fused-ring structure of 3 or more aromatic rings, and a cholesterol residue or a pyrenyl group is more preferable.

The carboxy group, the sulfonic acid group ($-SO_3H$), the phosphoric acid group ($-PO_4H_2$), the hydroxy group, and the alkoxysilyl group have high adsorptivity to the inorganic solid electrolyte or the positive electrode active material, and the group having a fused-ring structure of 3 or more rings has high adsorptivity to the negative electrode active material or the like. The amino group ($-NH_2$), the sulfanyl group, and the isocyanato group have high adsorptivity to the inorganic solid electrolyte.

The polymer that forms a binder may have a functional group selected from the group (I) of the functional group in any one of the constitutional components that form a polymer and in any one of the main chain or the side chain of the polymer.

The content of the functional group selected from the group (I) of the functional group, in the polymer that forms the binder A, is not particularly limited. However, In all of the constitutional components that constitute a polymer that forms a binder, the proportion of the constitutional component having a functional group selected from the group (I) of the functional group is preferably 0.01% to 50% by mole, more preferably 0.02% to 49% by mole, still more preferably 0.1% to 40% by mole, even still more preferably 1% to 30% by mole, and particularly preferably 3% to 25% by mole.

On the other hand, in a case of being applied as a polymer that forms the binder B, the polymer that forms a binder may have or may not have the above functional group as long as it satisfies the adsorption rate in the above range. The content of the functional group selected from the group (I) of the functional group, in the polymer that forms the binder B, is not particularly limited. However, in all of the constitutional components that constitute a polymer that forms a binder, the proportion of the constitutional component having a functional group selected from the group (I) of the functional group is preferably 20% by mole or less, more preferably 5% by mole or less, still more preferably 1% by mole or less, and even still more preferably 0.7% by mole or less.

The polymer (each constitutional component and raw material compound) that forms a binder may have a substituent. The substituent is not particularly limited; however, examples thereof preferably include a group selected from the following substituent Z.

—Substituent Z—

The examples are an alkyl group (preferably an alkyl group having 1 to 20 carbon atoms, for example, methyl, ethyl, isopropyl, t-butyl, pentyl, heptyl, 1-ethylpentyl, benzyl, 2-ethoxyethyl, and 1-carboxymethyl), an alkenyl group (preferably an alkenyl group having 2 to 20 carbon atoms, such as vinyl, allyl, andoleyl), an alkynyl group (preferably an alkynyl group having 2 to 20 carbon atoms, for example, ethynyl, butadynyl, and phenylethynyl), a cycloalkyl group (preferably a cycloalkyl group having 3 to 20 carbon atoms, such as cyclopropyl, cyclopentyl, cyclohexyl, and 4-methylcyclohexyl; in the present specification, the alkyl group generally has a meaning including a cycloalkyl group therein when being referred to, however, it will be described separately here), an aryl group (preferably an aryl group having 6 to 26 carbon atoms, such as phenyl, 1-naphthyl, 4-methoxyphenyl, 2-chlorophenyl, and 3-methylphenyl), an aralkyl group (preferably having 7 to 23 carbon atoms, for example, benzyl or phenethyl), and a heterocyclic group (preferably a heterocyclic group having 2 to 20 carbon atoms and more preferably a 5- or 6-membered heterocyclic group having at least one oxygen atom, one sulfur atom, or one nitrogen atom. The heterocyclic group includes an aromatic heterocyclic group and an aliphatic heterocyclic group. Examples there of include a tetrahydropyran ring group, a tetrahydrofuran ring group, a 2-pyridyl group, a 4-pyridyl group, a 2-imidazolyl group, a 2-benzimidazolyl group, a 2-thiazolyl group, a 2-oxazolyl group, or a pyrrolidone group); an alkoxy group (preferably an alkoxy group having 1 to 20 carbon atoms, for example, a methoxy group, an ethoxy group, an isopropyloxy group, or a benzyloxy group); an aryloxy group (preferably an aryloxy group having 6 to 26 carbon atoms, for example, a phenoxy group, a 1-naphthyloxy group, a 3-methylphenoxy group, or a 4-methoxyphenoxy group; in the present specification, the aryloxy group has a meaning including an aryloyloxy group therein when being referred to); a heterocyclic oxy group (a group in which an —O— group is bonded to the above-described heterocyclic group), an alkoxycarbonyl group (preferably an alkoxycarbonyl group having 2 to 20 carbon atoms, for example, an ethoxycarbonyl group, a 2-ethylhexyloxycarbonyl group, or a dodecyloxycarbonyl group); an aryloxycarbonyl group (preferably an aryloxycarbonyl group having 6 to 26 carbon atoms, for example, a phenoxycarbonyl group, a 1-naphthyloxycarbonyl group, a 3-methylphenoxycarbonyl group, or a 4-methoxyphenoxycarbonyl group); an amino group (preferably an amino group having 0 to 20 carbon atoms, an alkylamino group, or an arylamino group, for example, an amino (—$NH_2$) group, an N,N-dimethylamino group, an N,N-diethylamino group, an N-ethylamino group, or an anilino group); a sulfamoyl group (preferably a sulfamoyl group having 0 to 20 carbon atoms, for example, an N,N-dimethylsulfamoyl group or an N-phenylsufamoyl group); an acyl group (an alkylcarbonyl group, an alkenylcarbonyl group, an alkynylcarbonyl group, an arylcarbonyl group, or a heterocyclic carbonyl group, preferably an acyl group having 1 to 20 carbon atoms, for example, an acetyl group, a propionyl group, a butyryl group, an octanoyl group, a hexadecanoyl group, an acryloyl group, a methacryloyl group, a crotonoyl group, a benzoyl group, a naphthoyl group, or a nicotinoyl group); an acyloxy group (an alkylcarbonyloxy group, an alkenylcarbonyloxy group, an alkynylcarbonyloxy group, an arylcarbonyloxy group, or a heterocyclic carbonyloxy group, preferably an acyloxy group having 1 to 20 carbon atoms, for example, an acetyloxy group, a propionyloxy group, a butyryloxy group, an octanoyloxy group, a hexadecanoyloxy group, an acryloyloxy group, a methacryloyloxy group, a crotonoyloxy group, a benzoyloxy group, a naphthoyloxy group, or a nicotinoyloxy group); an aryloyloxy group (preferably an aryloyloxy group having 7 to 23 carbon atoms, for example, a benzoyloxy group); a carbamoyl group (preferably a carbamoyl group having 1 to 20 carbon atoms, for example, an N,N-dimethylcarbamoyl group or an N-phenylcarbamoyl group); an acylamino group (preferably an acylamino group having 1 to 20 carbon atoms, for example, an acetylamino group or a benzoylamino group); an alkylthio group (preferably an alkylthio group having 1 to 20 carbon atoms, for example, a methylthio group, an ethylthio group, an isopropylthio group, or a benzylthio group); an arylthio group (preferably an arylthio group having 6 to 26 carbon atoms, for example, a phenylthio group, a 1-naphthylthio group, a 3-methylphenylthio group, or a 4-methoxyphenylthio group); a heterocyclic thio group (a group in which an —S— group is bonded to the above-described heterocyclic group), an alkylsulfonyl group (preferably an alkylsulfonyl group having 1 to 20 carbon atoms, for example, a methylsulfonyl group or an ethylsulfonyl group), an arylsulfonyl group (preferably an arylsulfonyl group having 6 to 22 carbon atoms, for example, a benzenesulfonyl group), an alkylsilyl group (preferably an alkylsilyl group having 1 to 20 carbon atoms, for example, a monomethylsilyl group, a dimethylsilyl group, a trimethylsilyl group, or a triethylsilyl group); an arylsilyl group (preferably an arylsilyl group having 6 to 42 carbon atoms, for example, a triphenylsilyl group), an alkoxysilyl group (preferably an alkoxysilyl group having 1 to 20 carbon atoms, for example, a monomethoxysilyl group, a dimethoxysilyl group, a trimethoxysilyl group, or a triethoxysilyl group), an aryloxysilyl group (preferably an aryloxy group having 6 to 42 carbon atoms, for example, a triphenyloxysilyl group), a phosphoryl group (preferably a phosphate group having 0 to 20 carbon atoms, for example, —OP(=O)($R^P$)$_2$), a phosphonyl group (preferably a phosphonyl group having 0 to 20 carbon atoms, for example, —P(=O)($R^P$)$_2$), a phosphinyl group (preferably a phosphinyl group having 0 to 20 carbon atoms, for example, —P($R^P$)$_2$), a sulfo group (a sulfonate group), a hydroxy group, a sulfanyl group, a cyano group, and a halogen atom (for example, a fluorine atom, a chlorine atom, a bromine atom, or an iodine atom). $R^P$ represents a hydrogen atom or a substituent (preferably a group selected from the substituent Z).

In addition, each group exemplified in the substituent Z may be further substituted with the substituent Z.

The alkyl group, the alkylene group, the alkenyl group, the alkenylene group, the alkynyl group, the alkynylene group, and/or the like may be cyclic or chained, may be linear or branched.

(Physical Properties, Characteristics, or the Like of Binder or Polymer that Forms Binder)

The polymer that forms a binder may be a non-crosslinked polymer or a crosslinked polymer. Further, in a case where the crosslinking of the polymer proceeds by heating or application of a voltage, the molecular weight may be larger than the above molecular weight. Preferably, the polymer has a mass average molecular weight in the above range at the start of use of the all-solid state secondary battery.

The binder (the polymer) may be soluble in an organic solvent or may be insoluble (particles) in an organic solvent.

In the present invention, "insoluble in an organic solvent" means that the solubility in a non-polar solvent calculated according to the method described in Examples is 1% by mass or less, and "soluble in an organic solvent" means that the solubility in a non-polar solvent calculated according to the method described in Examples is more than 1% by mass and preferably 2% by mass or more.

In the inorganic solid electrolyte-containing composition, the binder may be present, for example, dissolvedly in an organic solvent (the binder present dissolvedly is referred to as a soluble type binder), and may be present non-dissolvedly in an organic solvent and present in a solid state (preferably in a dispersed state) (the binder present in a solid state is referred to as a particulate binder).

In the present invention, it is preferable for the binder A to be a particulate binder in the inorganic solid electrolyte-containing composition, and furthermore in the solid electrolyte layer or the active material layer (the coated and dried layer), in terms of dispersibility and battery characteristics, and furthermore, in terms of battery resistance. On the other hand, it is preferable for the binder B to be a soluble type binder in the inorganic solid electrolyte-containing composition in terms of dispersibility.

In a case where the binder is a particulate binder, the shape thereof is not particularly limited and may be a flat shape, an amorphous shape, or the like; however, a spherical shape or a granular shape is preferable. The particle diameter of the particulate binder is not particularly limited; however, it is preferably 1,000 nm or less, more preferably 500 nm or less, and still more preferably 300 nm or less. The lower limit thereof is 1 nm or more, and it is preferably 5 nm or more, more preferably 10 nm or more, and still more preferably 50 nm or more. The average particle diameter of the particulate binder can be measured using the same method as that of the average particle diameter of the inorganic solid electrolyte.

The particle diameter of the particulate binder in the constitutional layer of the all-solid state secondary battery is measured, for example, by disassembling the battery to peel off the constitutional layer containing the particulate binder, subsequently subjecting the constitutional layer to measurement, and excluding the measured value of the particle diameter of particles other than the particulate binder, which has been measured in advance.

The particle diameter of the particulate binder can be adjusted, for example, with the kind of the organic solvent and the content and the content of the constitutional component in the polymer, and the content of the particulate binder.

The water concentration of the binder (the polymer) is preferably 100 ppm (mass basis) or less. Further, as this binder, a polymer may be crystallized and dried, or a binder dispersion liquid may be used as it is.

The polymer that forms a binder is preferably noncrystalline. In the present invention, the description that a polymer is "noncrystalline" typically refers to that no endothermic peak due to crystal melting is observed when the measurement is carried out at the glass transition temperature.

The mass average molecular weight of the polymer that forms a binder is not particularly limited. It is, for example, 15,000 or more, and it is more preferably 30,000 or more and still more preferably 50,000 or more. The upper limit thereof is practically 5,000,000 or less, and it is preferably 4,000,000 or less and more preferably 3,000,000 or less.

The mass average molecular weight of the polymer that forms the binder B is not particularly limited but is preferably in the above range. However, it is, among the above range, more preferably 20,000 to 5,000,000, still more preferably, 50,000 to 4,000,000, and particularly preferably 200,000 to 3,000,000, in terms of dispersibility and binding property.

—Measurement of Molecular Weight—

In the present invention, unless specified otherwise, molecular weights of a polymer chain and a macromonomer refer to a mass average molecular weight and number average molecular weight in terms of standard polystyrene equivalent, determined by gel permeation chromatography (GPC). Regarding the measurement method thereof, basically, a value measured using a method under Conditions 1 or Conditions 2 (preferable) described below is employed. However, depending on the kind of polymer or macromonomer, an appropriate eluent may be appropriately selected and used.

(Conditions 1)
 Column: Connect two TOSOH TSKgel Super AWM-H (trade name, manufactured by Tosoh Co., Ltd.)
 Carrier: 10 mM LiBr/N-methylpyrrolidone
 Measurement temperature: 40° C.
 Carrier flow rate: 1.0 ml/min
 Sample concentration: 0.1% by mass
 Detector: refractive indicator (RI) detector (Conditions 2)
 Column: A column obtained by connecting TOSOH TSKgel Super HZM-H, TOSOH TSKgel Super HZ4000, and TOSOH TSKgel Super HZ2000 (all of which are trade names, manufactured by Tosoh Corporation)
 Carrier: tetrahydrofuran
 Measurement temperature: 40° C.
 Carrier flow rate: 1.0 ml/min
 Sample concentration: 0.1% by mass
 Detector: refractive indicator (RI) detector Specific examples of the polymer that forms a binder include those synthesized in Examples; however, the present invention is not limited thereto.

<Organic Solvent>

The inorganic solid electrolyte-containing composition according to the embodiment of the present invention contains an organic solvent as a dispersion medium for dispersing or dissolving each of the above components.

The organic solvent may be an organic compound that is in a liquid state in the use environment, examples thereof include various organic solvents, and specific examples thereof include an alcohol compound, an ether compound, an amide compound, an amine compound, a ketone compound, an aromatic compound, an aliphatic compound, a nitrile compound, and an ester compound.

The organic solvent may be a non-polar organic solvent (a hydrophobic organic solvent) or a polar organic solvent (a hydrophilic organic solvent); however, a non-polar organic solvent is preferable from the viewpoint that excellent dispersibility can be exhibited. The non-polar organic solvent generally refers to a solvent having a property of a low affinity to water; however, in the present invention, it is preferably an organic solvent having a C log P value of 1.5 to 6, and examples thereof include an ester compound, a ketone compound, an ether compound, an aromatic compound, and an aliphatic compound.

Examples of the alcohol compound include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of the ether compound include an alkylene glycol (triethylene glycol or the like), an alkylene glycol monoalkyl ether (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, dipropylene glycol monomethyl ether, tripropylene glycol monomethyl ether, diethylene glycol monobutyl ether, or the like), alkylene glycol dialkyl ether (ethylene glycol dimethyl ether glycol or the like), a dialkyl ether (dimethyl ether, diethyl ether, diisopropyl ether, dibutyl ether, or the like), and a cyclic ether (tetrahydrofuran, dioxane (including 1,2-, 1,3- or 1,4-isomer), or the like).

Examples of the amide compound include N,N-dimethylformamide, N-methyl-2-pyrrolidone, 2-pyrrolidinone, 1,3-dimethyl-2-imidazolidinone, 8-caprolactam, formamide, N-methylformamide, acetamide, N-methylacetamide, N,N-dimethylacetamide, N-methylpropanamide, and hexamethylphosphoric amide.

Examples of the amine compound include triethylamine, diisopropylethylamine, and tributylamine.

Examples of the ketone compound include acetone, methyl ethyl ketone, methyl isobutyl ketone (MIBK), cyclopentanone, cyclohexanone, cycloheptanone, dipropyl ketone, dibutyl ketone, diisopropyl ketone, diisobutyl ketone (DIBK), isobutyl propyl ketone, sec-butyl propyl ketone, pentyl propyl ketone, and butyl propyl ketone.

Examples of the aromatic compound include benzene, toluene, and xylene.

Examples of the aliphatic compound include hexane, heptane, octane, decane, cyclohexane, methylcyclohexane, ethylcyclohexane, cyclooctane, decalin, paraffin, gasoline, naphtha, kerosene, and light oil.

Examples of the nitrile compound include acetonitrile, propionitrile, and isobutyronitrile.

Examples of the ester compound include ethyl acetate, butyl acetate, propyl acetate, propyl butyrate, isopropyl butyrate, butyl butyrate, isobutyl butyrate, butyl pentanoate, ethyl isobutyrate, propyl isobutyrate, isopropyl isobutyrate, isobutyl isobutyrate, propyl pivalate, isopropyl pivalate, butyl pivalate, and isobutyl pivalate.

In the present invention, among them, an ether compound, a ketone compound, an aromatic compound, an aliphatic compound, or an ester compound is preferable, and an ester compound, a ketone compound, or an ether compound is more preferable.

One kind of the organic solvent may be contained alone; however, two or more kinds thereof are preferably contained from the viewpoint of initial dispersibility and particularly dispersion stability. The number of kinds of organic solvent contained in the inorganic solid electrolyte-containing composition is more preferably 2 to 4 and still more preferably 2 or 3. In a case where the organic solvent is composed of two or more kinds of compounds (organic solvents), the combination thereof is not particularly limited; however, it is preferable that the organic solvents are compatible with each other without being phase-separated.

For example, one of the preferred aspects thereof includes a hydrocarbon compound. The hydrocarbon compound is a compound composed of a hydrocarbon among the above-described aromatic compounds and aliphatic compounds. In this aspect, the proportion of the hydrocarbon compound in the organic solvent is preferably 25% by mass or more, more preferably 50% by mass or more, still more preferably 60% by mass or more, even still more preferably 70% by mass or more, particularly preferably 80% by mass or more, and most preferably 90% by mass or more. One of the preferable aspects is an aspect in which the organic solvent consists of a hydrocarbon compound.

The number of carbon atoms of the compound that constitutes the organic solvent is not particularly limited, and it is preferably 2 to 30, more preferably 4 to 20, still more preferably 6 to 15, and particularly preferably 7 to 12.

The compound that constitutes the organic solvent preferably has a C Log P value of 1 or more, more preferably 1.5 or more, still more preferably 2 or more, and particularly preferably 3 or more. The upper limit thereof is not particularly limited; however, it is practically 10 or less and preferably 6 or less.

In the present invention, the C Log P value is a value obtained by calculating the common logarithm Log P of the partition coefficient P between 1-octanol and water. Known methods and software can be used for calculating the C Log P value. However, unless otherwise specified, a value calculated from a structure that is drawn by using ChemDraw of PerkinElmer, Inc. is used.

In a case where two or more kinds of organic solvents are contained, the C log P value of the organic solvent is the sum of the products of the C log P values and the mass fractions of the respective organic solvents.

Examples of such organic solvents among those described above include toluene (C Log P=2.5), xylene (C log P=3.12), hexane (C Log P=3.9), heptane (Hep, C Log P=4.4), Octane (C Log P=4.9), cyclohexane (C Log P=3.4), cyclooctane (C Log P=4.5), decalin (C Log P=4.8), diisobutyl ketone (DIBK, C Log P=3.0), dibutyl ether (DBE, C Log P=2.57), butyl butyrate (C Log P=2.8), tributylamine (C Log P=4.8), methyl isobutyl ketone (MIBK, C log P=1.31), and ethylcyclohexane (ECH), C log P=3.4).

In the present invention, one of the preferred aspects of the organic solvent is an aspect in which at least one organic solvent B having a C log P value of 1.5 or more and less than 3 is contained. This makes it possible to further improve initial dispersibility and particularly dispersion stability and furthermore, makes it possible to suppress the decomposition (the deterioration) of the inorganic solid electrolyte. As such an organic solvent B, a solvent that satisfies the C log P value can be appropriately selected from the above compounds, and examples thereof include DBE and butyl butyrate.

The proportion of the organic solvent B in the organic solvent is preferably 10% by mass or more, more preferably 20% by mass or more, still more preferably 30% by mass or more, and even still more preferably 50% by mass or more. The upper limit value thereof is not particularly limited, and it may be 100% by mass, preferably 99.9% by mass or less, and more preferably 99% by mass or less.

In the present invention, it is preferable that the organic solvent contains at least one organic solvent A having a C log P value of 3 or more and less than 6 and an organic solvent B having a C log P value of 1.5 or more and less than 3 in terms of the improvement of initial dispersibility and particularly dispersion stability, and furthermore, in terms of the suppression of deterioration of the inorganic solid electrolyte.

As the organic solvent A, a solvent that satisfies the C log P value can be appropriately selected from the above compounds, and a non-polar solvent, specifically, an ester compound, a ketone compound, an ether compound, or the like is preferable. The organic solvent B is as described above.

The C log P value of the solvent, as a whole, containing the organic solvent A and the organic solvent B is not particularly limited; however, it is synonymous with the C log P value of the compound that constitutes the organic solvent, and the same applies to the preferred range.

The proportion of the organic solvent A in the organic solvent is preferably 0.1% by mass or more, more preferably 0.5% by mass or more, still more preferably 1% by mass or more, and even still more preferably 5% by mass or more. The upper limit value thereof is not particularly limited, and it is preferably 95% by mass or less more preferably 80% by mass or less. The proportion of the organic solvent B in the organic solvent is the same as the proportion of the organic solvent B in the organic solvent described above, except that the upper limit thereof is not 100% by mass. In addition, the mass ratio of the content of the organic solvent A to the content of the organic solvent B (the content of the organic solvent A:the content of the organic solvent B) is not particularly limited; however, it is, for example, preferably 1:99 to 99:1 and more preferably 10:90 to 90:10.

The organic solvent preferably has a boiling point of 50° C. or higher, and more preferably 70° C. or higher at normal pressure (1 atm). The upper limit thereof is preferably 250° C. or lower and more preferably 220° C. or lower.

In the present invention, the content of the organic solvent in the inorganic solid electrolyte-containing composition is not particularly limited and can be appropriately set. For example, in the inorganic solid electrolyte-containing composition, it is preferably 20% to 80% by mass, more preferably 30% to 70% by mass, and particularly preferably 40% to 60% by mass.

<Active Material>

The inorganic solid electrolyte-containing composition according to the embodiment of the present invention can also contain an active material capable of intercalating and deintercalating an ion of a metal belonging to Group 1 or Group 2 of the periodic table. Examples of such active materials include a positive electrode active material and a negative electrode active material, which will be described later.

In the present invention, the inorganic solid electrolyte-containing composition containing an active material (a positive electrode active material or a negative electrode active material) may be referred to as a composition for an electrode layer (a composition for a positive electrode layer or a composition for a negative electrode layer).

(Positive Electrode Active Material)

The positive electrode active material is preferably a positive electrode active material capable of reversibly intercalating and deintercalating lithium ions. The above-described material is not particularly limited as long as the material has the above-described characteristics and may be a transition metal oxide or an element capable of being complexed with Li such as sulfur or the like.

Among the above, as the positive electrode active material, transition metal oxides are preferably used, and transition metal oxides having a transition metal element Ma (one or more elements selected from Co, Ni, Fe, Mn, Cu, and V) are more preferable. In addition, an element $M^b$ (an element of Group 1 (Ia) of the metal periodic table other than lithium, an element of Group 2 (IIa), or an element such as Al, Ga, In, Ge, Sn, Pb, Sb, Bi, Si, P, or B) may be mixed into this transition metal oxide. The amount of the element mixed is preferably 0% to 30% by mole of the amount (100% by mole) of the transition metal element $M^a$. It is more preferable that the transition metal oxide is synthesized by mixing the above components such that a molar ratio Li/$M^a$ is 0.3 to 2.2.

Specific examples of the transition metal oxides include transition metal oxides having a layered rock salt type structure (MA), transition metal oxides having a spinel-type structure (MB), lithium-containing transition metal phosphoric acid compounds (MC), lithium-containing transition metal halogenated phosphoric acid compounds (MD), and lithium-containing transition metal silicate compounds (ME).

Specific examples of the transition metal oxides having a layered rock salt type structure (MA) include $LiCoO_2$ (lithium cobalt oxide [LCO]), $LiNi_2O_2$ (lithium nickelate), $LiNi_{0.85}Co_{0.10}Al_{0.05}O_2$ (lithium nickel cobalt aluminum oxide [NCA]), $LiNi_{1/3}Co_{1/3}Mn_{1/3}O_2$ (lithium nickel manganese cobalt oxide [NMC]), and $LiNi_{0.5}Mn_{0.5}O_2$ (lithium manganese nickelate).

Specific examples of the transition metal oxides having a spinel-type structure (MB) include $LiMn_2O_4$ (LMO), $LiCoMnO_4$, $Li_2FeMn_3O_8$, $Li_2CuMn_3O_8$, $Li_2CrMn_3O_8$, and $Li_2NiMn_3O_8$.

Examples of the lithium-containing transition metal phosphoric acid compound (MC) include olivine-type iron phosphate salts such as $LiFePO_4$ and $Li_3Fe_2(PO_4)_3$, iron pyrophosphates such as $LiFeP_2O_7$, and cobalt phosphates such as $LiCoPO_4$, and a monoclinic NASICON type vanadium phosphate salt such as $Li_3V2(PO_4)_3$ (lithium vanadium phosphate).

Examples of the lithium-containing transition metal halogenated phosphoric acid compound (MD) include iron fluorophosphates such as $Li_2FePO_4F$, manganese fluorophosphates such as $Li_2MnPO_4F$, cobalt fluorophosphates such as $Li_2CoPO_4F$.

Examples of the lithium-containing transition metal silicate compounds (ME) include $Li_2FeSiO_4$, $Li_2MnSiO_4$, and $Li_2CoSiO_4$.

In the present invention, the transition metal oxide having a layered rock salt type structure (MA) is preferable, and LCO or NMC is more preferable.

The shape of the positive electrode active material is not particularly limited but is preferably a particulate shape. The particle diameter (the volume average particle diameter) of the positive electrode active material particles is not particularly limited. For example, it can be set to 0.1 to 50 μm.

The particle diameter of the positive electrode active material particle can be measured using the same method as that of the particle diameter of the inorganic solid electrolyte. In order to allow the positive electrode active material to have a predetermined particle diameter, an ordinary pulverizer or classifier is used. For example, a mortar, a ball mill, a sand mill, a vibration ball mill, a satellite ball mill, a planetary ball mill, a swirling air flow jet mill, or a sieve is preferably used. During crushing, it is also possible to carry out wet-type crushing in which water or an organic solvent such as methanol is made to be present together. In order to provide the desired particle diameter, classification is preferably carried out. The classification is not particularly limited and can be carried out using a sieve, a wind power classifier, or the like. Both the dry-type classification and the wet-type classification can be carried out.

A positive electrode active material obtained using a baking method may be used after being washed with water, an acidic aqueous solution, an alkaline aqueous solution, or an organic solvent.

The positive electrode active material may be used singly, or two or more thereof may be used in combination.

In a case of forming a positive electrode active material layer, the mass (mg) (mass per unit area) of the positive electrode active material per unit area ($cm^2$) of the positive electrode active material layer is not particularly limited. It can be appropriately determined according to the designed battery capacity and can be set to, for example, 1 to 100 mg/$cm^2$.

The content of the positive electrode active material in the inorganic solid electrolyte-containing composition is not particularly limited; however, it is preferably 10% to 97% by mass, more preferably 30% to 95% by mass, still more preferably 40% to 93% by mass, and particularly preferably 50% to 90% by mass, with respect to 100% by mass of the solid content.

(Negative Electrode Active Material)

The negative electrode active material is preferably capable of reversibly intercalating and deintercalating lithium ions. The material is not particularly limited as long as it has the above-described properties, and examples thereof include a carbonaceous material, a metal oxide, a metal composite oxide, lithium, a lithium alloy, and a negative electrode active material that is capable of forming an alloy with lithium. Among the above, a carbonaceous material, a metal composite oxide, or lithium is preferably used from the viewpoint of reliability.

The carbonaceous material that is used as the negative electrode active material is a material substantially consisting of carbon. Examples thereof include petroleum pitch, carbon black such as acetylene black (AB), graphite (natural graphite, artificial graphite such as vapor-grown graphite), and carbonaceous material obtained by firing a variety of synthetic resins such as polyacrylonitrile (PAN)-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated polyvinyl alcohol (PVA)-based carbon fibers, lignin carbon fibers, vitreous carbon fibers, and activated carbon fibers, mesophase microspheres, graphite whisker, and tabular graphite.

These carbonaceous materials can be classified into non-graphitizable carbonaceous materials (also referred to as "hard carbon") and graphitizable carbonaceous materials based on the graphitization degree. In addition, it is preferable that the carbonaceous material has the lattice spacing, density, and crystallite size described in JP1987-022066A (JP-S62-022066A), JP1990-006856A (JP-H2-006856A), and JP1991-045473A (JP-H3-045473A). The carbonaceous material is not necessarily a single material and, for example, may be a mixture of natural graphite and artificial graphite described in JP1993-090844A (JP-H5-090844A) or graphite having a coating layer described in JP1994-004516A (JP-H6-004516A).

As the carbonaceous material, hard carbon or graphite is preferably used, and graphite is more preferably used.

The oxide of a metal or a metalloid element that can be used as the negative electrode active material is not particularly limited as long as it is an oxide capable of intercalating and deintercalating lithium, and examples thereof include an oxide of a metal element (metal oxide), a composite oxide of a metal element or a composite oxide of a metal element and a metalloid element (collectively referred to as "metal composite oxide), and an oxide of a metalloid element (a metalloid oxide). The oxides are more preferably noncrystalline oxides, and preferred examples thereof include chalcogenides which are reaction products between metal elements and elements in Group 16 of the periodic table). In the present invention, the metalloid element refers to an element having intermediate properties between those of a metal element and a non-metal element. Typically, the metalloid elements include six elements including boron, silicon, germanium, arsenic, antimony, and tellurium, and further include three elements including selenium, polonium, and astatine. In addition, "amorphous" represents an oxide having a broad scattering band with a peak in a range of 20° to 40° in terms of 2θ in case of being measured by an X-ray diffraction method using CuKα rays, and the oxide may have a crystal diffraction line. The highest intensity in a crystal diffraction line observed in a range of 40° to 70° in terms of 2θ is preferably 100 times or less and more preferably 5 times or less relative to the intensity of a diffraction peak line in a broad scattering band observed in a range of 20° to 40° in terms of 2θ, and it is still more preferable that the oxide does not have a crystal diffraction line.

In the compound group consisting of the noncrystalline oxides and the chalcogenides, noncrystalline oxides of metalloid elements and chalcogenides are more preferable, and (composite) oxides consisting of one element or a combination of two or more elements selected from elements (for example, Al, Ga, Si, Sn, Ge, Pb, Sb, and Bi) belonging to Groups 13 (IIIB) to 15 (VB) in the periodic table or chalcogenides are more preferable. Specific examples of preferred noncrystalline oxides and chalcogenides include $Ga_2O_3$, $GeO$, $PbO$, $PbO_2$, $Pb_2O_3$, $Pb_2O_4$, $Pb_3O_4$, $Sb_2O_3$, $Sb_2O_4$, $Sb_2O_8Bi_2O_3$, $Sb_2O_8Si_2O_3$, $Sb_2O_5$, $Bi_2O_3$, $Bi_2O_4$, $GeS$, $PbS$, $PbS_2$, $Sb_2S_3$, and $Sb_2S_5$.

Suitable examples of the negative electrode active material which can be used in combination with noncrystalline oxide negative electrode active material containing Sn, Si, or Ge as a major component include a carbonaceous material capable of intercalating and/or deintercalating lithium ions or lithium metal, lithium, a lithium alloy, and a negative electrode active material that is capable of being alloyed with lithium.

It is preferable that an oxide of a metal or a metalloid element, in particular, a metal (composite) oxide and the chalcogenide contains at least one of titanium or lithium as the constitutional component from the viewpoint of high current density charging and discharging characteristics. Examples of the metal composite oxide (lithium composite metal oxide) including lithium include a composite oxide of lithium oxide and the above metal (composite) oxide or the above chalcogenide, and specifically, $Li_2SnO_2$.

As the negative electrode active material, for example, a metal oxide (titanium oxide) having a titanium element is also preferable. Specifically, $Li_4Ti_5O_{12}$ (lithium titanium oxide [LTO]) is preferable since the volume variation during the intercalation and deintercalation of lithium ions is small, and thus the high-speed charging and discharging characteristics are excellent, and the deterioration of electrodes is suppressed, whereby it becomes possible to improve the life of the lithium ion secondary battery.

The lithium alloy as the negative electrode active material is not particularly limited as long as it is typically used as a negative electrode active material for a secondary battery, and examples thereof include a lithium aluminum alloy.

The negative electrode active material that is capable of forming an alloy with lithium is not particularly limited as long as it is typically used as a negative electrode active material for a secondary battery. In such an active material, expansion and contraction due to charging and discharging is large, and thus the binding property of the solid particle is reduced. However, in the present invention, it is possible to achieve high binding property by using the above-described binders A and B in combination. Examples of such an active material include a (negative electrode) active material (an alloy) having a silicon element or a tin element and a metal such as Al or In, a negative electrode active material (a silicon-containing active material) having a silicon element capable of that exhibits high battery capacity is preferable, and a silicon-containing active material in which the content of the silicon element is 50% by mole or more with respect to all the constituent elements is more preferable.

In general, a negative electrode including the negative electrode active material (for example, a Si negative electrode including a silicon-containing active material or an Sn negative electrode containing an active material containing a tin element) can intercalate a larger amount of Li ions than a carbon negative electrode (for example, graphite or acetylene black). That is, the amount of Li ions intercalated per unit mass increases. Therefore, it is possible to increase the battery capacity. As a result, there is an advantage that the battery driving duration can be extended.

Examples of the silicon-containing active material include a silicon-containing alloy (for example, $LaSi_2$, $VSi_2$, La—Si, Gd—Si, or Ni—Si) including a silicon material such as Si or SiOx (0<x≤1) and titanium, vanadium, chromium, manganese, nickel, copper, lanthanum, or the like or a structured active material thereof (for example, $LaSi_2/Si$), and an active material such as $SnSiO_3$ or $SnSiS_3$ including silicon element and tin element. In addition, since SiOx itself can be used as a negative electrode active material (a metalloid oxide) and Si is produced along with the operation of an all-solid state secondary battery, SiOx can be used as a negative electrode active material (or a precursor material thereof) that is capable of being alloyed with lithium.

Examples of the negative electrode active material including tin element include Sn, SnO, $SnO_2$, SnS, $SnS_2$, and the above-described active material including silicon element and tin element. In addition, a composite oxide with lithium oxide, for example, $Li_2SnO_2$ can also be used.

In the present invention, the above-described negative electrode active material can be used without any particular limitation. From the viewpoint of battery capacity, a preferred aspect as the negative electrode active material is a negative electrode active material that is capable of being alloyed with lithium. Among them, the silicon material or the silicon-containing alloy (the alloy containing a silicon element) described above is more preferable, and it is more preferable to include a negative electrode active material containing silicon (Si) or a silicon-containing alloy.

The chemical formulae of the compounds obtained by the above baking method can be calculated using an inductively coupled plasma (ICP) emission spectroscopic analysis method as a measurement method from the mass difference of powder before and after firing as a convenient method.

The shape of the negative electrode active material is not particularly limited but is preferably a particulate shape. The volume average particle diameter of the negative electrode active material is not particularly limited; however, it is preferably 0.1 to 60 μm. The volume average particle diameter of the negative electrode active material particles can be measured using the same method as that of the average particle diameter of the inorganic solid electrolyte. In order to obtain the predetermined particle diameter, a typical crusher or classifier is used as in the case of the positive electrode active material.

The negative electrode active material may be used singly, or two or more negative electrode active materials may be used in combination.

In a case of forming a negative electrode active material layer, the mass (mg) (mass per unit area) of the negative electrode active material per unit area ($cm^2$) in the negative electrode active material layer is not particularly limited. It can be appropriately determined according to the designed battery capacity and can be set to, for example, 1 to 100 $mg/cm^2$.

The content of the negative electrode active material in the inorganic solid electrolyte-containing composition is not particularly limited, and it is preferably 10% to 90% by mass, more preferably 20% to 85% by mass, still more preferably 30% to 80% by mass, and even still more preferably 40% by mass to 75% by mass with respect to 100% by mass of the solid content.

In the present invention, in a case where a negative electrode active material layer is formed by charging a secondary battery, ions of a metal belonging to Group 1 or Group 2 in the periodic table, generated in the all-solid state secondary battery, can be used instead of the negative electrode active material. By bonding the ions to electrons and precipitating a metal, a negative electrode active material layer can be formed.

(Coating of active material)

The surfaces of the positive electrode active material and the negative electrode active material may be coated with a separate metal oxide. Examples of the surface coating agent include metal oxides and the like containing Ti, Nb, Ta, W, Zr, Al, Si, or Li. Specific examples thereof include titanium oxide spinel, tantalum-based oxides, niobium-based oxides, and lithium niobate-based compounds, and specific examples thereof include $Li_4Ti_5O_{12}$, $Li_2Ti_2O_5$, $LiTaO_3$, $LiNbO_3$, $LiAlO_2$, $Li_2ZrO_3$, $Li_2WO_4$, $Li_2TiO_3$, $Li_2B_4O_7$, $Li_3PO_4$, $Li_2MoO_4$, $Li_3BO_3$, $LiBO_2$, $Li_2CO_3$, $Li_2SiO_3$, $SiO_2$, $TiO_2$, $ZrO_2$, $Al_2O_3$, and $B_2O_3$.

In addition, a surface treatment may be carried out on the surfaces of electrodes including the positive electrode active material or the negative electrode active material using sulfur, phosphorous, or the like.

Furthermore, the particle surface of the positive electrode active material or the negative electrode active material may be treated with an active light ray or an active gas (plasma or the like) before or after the coating of the surfaces.

<Conductive Auxiliary Agent>

The inorganic solid electrolyte-containing composition according to the embodiment of the present invention may appropriately contain a conductive auxiliary agent, and it is particularly preferable that the silicon atom-containing active material as the negative electrode active material is used in combination with a conductive auxiliary agent.

The conductive auxiliary agent is not particularly limited, and conductive auxiliary agents that are known as ordinary conductive auxiliary agents can be used. The conductive auxiliary agent may be, for example, graphite such as natural graphite or artificial graphite, carbon black such as acetylene black, Ketjen black, or furnace black, amorphous carbon such as needle cokes, a carbon fiber such as a vapor-grown carbon fiber or a carbon nanotube, or a carbonaceous material such as graphene or fullerene which are electron-conductive materials and also may be a metal powder or a metal fiber of copper, nickel, or the like, and a conductive polymer such as polyaniline, polypyrrole, polythiophene, polyacetylene, or a polyphenylene derivative may also be used.

In the present invention, in a case where the active material and the conductive auxiliary agent are used in combination, among the above-described conductive auxiliary agents, a conductive auxiliary agent that does not intercalate and deintercalate ions (preferably Li ions) of a metal belonging to Group 1 or Group 2 in the periodic table and does not function as an active material at the time of charging and discharging of the battery is classified as the conductive auxiliary agent. Therefore, among the conductive auxiliary agents, a conductive auxiliary agent that can function as the active material in the active material layer at the time of charging and discharging of the battery is classified as an active material but not as a conductive auxiliary agent. Whether or not the conductive auxiliary agent functions as the active material at the time of charging and discharging of a battery is not unambiguously determined but is determined by the combination with the active material.

One kind of conductive auxiliary agent may be contained, or two or more kinds thereof may be contained.

The shape of the conductive auxiliary agent is not particularly limited but is preferably a particulate shape.

In a case where the inorganic solid electrolyte-containing composition according to the embodiment of the present invention contains a conductive auxiliary agent, the content of the conductive auxiliary agent in the inorganic solid electrolyte-containing composition is preferably 0% to 10% by mass.

<Lithium Salt>

The inorganic solid electrolyte-containing composition according to the embodiment of the present invention preferably contains a lithium salt (a supporting electrolyte) as well.

Generally, the lithium salt is preferably a lithium salt that is used for this kind of product and is not particularly limited. For example, lithium salts described in paragraphs 0082 to 0085 of JP2015-088486A are preferable.

In a case where the inorganic solid electrolyte-containing composition according to the embodiment of the present invention contains a lithium salt, the content of the lithium salt is preferably 0.1 part by mass or more and more preferably 5 parts by mass or more with respect to 100 parts by mass of the solid electrolyte. The upper limit thereof is preferably 50 parts by mass or less and more preferably 20 parts by mass or less.

<Dispersing Agent>

Since the above-described binder functions as a dispersing agent as well, the inorganic solid electrolyte-containing composition according to the embodiment of the present invention may not contain a dispersing agent other than this binder; however, it may contain a dispersing agent. As the dispersing agent, a dispersing agent that is generally used for an all-solid state secondary battery can be appropriately selected and used. Generally, a compound intended for particle adsorption and steric repulsion and/or electrostatic repulsion is suitably used.

<Other Additives>

As components other than the respective components described above, the inorganic solid electrolyte-containing composition according to the embodiment of the present invention may appropriately contain an ionic liquid, a thickener, a crosslinking agent (an agent causing a crosslinking reaction by radical polymerization, condensation polymerization, or ring-opening polymerization), a polymerization initiator (an agent that generates an acid or a radical by heat or light), an antifoaming agent, a leveling agent, a dehydrating agent, or an antioxidant. The ionic liquid is contained in order to further improve the ion conductivity, and the known one in the related art can be used without particular limitation. Further, a polymer other than the above polymer, a commonly used binding agent, and the like may be contained.

(Preparation of Inorganic Solid Electrolyte-Containing Composition)

The inorganic solid electrolyte-containing composition according to the embodiment of the present invention can be prepared by mixing an inorganic solid electrolyte, the above binder, an organic solvent, and further appropriately a lithium salt, and any other optionally components, as a mixture and preferably as a slurry by using, for example, various mixers that are used generally.

A mixing method is not particularly limited, and the components may be mixed at once or sequentially. A mixing environment is not particularly limited, and examples thereof include a dry air environment and an inert gas environment.

The composition for forming an active material layer according to the embodiment of the present invention can be made as a dispersion liquid that containing solid particles that are dispersed at a high level over a long period of time, by suppressing (re)aggregation of the solid particles.

[Sheet for an all-Solid State Secondary Battery]

A sheet for an all-solid state secondary battery according to the embodiment of the present invention is a sheet-shaped molded body with which a constitutional layer of an all-solid state secondary battery can be formed, and includes various aspects depending on uses thereof. Examples of thereof include a sheet that is preferably used in a solid electrolyte layer (also referred to as a solid electrolyte sheet for an all-solid state secondary battery), and a sheet that is preferably used in an electrode or a laminate of an electrode and a solid electrolyte layer (an electrode sheet for an all-solid state secondary battery). In the present invention, a variety of sheets described above will be collectively referred to as a sheet for an all-solid state secondary battery in some cases.

The solid electrolyte sheet for an all-solid state secondary battery according to the embodiment of the present invention is not particularly limited as long as it is a sheet including a solid electrolyte layer, and may be a sheet in which a solid electrolyte layer is formed on a substrate or may be a sheet that is formed of a solid electrolyte layer without including a substrate. The solid electrolyte sheet for an all-solid state secondary battery may include another layer in addition to the solid electrolyte layer. Examples of the other layer include a protective layer (a stripping sheet), a collector, and a coating layer.

Examples of the solid electrolyte sheet for an all-solid state secondary battery according to the embodiment of the present invention include a sheet including a layer formed of the inorganic solid electrolyte-containing composition according to the embodiment of the present invention, a typical solid electrolyte layer, and a protective layer on a substrate in this order. The solid electrolyte layer included in the solid electrolyte sheet for an all-solid state secondary battery is preferably formed of the inorganic solid electrolyte-containing composition according to the embodiment of the present invention. The contents of the respective components in the solid electrolyte layer are not particularly limited; however, the contents are preferably the same as the contents of the respective components with respect to the solid content of the inorganic solid electrolyte-containing composition according to the embodiment of the present invention. The thickness of each layer that constitutes the solid electrolyte sheet for an all-solid state secondary battery is the same as the thickness of each layer described later in the all-solid state secondary battery.

The substrate is not particularly limited as long as it can support the solid electrolyte layer, and examples thereof include a sheet body (plate-shaped body) formed of materials described below regarding the collector, an organic material, an inorganic material, or the like. Examples of the organic materials include various polymers, and specific examples thereof include polyethylene terephthalate, polypropylene, polyethylene, and cellulose. Examples of the inorganic materials include glass and ceramic.

An electrode sheet for an all-solid state secondary battery according to the embodiment of the present invention (simply also referred to as an "electrode sheet") is not particularly limited as long as it is an electrode sheet including an active material layer, and may be a sheet in which an active material layer is formed on a substrate (collector) or may be a sheet that is formed of an active material layer without including a substrate. The electrode sheet is typically a sheet including the collector and the active material layer, and examples of an aspect thereof include an aspect including the collector, the active material layer, and the solid electrolyte layer in this order and an aspect including the collector, the active material layer, the solid electrolyte layer, and the active material layer in this order. The solid electrolyte layer and the active material layer included in the electrode sheet are preferably formed of the inorganic solid electrolyte-containing composition according to the embodiment of the present invention. The contents of the respective components in this solid electrolyte layer or active material layer are not particularly limited; however, the contents are preferably the same as the contents of the respective components with respect to the solid contents of the inorganic solid electrolyte-containing composition (the composition for an electrode layer) according to the embodiment of the present invention. The thickness of each of the layers that constitute the electrode sheet according to the embodiment of the present invention is the same as the thickness of each of layers described later in the all-solid state secondary battery. The electrode sheet according to the embodiment of the present invention may include the above-described other layer.

In the sheet for an all-solid state secondary battery sheet according to the embodiment of the present invention, at least one layer of the solid electrolyte layer or the active material layer is formed of the inorganic solid electrolyte-containing composition according to the embodiment of the present invention, and the solid particles in this layer are firmly bound to each other. Further, in the electrode sheet for an all-solid state secondary battery, the active material layer formed of the inorganic solid electrolyte-containing composition according to the embodiment of the present invention is firmly bound to the collector as well. In the present invention, the increase in interfacial resistance between solid particles can be effectively suppressed. As a result, the sheet for an all-solid state secondary battery according to the embodiment of the present invention is suitably used as a sheet with which a constitutional layer of an all-solid state secondary battery can be formed.

In a case where an all-solid state secondary battery is manufactured using the sheet for an all-solid state secondary battery according to the embodiment of the present invention, excellent battery performance is exhibited.

[Manufacturing Method for Sheet for all-Solid State Secondary Battery]

The manufacturing method for a sheet for an all-solid state secondary battery according to the embodiment of the present invention is not particularly limited, and the sheet can be manufactured by forming each of the above layers using the inorganic solid electrolyte-containing composition according to the embodiment of the present invention. Examples thereof include a method in which the film formation (the coating and drying) is carried out preferably on a substrate or a collector (the other layer may be interposed) to form a layer (a coated and dried layer) consisting of an inorganic solid electrolyte-containing composition. This method makes it possible to produce a sheet for an all-solid state secondary battery having a substrate or a collector and having a coated and dried layer. Here, the coated and dried layer refers to a layer formed by carrying out coating with the inorganic solid electrolyte-containing composition according to the embodiment of the present invention and drying the organic solvent (that is, a layer formed using the inorganic solid electrolyte-containing composition according to the embodiment of the present invention and consisting of a composition obtained by removing the organic solvent from the inorganic solid electrolyte-containing composition according to the embodiment of the present invention). In the active material layer and the coated and dried layer, the organic solvent may remain within a range where the effects of the present invention do not deteriorate, and the residual amount thereof, for example, in each of the layers may be 3% by mass or lower.

In the manufacturing method for a sheet for an all-solid state secondary battery according to the embodiment of the present invention, each of the steps such as coating and drying will be described in the following manufacturing method for an all-solid state secondary battery.

In the manufacturing method for a sheet for an all-solid state secondary battery according to the embodiment of the present invention, the coated and dried layer obtained as described above can be pressurized. The pressurizing condition and the like will be described later in the section of the manufacturing method for an all-solid state secondary battery.

In addition, in the manufacturing method for a sheet for an all-solid state secondary battery according to the embodiment of the present invention, the base material, the protective layer (particularly stripping sheet), or the like can also be stripped.

[All-Solid State Secondary Battery]

The all-solid state secondary battery according to the embodiment of the present invention includes a positive electrode active material layer, a negative electrode active material layer facing the positive electrode active material layer, and a solid electrolyte layer disposed between the positive electrode active material layer and the negative electrode active material layer. The positive electrode active material layer is preferably formed on a positive electrode collector to configure a positive electrode. The negative electrode active material layer is preferably formed on a negative electrode collector to configure a negative electrode.

It is preferable that at least one of the negative electrode active material layer, the positive electrode active material layer, or the solid electrolyte layer is formed of the inorganic solid electrolyte-containing composition according to the embodiment of the present invention, and an aspect in which all the layers are formed of the inorganic solid electrolyte-containing composition according to the embodiment of the present invention is also preferable. In the active material layer or the solid electrolyte layer formed of the inorganic solid electrolyte-containing composition according to the embodiment of the present invention, the kinds of components to be contained and the content ratios thereof are preferably the same as the solid contents of the inorganic solid electrolyte-containing composition according to the embodiment of the present invention. In a case where the active material layer or the solid electrolyte layer is not formed of the inorganic solid electrolyte-containing composition according to the embodiment of the present invention, a known material in the related art can be used.

The thickness of each of the negative electrode active material layer, the solid electrolyte layer, and the positive electrode active material layer is not particularly limited. In case of taking a dimension of an ordinary all-solid state secondary battery into account, the thickness of each of the layers is preferably 10 to 1,000 µm and more preferably 20 µm or more and less than 500 µm. In the all-solid state secondary battery according to the embodiment of the present invention, the thickness of at least one layer of the positive electrode active material layer or the negative electrode active material layer is still more preferably 50 µm or more and less than 500 µm.

Each of the positive electrode active material layer and the negative electrode active material layer may include a collector on the side opposite to the solid electrolyte layer.

<Housing>

Depending on the use application, the all-solid state secondary battery according to the embodiment of the present invention may be used as the all-solid state secondary battery having the above-described structure as it is but is preferably sealed in an appropriate housing to be used in the form of a dry cell. The housing may be a metallic housing or a resin (plastic) housing. In a case where a metallic housing is used, examples thereof include an aluminum alloy housing and a stainless steel housing. It is preferable that the metallic housing is classified into a positive electrode-side housing and a negative electrode-side housing and that the positive electrode-side housing and the negative electrode-side housing are electrically connected to the positive electrode collector and the negative electrode collector, respectively. The positive electrode-side housing and the negative electrode-side housing are preferably integrated by being joined together through a gasket for short circuit prevention.

Hereinafter, the all-solid state secondary battery of the preferred embodiments of the present invention will be described with reference to FIG. 1; however, the present invention is not limited thereto.

FIG. 1 is a cross-sectional view schematically illustrating an all-solid state secondary battery (a lithium ion secondary battery) according to a preferred embodiment of the present invention. In the case of being seen from the negative electrode side, an all-solid state secondary battery 10 of the present embodiment includes a negative electrode collector 1, a negative electrode active material layer 2, a solid electrolyte layer 3, a positive electrode active material layer 4, and a positive electrode collector 5 in this order. The respective layers are in contact with each other, and thus structures thereof are adjacent. In a case in which the above-described structure is employed, during charging, electrons (e) are supplied to the negative electrode side, and lithium ions ($Li^+$) are accumulated on the negative electrode side. On the other hand, during discharging, the lithium ions ($Li^+$) accumulated in the negative electrode side return to the positive electrode, and electrons are supplied to an operation portion 6. In an example illustrated in the drawing, an electric bulb is employed as a model at the operation portion 6 and is lit by discharging.

In a case where an all-solid state secondary battery having the layer constitution shown in FIG. 1 is put into a 2032-type coin case, the all-solid state secondary battery will be referred to as the electrode sheet for an all-solid state secondary battery, and a battery produced by putting this electrode sheet for an all-solid state secondary battery into the 2032-type coin case will be referred to as the all-solid state secondary battery, thereby referring to both batteries distinctively in some cases.

(Positive Electrode Active Material Layer, Solid Electrolyte Layer, and Negative Electrode Active Material Layer)

In the all-solid state secondary battery 10, all of the positive electrode active material layer, the solid electrolyte layer, and the negative electrode active material layer are formed of the inorganic solid electrolyte-containing composition of the embodiment of the present invention. This all-solid state secondary battery 10 exhibits excellent battery performance. The kinds of the inorganic solid electrolyte and the binder which are contained in the positive electrode active material layer 4, the solid electrolyte layer 3, and the negative electrode active material layer 2 may be identical to or different from each other.

In the present invention, any one of the positive electrode active material layer and the negative electrode active material layer, or collectively both of them may be simply referred to as an active material layer or an electrode active material layer. In addition, in the present invention, any one of the positive electrode active material and the negative electrode active material, or collectively both of them may be simply referred to as an active material or an electrode active material.

In the present invention, in a case where the above-described binders A and B are used in combination with solid particles such as an inorganic solid electrolyte or an active material, it is possible to increase the binding property of the solid particles as described above, and thus it is possible to suppress the poor contact of the solid particles with each other and the peeling of the solid particles from the collector. Further, it is possible to suppress the increase in the interfacial resistance between the solid particles and the increase in the interfacial resistance between the solid particle and the collector. As a result, the all-solid state secondary battery according to the embodiment of the present invention exhibits excellent battery performance.

In the all-solid state secondary battery 10, the negative electrode active material layer can be a lithium metal layer. Examples of the lithium metal layer include a layer formed by depositing or molding a lithium metal powder, a lithium foil, and a lithium vapor deposition film. The thickness of the lithium metal layer can be, for example, 1 to 500 μm regardless of the above thickness of the above negative electrode active material layer.

The positive electrode collector 5 and the negative electrode collector 1 are preferably an electron conductor.

In the present invention, either or both of the positive electrode collector and the negative electrode collector will also be simply referred to as the collector.

As a material that forms the positive electrode collector, not only aluminum, an aluminum alloy, stainless steel, nickel, or titanium but also a material (a material on which a thin film is formed) obtained by treating the surface of aluminum or stainless steel with carbon, nickel, titanium, or silver is preferable. Among these, aluminum or an aluminum alloy is more preferable.

As a material which forms the negative electrode collector, aluminum, copper, a copper alloy, stainless steel, nickel, titanium, or the like, and further, a material obtained by treating the surface of aluminum, copper, a copper alloy, or stainless steel with carbon, nickel, titanium, or silver is preferable, and aluminum, copper, a copper alloy, or stainless steel is more preferable.

Regarding the shape of the collector, a film sheet shape is typically used; however, it is also possible to use shapes such as a net shape, a punched shape, a lath body, a porous body, a foaming body, and a molded body of fiber.

The thickness of the collector is not particularly limited; however, it is preferably 1 to 500 μm. In addition, protrusions and recesses are preferably provided on the surface of the collector by carrying out a surface treatment.

In the present invention, a functional layer, a functional member, or the like may be appropriately interposed or disposed between each layer of the negative electrode collector, the negative electrode active material layer, the solid electrolyte layer, the positive electrode active material layer, and the positive electrode collector or on the outside thereof. In addition, each layer may be constituted of a single layer or multiple layers.

[Manufacture of all-Solid State Secondary Battery]

The all-solid state secondary battery can be manufactured by a conventional method. Specifically, the all-solid state secondary battery can be manufactured by forming each of the layers described above using the inorganic solid electrolyte-containing composition of the embodiment of the present invention or the like. Moreover, since the inorganic solid electrolyte-containing composition according to the embodiment of the present invention is excellent in dispersion stability, it is possible to manufacture an all-solid state secondary battery in which the deterioration of battery performance is suppressed even in a case where the preparation of the inorganic solid electrolyte-containing composition and the film formation of each layer are executed uncontinuously temporally (unimmediately after the composition is prepared). As described above, in the present invention, it is possible to manufacture an all-solid state secondary battery that exhibits excellent battery performance and a suitably low electric resistance under the flexible manufacturing conditions. Hereinafter, the manufacturing method therefor will be described in detail.

The all-solid state secondary battery according to the embodiment of the present invention can be manufactured by carrying out a method (a manufacturing method for a sheet for an all-solid state secondary battery according to the embodiment of the present invention) including (undergoing) a step of coating an appropriate base material (for example, a metal foil which serves as a collector) with the inorganic solid electrolyte-containing composition according to the embodiment of the present invention and forming a coating film (making a film).

For example, an inorganic solid electrolyte-containing composition containing a positive electrode active material is applied as a material for a positive electrode (a composition for a positive electrode layer) onto a metal foil which is a positive electrode collector, to form a positive electrode active material layer, thereby producing a positive electrode sheet for an all-solid state secondary battery. Next, the inorganic solid electrolyte-containing composition for forming a solid electrolyte layer is applied onto the positive electrode active material layer to form the solid electrolyte layer. Furthermore, an inorganic solid electrolyte-containing composition containing a negative electrode active material is applied as a material for a negative electrode (a composition for a negative electrode layer) onto the solid electrolyte layer, to form a negative electrode active material layer. A negative electrode collector (a metal foil) is overlaid on the negative electrode active material layer, whereby it is possible to obtain an all-solid state secondary battery having a structure in which the solid electrolyte layer is sandwiched between the positive electrode active material layer and the negative electrode active material layer. A desired all-solid state secondary battery can also be manufactured by enclosing the all-solid state secondary battery in a housing.

In addition, it is also possible to manufacture an all-solid state secondary battery by carrying out the forming method for each layer in reverse order to form a negative electrode active material layer, a solid electrolyte layer, and a positive electrode active material layer on a negative electrode collector and overlaying a positive electrode collector thereon.

As another method, the following method can be exemplified. That is, the positive electrode sheet for an all-solid state secondary battery is produced as described above. In addition, an inorganic solid electrolyte-containing composition containing a negative electrode active material is applied as a material for a negative electrode (a composition for a negative electrode layer) onto a metal foil which is a negative electrode collector, to form a negative electrode active material layer, thereby producing a negative electrode sheet for an all-solid state secondary battery. Next, a solid electrolyte layer is formed on the active material layer in any one of these sheets as described above. Furthermore, the other one of the positive electrode sheet for an all-solid state secondary battery and the negative electrode sheet for an all-solid state secondary battery is laminated on the solid electrolyte layer such that the solid electrolyte layer and the active material layer come into contact with each other. This way, an all-solid state secondary battery can be manufactured.

As still another method, for example, the following method can be used. That is, a positive electrode sheet for an all-solid state secondary battery and a negative electrode sheet for an all-solid state secondary battery are produced as described above. In addition, separately from the positive electrode sheet for an all-solid state secondary battery and the negative electrode sheet for an all-solid state secondary battery, an inorganic solid electrolyte-containing composition is applied onto a base material, thereby producing a solid electrolyte sheet for an all-solid state secondary battery consisting of a solid electrolyte layer. Furthermore, the positive electrode sheet for an all-solid state secondary battery and the negative electrode sheet for an all-solid state secondary battery are laminated with each other to sandwich the solid electrolyte layer that has been peeled off from the base material. This way, an all-solid state secondary battery can be manufactured.

The solid electrolyte layer or the like can also be formed by, for example, forming an inorganic solid electrolyte-containing composition or the like on a base material or an active material layer by pressure molding under pressurizing conditions described later.

In the above manufacturing method, it is sufficient that the inorganic solid electrolyte-containing composition according to the embodiment of the present invention is used in any one of the composition for a positive electrode layer, the inorganic solid electrolyte-containing composition, and the composition for a negative electrode layer, and it is preferable that the inorganic solid electrolyte-containing composition according to the embodiment of the present invention is used in all of them.

<Formation of Individual Layer (Film Formation)>

The method for applying the inorganic solid electrolyte-containing composition is not particularly limited and can be appropriately selected. Examples thereof include coating (preferably wet-type coating), spray coating, spin coating, dip coating, slit coating, stripe coating, and bar coating.

In this case, the inorganic solid electrolyte-containing composition may be dried after being applied each time or may be dried after being applied multiple times. The drying temperature is not particularly limited. The lower limit is preferably 30° C. or higher, more preferably 60° C. or higher, and still more preferably 80° C. or higher. The upper limit thereof is preferably 300° C. or lower, more preferably 250° C. or lower, and still more preferably 200° C. or lower. In a case where the inorganic solid electrolyte-containing composition is heated in the above-described temperature range, the organic solvent can be removed to make the composition enter a solid state (coated and dried layer). This temperature range is preferable since the temperature is not excessively increased and each member of the all-solid state secondary battery is not impaired. As a result, excellent overall performance is exhibited in the all-solid state secondary battery, and it is possible to obtain good binding property and good ion conductivity even without pressurization.

As described above, in a case where the inorganic solid electrolyte-containing composition according to the embodiment of the present invention is applied and dried, a coated and dried layer in which solid particles are firmly bound and the interfacial resistance between the solid particles is low can be formed.

After applying the inorganic solid electrolyte-containing composition, it is preferable to pressurize each layer or the all-solid state secondary battery after superimposing the constitutional layers or producing the all-solid state secondary battery. In addition, each of the layers is also preferably pressurized together in a state of being laminated. Examples of the pressurization methods include a method using a hydraulic cylinder pressing machine and the like. The pressurizing force is not particularly limited; however, it is generally preferably in a range of 5 to 1,500 MPa.

In addition, the applied inorganic solid electrolyte-containing composition may be heated at the same time with the pressurization. The heating temperature is not particularly limited but is generally in a range of 30° C. to 300° C. The press can also be applied at a temperature higher than the glass transition temperature of the inorganic solid electrolyte. On the other hand, in a case where the inorganic solid electrolyte and the binder are present together, the press can be applied at a temperature higher than the glass transition temperature of the binder. However, in general, the temperature does not exceed the melting point of the above-described binder.

The pressurization may be carried out in a state in which the coating solvent or the organic solvent has been dried in advance or in a state in which the coating solvent or the organic solvent remains.

The respective compositions may be applied at the same time, and the application, the drying, and the pressing may be carried out simultaneously and/or sequentially. Each of the compositions may be applied onto each of the separate base materials and then laminated by carrying out transfer.

The atmosphere during the pressurization is not particularly limited and may be any one of the atmospheres such as an atmosphere of dried air (the dew point: −20° C. or lower) and an atmosphere of inert gas (for example, an argon gas, a helium gas, or a nitrogen gas).

The pressurization time may be a short time (for example, within several hours) under the application of a high pressure or a long time (one day or longer) under the application of an intermediate pressure. In case of members other than the sheet for an all-solid state secondary battery, for example, the all-solid state secondary battery, it is also possible to use a restraining device (screw fastening pressure or the like) of the all-solid state secondary battery in order to continuously apply an intermediate pressure.

The pressing pressure may be a pressure that is constant or varies with respect to a portion under pressure such as a sheet surface.

The pressing pressure may be variable depending on the area or the thickness of the portion under pressure. In addition, the pressure may also be variable stepwise for the same portion.

A pressing surface may be flat or roughened.

<Initialization>

The all-solid state secondary battery manufactured as described above is preferably initialized after the manufacturing or before use. The initialization is not particularly limited, and it is possible to initialize the all-solid state secondary battery by, for example, carrying out initial charging and discharging in a state in which the pressing pressure is increased and then releasing the pressure up to a pressure at which the all-solid state secondary battery is ordinarily used.

[Usages of all-Solid State Secondary Battery]

The all-solid state secondary battery according to the embodiment of the present invention can be applied to a variety of usages. The application aspect thereof is not particularly limited, and in a case of being mounted in an electronic apparatus, examples thereof include a notebook computer, a pen-based input personal computer, a mobile personal computer, an e-book player, a mobile phone, a cordless phone handset, a pager, a handy terminal, a portable fax, a mobile copier, a portable printer, a headphone stereo, a video movie, a liquid crystal television, a handy cleaner, a portable CD, a mini disc, an electric shaver, a transceiver, an electronic notebook, a calculator, a memory card, a portable tape recorder, a radio, and a backup power supply. Additionally, examples of the consumer usage thereof include an automobile, an electric vehicle, a motor, a lighting instrument, a toy, a game device, a road conditioner, a watch, a strobe, a camera, and a medical device (a pacemaker, a hearing aid, a shoulder massage device, and the like). Furthermore, the all-solid state secondary battery can be used for a variety of military usages and universe usages. In addition, the all-solid state secondary battery can also be combined with a solar battery.

EXAMPLES

Hereinafter, the present invention will be described in more detail based on Examples; however, the present invention is not limited thereto to be interpreted. "Parts" and "%" that represent compositions in the following Examples are mass-based unless particularly otherwise described. In the present invention, "room temperature" means 25° C.

1. Synthesis of Polymers Used in Examples and Comparative Examples, and Preparation of Binder Dispersion Liquid and the Like Acrylic polymers A1, A2, and B, and polyurethanes 1 to 6 are shown below. However, the content (% by mole) of the constitutional component in each polymer is shown in Table 1 or Table 2. It is noted that the description for the vinyl polymer is omitted since the vinyl polymer is obtained by changing the methyl acrylate constitutional component of the acrylic polymer A1 to a vinyl acetate constitutional component.

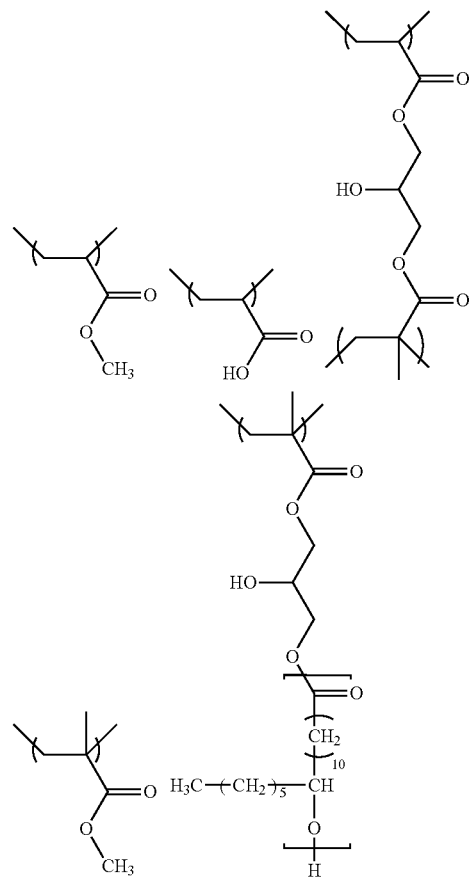

Acrylic polymers A1, A2, and B

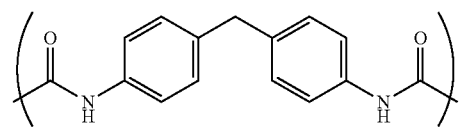

Polyurethanes 1 to 3, and 5

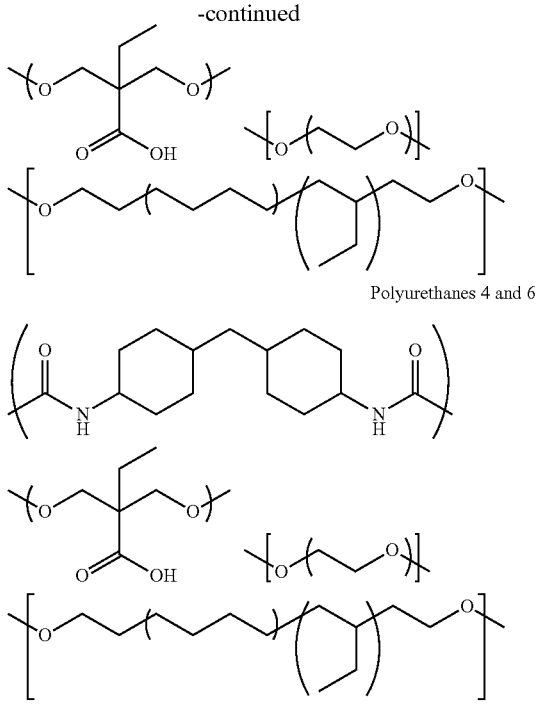

Polyurethanes 4 and 6

Synthesis Example 1: Synthesis of Acrylic Polymer A1 and Preparation of Binder Dispersion Liquid Consisting of Acrylic Polymer A1

In a 2L three-neck flask equipped with a reflux condenser and a gas introduction cock, 7.2 g of a heptane solution of 40% by mass of the following macromonomer M-1, 12.4 g of methyl acrylate (MA), and 6.7 g of acrylic acid (AA), 207 g of heptane (manufactured by FUJIFILM Wako Pure Chemical Corporation), and 1.4 g of azoisobutyronitrile were added, nitrogen gas was introduced at a flow rate of 200 mL/min for 10 minutes, and then the temperature was raised to 100° C. A liquid (a liquid obtained by mixing 846 g of the heptane solution of 40% by mass of the macromonomer M-1, 222.8 g of methyl acrylate, 75.0 g of acrylic acid, 300.0 g of heptane, and 2.1 g of azoisobutyronitrile) prepared in a separate container was dropwise added thereto over 4 hours. After the dropwise addition was completed, 0.5 g of azoisobutyronitrile was added thereto. Then, after stirring at 100° C. for 2 hours, the mixture was cooled to room temperature and filtered to obtain a dispersion liquid of an acrylic polymer A1. The solid component concentration was 39.2%.

Synthesis Example of Macromonomer M-1

A self-condensate of 12-hydroxystearic acid (manufactured by FUJIFILM Wako Pure Chemical Corporation) (number average molecular weight in GPC polystyrene standard: 2,000) was reacted with glycidyl methacrylate (manufactured by Tokyo Chemical Industry Co., Ltd.) to form a macromonomer, which was subsequently polymerized with methyl methacrylate and glycidyl methacrylate (manufactured by Tokyo Chemical Industry Co., Ltd.) at a ratio of 1:0.99:0.01 (molar ratio) to obtain a polymer, with which acrylic acid (manufactured by FUJIFILM Wako Pure Chemical Corporation) was subsequently reacted to obtain a macromonomer M-1. The SP value of this macromonomer M-1 was 9.3, and the number average molecular weight thereof was 11,000. The SP value and the number average molecular weight of the macromonomer are values calculated according to the above methods.

Synthesis Example 2: Synthesis of Acrylic Polymer A2 and Preparation of Binder Dispersion Liquid Consisting of Acrylic Polymer A2

A dispersion liquid of a binder consisting of the acrylic polymer A2 was prepared in the same manner as in Synthesis Example 1 except that in Synthesis Example 1, the amount of MA was changed from 12.4 g to 12.6 g, the amount of MA in a separate container was changed from 222.8 g to 256.2 g, the amount of AA was changed from 6.7 g to 6.8 g, and the amount of AA in a separate container was changed from 75.0 g to 47.0 g.

Synthesis Example 3: Synthesis of Acrylic Polymer B and Preparation of Binder Dispersion Liquid Consisting of Acrylic Polymer B A dispersion liquid of a binder consisting of the acrylic polymer B was prepared in the same manner as in Synthesis Example 1 except that in Synthesis Example 1, the amount of MA was changed from 12.4 g to 12.7 g, the amount of MA in a separate container was changed from 222.8 g to 272.9 g, the amount of AA was changed from 6.7 g to 6.9 g, and the amount of AA in a separate container was changed from 75.0 g to 33.0 g.

Synthesis Example 4: Synthesis of Vinyl Polymer and Preparation of Binder Dispersion Liquid Consisting of Vinyl Polymer A dispersion liquid of a binder consisting of a vinyl polymer was prepared in the same manner as in Synthesis Example 1 except that in Synthesis Example 1, the same number of moles of vinyl acetate (VA, manufactured by FUJIFILM Wako Pure Chemical Corporation) was used instead of methyl acrylate.

Synthesis Example 5: Synthesis of Polyurethane 1 and Preparation of Binder Dispersion Liquid Consisting of Urethane 1

In a 200 mL three-necked flask, 4.46 g of polyethylene glycol (trade name: Polyethylene glycol 200, manufactured by FUJIFILM Wako Pure Chemical Corporation), 0.17 g of 2,2-bis (hydroxymethyl)butyric acid (manufactured by Tokyo Chemical Industry Co., Ltd.), 6.69 g of NISSO-PB GI-1000 (trade name, manufactured by NIPPON SODA Co., Ltd.) was added, and the mixture was dissolved in 74 g of tetrahydrofuran (THF). To this solution, 6.98 g of diphenylmethane diisocyanate (manufactured by FUJIFILM Wako Pure Chemical Corporation) was added and stirred at 60° C. to be uniformly dissolved. To the obtained solution, 560 mg of Neostan U-600 (trade name, manufactured by Nitto Kasei Co., Ltd.) was added and stirred at 60° C. for 5 hours to obtain a THF solution (a polymer solution) of 20% by mass of a polyurethane 1.

Next, 74 g of THF was added to a solution of the polymer solution obtained as described above to obtain a solution, to which 222 g of heptane was subsequently added dropwise over 10 minutes with stirring at 150 rpm to obtain an emulsion of the polyurethane 1. This emulsion was heated at 85° C. for 120 minutes while allowing nitrogen gas to flow. To the obtained residue, 50 g of heptane was added thereto and further heated at 85° C. for 60 minutes. This operation was repeated 4 times to remove THF. In this manner, a heptane dispersion liquid of a binder consisting of the polyurethane 1 was obtained.

Synthesis Examples 6 to 10: Synthesis of Polyurethanes 2 to 6 and Preparation of Binder Dispersion Liquid Consisting of Polyurethanes 2 to 6

Each of polyurethanes 2 to 6 was synthesized in the same manner as in Synthesis Example 5 except that in Synthesis Example 5, the compounds from which the constitutional components a to d are derived and the contents of the constitutional components a to d were changed to be the compounds and the contents shown in Table 2. Next, a dispersion liquid of a binder consisting of each polyurethane was prepared in the same manner as in Synthesis Example 5. The polyurethane 4 was in a state of being dissolved in heptane and thus obtained as a solution.

Table 1 and Table 2 show the composition (the content of the constitutional component) and the mass average molecular weight of each of the synthesized polymers and the particle diameter of each of the binders.

The mass average molecular weight of each of the polymers was measured by the above method (the conditions 2). The particle diameter of each of the binders was measured by the above method. The polyurethane 4 is described as "Dissolved" in the column of "Particle diameter" in Table 2.

In Table 1, the constitutional components A1 and A2 are constitutional components derived from the (meth)acrylic acid ester compound (M1) or the vinyl compound (M2), and the constitutional component A3 is a constitutional component derived from the macromonomer.

TABLE 1

| Chain polymerization type polymer | Constitutional component A1 | | Constitutional component A2 | | | Constitutional component A3 | | | Mass average molecular weight | Particle diameter (μm) |
|---|---|---|---|---|---|---|---|---|---|---|
| | | Content (% by mole) | Functional group | Content (% by mole) | | Functional group | Content (% by mole) | | | |
| Acrylic polymer A1 | MA | 70.1 | AA | —COOH | 29.1 | M-1 | —OH | 0.8 | 19,000 | 0.19 |
| Acrylic polymer A2 | MA | 80.1 | AA | —COOH | 19.1 | M-1 | —OH | 0.8 | 20,000 | 0.19 |
| Acrylic polymer B | MA | 85.0 | AA | —COOH | 14.2 | M-1 | —OH | 0.8 | 32,000 | 0.25 |
| Vinyl polymer | VA | 70.1 | AA | —COOH | 29.1 | M-1 | —OH | 0.8 | 28,000 | 0.22 |

<Abbreviations in Table>

In the table, in the columns of the constitutional components A1 to A3, the name of the compound from which each constitutional unit is derived is indicated by the following abbreviation.

—Constitutional Component A1—
MA: Methyl acrylate
VA: Vinyl acetate
—Constitutional Component A2—
AA: Acrylic acid
—Constitutional component A3—
M-1: Macromonomer M-1 synthesized in Synthesis Example 1 above In Table 2, the constitutional component a corresponds to the constitutional component represented by Formula (I-1). The constitutional components b to d correspond to the constitutional components represented by Formulae (I-3A), (I-3B), and (I-3C), respectively.

TABLE 2

| Sequential polymerization type polymer | Constitutional component a | | Constitutional component b | | | Constitutional component c | | Constitutional component d | | Mass average molecular weight | Particle diameter (μm) |
|---|---|---|---|---|---|---|---|---|---|---|---|
| | | Content (% by mole) | Functional group | Content (% by mole) | | | Content (% by mole) | | Content (% by mole) | | |
| Urethane 1 | MDI | 50 | DMBA | —COOH | 2 | PEG200 | 40 | GI-1000 | 8 | 57,000 | 0.15 |
| Urethane 2 | MDI | 50 | DMBA | —COOH | 6 | PEG200 | 40 | GI-1000 | 4 | 60,000 | 0.18 |
| Urethane 3 | MDI | 50 | DMBA | —COOH | 6 | PEG200 | 40 | GI-1000 | 4 | 70,000 | 0.16 |
| Urethane 4 | H12MDI | 50 | DMBA | —COOH | 6 | PEG200 | 40 | GI-1000 | 4 | 45,000 | Dissolved |
| Urethane 5 | MDI | 50 | DMBA | —COOH | 0.5 | PEG200 | 40 | GI-1000 | 9.5 | 51,000 | 0.11 |
| Urethane 6 | H12MDI | 20 | DMBA | —COOH | 6 | PEG200 | 70 | GI-1000 | 4 | 55,000 | 0.12 |

<Abbreviations in Table>

In the table, in the columns of the constitutional components a to d, the name of the compound from which each constitutional unit is derived is indicated by the following abbreviation.

—Constitutional Component a—
MDI: Diphenylmethane diisocyanate
H12 MDI: Dicyclohexylmethane-4,4'-diisocyanate (manufactured by Tokyo Chemical Industry Co., Ltd.)
—Constitutional Component b—
DMBA: 2,2-bis(hydroxymethyl) butyric acid —Constitutional component c—
PEG200: Polyethylene glycol 200 (trade name, number average molecular weight; 200)
—Constitutional Component d—
GI-1000: Hydrogen-added polybutadiene polyol NISSO-PB GI-1000 (trade name, number average molecular weight: 1,500)

2. Preparation of Polymers for Examples and Comparative Examples

Commercially available products were used regarding the following polymers. Each polymer was dissolved in a solvent DIBK to prepare a binder solution having a concentration of 3.0% by mass. The PVdF polymer was not soluble in the above solvent and was prepared as a dispersion liquid.

PVdF: Polyvinylidene fluoride (trade name) (mass average molecular weight 180,000, manufactured by Sigma-Aldrich Co., LLC)

SBR: Hydrogen-added styrene-butadiene rubber (DY-NARON 1321P (trade name), mass average molecular weight: 230,000, manufactured by JSR Corporation)

SEBS: Styrene-ethylene-butylene-styrene block copolymer (trade name, mass average molecular weight: 100,000, manufactured by Sigma-Aldrich Co., LLC) PVDF-HFP (6:4): Copolymer of polyvinylidene difluoride and hexafluoropropylene ((trade name), copolymerization ratio [PVdF:HFP] (mass ratio)=6:4, mass average molecular weight: 280 000, Sigma-Aldrich Co., LLC)

PVDF-HFP (8:2): Copolymer of polyvinylidene difluoride and hexafluoropropylene ((trade name), copolymerization ratio [PVdF:HFP] (mass ratio)=8:2, mass average molecular weight: 300 000, Sigma-Aldrich Co., LLC)

Regarding each of the prepared binders, the adsorption rate with respect to the inorganic solid electrolyte synthesized in Synthesis Example 11 below, and the adsorption rate with respect to the active material (the active material used in the preparation of the composition) shown in Table 3 (Tables 3-1 to 3-3 below are collectively referred to as Table 3), the solubility in the non-polar solvent (DIBK), and furthermore, the peel strength with respect to the copper foil were measured by the following methods. The results are shown in Table 3.

Synthesis Example 11: Synthesis of Sulfide-Based Inorganic Solid Electrolyte

A sulfide-based inorganic solid electrolyte was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box under an argon atmosphere (dew point: −70° C.), lithium sulfide ($Li_2S$, manufactured by Sigma-Aldrich Co., LLC Co., LLC, purity: >99.98%) (2.42 g) and diphosphorus pentasulfide ($P_2S_5$, manufactured by Sigma-Aldrich Co., LLC Co., LLC, purity: >99%) (3.90 g) each were weighed, put into an agate mortar, and mixed using an agate muddler for five minutes. The mixing ratio between $Li_2S$ and $P_2S_5$ ($Li_2S:P_2S_5$) was set to 75:25 in terms of molar ratio.

66 g of zirconia beads having a diameter of 5 mm were put into a 45 mL zirconia container (manufactured by FRITSCH), the entire amount of the mixture of the above lithium sulfide and the diphosphorus pentasulfide was put thereinto, and the container was completely sealed in an argon atmosphere. The container was set in a planetary ball mill P-7 (trade name, manufactured by FRITSCH), mechanical milling was carried out at a temperature of 25° C. and a rotation speed of 510 rpm for 20 hours, thereby obtaining yellow powder (6.20 g) of a sulfide-based inorganic solid electrolyte (Li—P—S-based glass, hereinafter, may be referred to as LPS). The particle diameter of the Li—P—S-based glass was 2.5 µm.

[Measurement of Adsorption Rate $A_{SE}$ of Binder to Inorganic Solid Electrolyte]

0.5 g of the inorganic solid electrolyte (LPS) and 0.26 g of the binder used in the preparation of each of the inorganic solid electrolyte-containing compositions shown in Table 3 were placed in a 15 mL vial, 25 g of DIBK was added thereto while stirring with a mix rotor, and further, the mixture was stirred at 80 rpm for 30 minutes at room temperature. The stirred dispersion liquid was filtered through a filter having a pore diameter of 1 µm, 2 g of the filtrate was dried, and the mass BX of the dried binder (the mass of the binder which had not adsorbed to the inorganic solid electrolyte) was measured.

From the mass BX of the binder obtained as described above and the mass of 0.26 g of the binder used, the adsorption rate of the binder with respect to the inorganic solid electrolyte was calculated according to the following expression.

The adsorption rate $A_{SE}$ of the binder is the average value of the adsorption rates obtained by carrying out the above measurement twice.

$$\text{Adsorption rate (\%)}=[(0.26-BX\times 25/2)/0.26]\times 100$$

As a result of measuring the adsorption rate $A_{SE}$ using the inorganic solid electrolyte and the binder extracted from the inorganic solid electrolyte layer which had been subjected to the film formation, the same value was obtained.

[Difference in Adsorption Rate Between Adsorption Rate $A_{SE}$ of Binder a and Adsorption Rate $A_{SE}$ of Binder B]

Regarding the binder A and the binder B shown in Table 3 that are used in combination with each inorganic solid electrolyte-containing composition, the difference in adsorption rate between the adsorption rates $A_{SE}$ of both binders measured as described above (the adsorption rate $A_{SE}$ of the binder A—the adsorption rate $A_{SE}$ of the binder B) was calculated. The results are shown in Table 3.

[Measurement of adsorption rate $A_{AM}$ of binder with respect to active material] 1.6 g of the active material used in the preparation of each of the inorganic solid electrolyte-containing compositions (the composition for an electrode layer) shown in Table 3 and 0.08 g of the binder used were placed in a 15 mL vial, 8 g of DIBK was added thereto while stirring with a mix rotor, and further, the mixture was stirred at 80 rpm for 30 minutes at room temperature. The stirred dispersion liquid was filtered through a filter having a pore diameter of 1 µm, 2 g of the filtrate was dried, and the mass of the dried binder (the mass of the binder which had not adsorbed to the active material), the mass BY, was measured.

From the mass BY of the binder obtained as described above and the mass of 0.08 g of the binder used, the adsorption rate of the binder with respect to the active material was calculated according to the following expression.

The adsorption rate $A_{AM}$ of the binder is the average value of the adsorption rates obtained by carrying out the above measurement twice.

$$\text{Adsorption rate (\%)}=[(0.08-BY\times 8/2)/0.08]\times 100$$

As a result of measuring the adsorption rate $A_{AM}$ using the active material and the binder extracted from the active material layer which had been subjected to the film formation, the same value was obtained.

[Measurement of Solubility in Non-Polar Solvent]

A specified amount of each binder was weighed in a glass bottle, 100 g of DIBK was added thereto, and the mixture was stirred on a mix rotor at a rotation speed of 80 rpm for 24 hours at a temperature of 25° C. After stirring for 24 hours, the obtained mixed solution was subjected to the transmittance measurement under the following conditions.

This test (the transmittance measurement) is carried out by changing the amount of the binder dissolved, and the upper limit concentration X (% by mass) at which the transmittance is 99.8% is defined as the solubility of the binder in the non-polar solvent.

<Transmittance Measurement Conditions>

Dynamic light scattering (DLS) measurement

Device: DLS measuring device DLS-8000 manufactured by Otsuka Electronics Co., Ltd.

Laser wavelength, output: 488 nm/100 mW

Sample cell: NMR tube

[Measurement of Peel Strength (90° Peeling Test) with Respect to Collector (Copper Foil)]

A solution (solid content concentration: 10% by mass), in which each binder had been dissolved in an organic solvent (DIBK), was added dropwise onto a copper foil (trade name: C1100, manufactured by Hohsen Corp.) and then dried (temperature: 100° C., time: 180 minutes) to produce a dried film (width: 10 mm, length: 50 mm) having a thickness of 50 μm.

An average peeling force measured by using a tensile tester (ZTS-50N, manufactured by IMADA Co., Ltd.) when the obtained dried film was peeled off at a speed of 30 mm/s and at an angle of 90° with respect to the coated surface of the copper foil was adopted as the peel strength (unit: N/mm).

Example 1

In Example 1, an inorganic solid electrolyte-containing composition, a composition for a negative electrode layer, and a composition for a positive electrode layer were prepared using the formed or prepared binder, and the initial dispersibility and dispersion stability thereof were evaluated.

<Preparation of Composition (Slurry) No. 5 for Negative Electrode>

180 g of zirconia beads having a diameter of 5 mm were put into a 45 mL zirconia container (manufactured by FRITSCH), and then 2.80 g of LPS synthesized in Synthesis Example 11 and 12.3 g of xylene as an organic solvent were put into the container. The container was set in a planetary ball mill P-7 manufactured by FRITSCH, and mixing was carried out at a temperature of 25° C. and a rotation speed of 300 rpm for 2 hours. Then, 7.00 g of Si (trade name, Silicon Powder 1 to 5 μm, manufactured by Thermo Fisher Scientific, Inc.) as an active material, 0.500 g of acetylene black (trade name, AB powder, manufactured by Denka Company Limited) as a conductive auxiliary agent, 0.105 g (in terms of solid contents) of the binder dispersion liquid consisting of the acrylic polymer A1 prepared in Synthesis Example 1, as the binder A, and 0.052 g (in terms of solid contents) of the binder dispersion liquid consisting of the acrylic polymer B prepared in Synthesis Example 3, as the binder B, were put into a container, and similarly, the container was set in a planetary ball mill P-7, and mixing was carried out at a temperature of 25° C. and a rotation speed of 200 rpm for 15 minutes to obtain a composition No. 5 for a negative electrode.

<Preparation of Compositions (Slurry) Nos. 1 to 4 and 6 to 27 for Negative Electrode>

Each of negative electrode compositions Nos. 1 to 4 and 6 to 27 for a negative electrode was prepared in the same manner as the composition No. 5 for a negative electrode except that in the preparation of the composition No. 5 for a negative electrode, the binder dispersion liquid or the binder solution consisting of the polymer shown in Table 3 was used as the binder A and the binder B and further, the active material and the organic solvent were appropriately changed to those shown in Table 3.

However, the compositions No. 22, 23, and 25 for a negative electrode, in which two kinds of organic solvents are used, the using ratio (mass ratio) between the organic solvents is indicated by using "I" in parentheses in the column of "KInd" in Table 3.

<Preparation of Compositions No. 28 and 30 for Positive Electrode>

160 g of zirconia beads having a diameter of 5 mm were put into a 45 mL zirconia container (manufactured by FRITSCH), and then 2.00 g of LPS synthesized in Synthesis Example 11 and 12.3 g of diisobutyl ketone (DIBK) as an organic solvent were put into the container. The container was set in a planetary ball mill P-7 manufactured by FRITSCH, and mixing was carried out at a temperature of 25° C. and a rotation speed of 300 rpm for 2 hours. Then, 7.10 g of NMC (LiNi$_{1/3}$Co$_{1/3}$Mn$_{1/3}$O$_2$, a composition No. 28 for a positive electrode) or NCA (LiNi$_{0.85}$Co$_{0.10}$Al$_{0.05}$O$_2$, a composition No. 30 for a positive electrode) as an active material, 0.240 g of acetylene black, 0.095 g (in terms of solid contents) of the binder dispersion liquid consisting of the urethane 3 prepared in Synthesis Example 7, as the binder A, and 0.047 g of PVdF-HFP (a copolymer of vinylidene fluoride and hexafluoropropylene, PVdF: HFP=8:2 (mass ratio) (manufactured by Arkema S.A.)) as the binder B were put into a container, and similarly, the container was set in a planetary ball mill P-7, and mixing was carried out at a temperature of 25° C. and a rotation speed of 200 rpm for 15 minutes. In this manner, each of the compositions (slurries) Nos. 28 and 30 for a positive electrode layer was prepared.

<Preparation of Compositions Nos. 29 and 31 for Positive Electrode>

Each of compositions Nos. 29 and 31 for a positive electrode was prepared in the same manner as in the preparation of the compositions No. 28 and 30 for a positive electrode except that in the preparation of the compositions Nos. 28 and 30, the binder B was not used and the using amount of LPS was changed to 2.047 g (0.5% increase with respect to the entire solid amount).

<Preparation of Inorganic Solid Electrolyte-Containing Composition No. 32>

180 g of zirconia beads having a diameter of 5 mm were put into a 45 mL zirconia container (manufactured by FRITSCH), and then 2.00 g of LPS synthesized in Synthesis Example 11 and 12.3 g of diisobutyl ketone (DIBK) as an organic solvent were put into the container. Then, 0.020 g (in terms of solid contents) of the binder dispersion liquid consisting of the urethane 3 prepared in Synthesis Example 7, as the binder A, and 0.010 g of PVdF-HFP (a copolymer of vinylidene fluoride and hexafluoropropylene, PVdF: HFP=8:2 (mass ratio) (manufactured by Arkema S.A.)) as the binder B were put into a container and set in a planetary ball mill P-7 manufactured by FRITSCH. Mixing was carried out at a temperature of 25° C. and a rotation speed of 200 rpm for 15 minutes to prepare an inorganic solid electrolyte-containing composition No. 32.

(Preparation of Inorganic Solid Electrolyte-Containing Composition No. 33)

An inorganic solid electrolyte-containing composition No. 33 was prepared in the same manner as in the preparation of the inorganic solid electrolyte-containing composition No. 32 except that in the preparation of No. 32, the binder B was not used and the using amount of LPS was changed to 2.01 g (0.5% increase with respect to the entire solid amount).

[Calculation of Viscosity Difference ηα−ηβ]

Regarding each of the prepared compositions (slurries), the slurry viscosities ηα and ηβ were measured according to the following method to calculate the viscosity difference ηα−ηβ. The results thereof (unit is mPa·s) are shown in Table 3.

Specifically, an E-type viscometer (TV-35, manufactured by Toki Sangyo Co., Ltd.), a standard cone rotor (1"34'× R24), and 1.1 mL of a sample (a slurry) were applied, and the viscosity was measured in a rotation speed range of 1 to 100 rpm. At a temperature of 22° C., the viscosity measured at a shear rate of 10/s (rotation speed: 2.5 rpm) was defined as the slurry viscosity ηα, and similarly, the viscosity measured at a shear rate of 200/s (rotation speed: 50 rpm) was defined as the slurry viscosity ηβ.

The viscosity difference ηα−ηβ between the slurry viscosity ηα and the slurry viscosity IV obtained as described above was calculated.

TABLE 3-1

| | | | Inorganic | | Binder A | | | | |
|---|---|---|---|---|---|---|---|---|---|
| No. | Morphology | Active material | solid electrolyte | Polymer | Morphology | Adsorption rate $A_{SE}$ | Adsorption rate $A_{AM}$ | Solubility | Peel strength (N/nm) | Content |
| 1 | Negative electrode | Si | LPS | — | — | — | — | — | — | — |
| 2 | Negative electrode | Si | LPS | Acryl A1/ Urethane 1 | Particulate/ Particulate | 16%/ 16% | 31%/ 55% | 0.01%/ 0.01% | 0.2/ 0.2 | 1% |
| 3 | Negative electrode | Si | LPS | Acryl A2 | Particulate | 13% | 20% | 0.01% | 0.2 | 1% |
| 4 | Negative electrode | Si | LPS | Acryl A1 | Particulate | 16% | 31% | 0.01% | 0.2 | 1% |
| 5 | Negative electrode | Si | LPS | Acryl A1 | Particulate | 16% | 31% | 0.01% | 0.2 | 1% |
| 6 | Negative electrode | Si | LPS | Urethane 1 | Particulate | 16% | 55% | 0.01% | 0.2 | 1% |
| 7 | Negative electrode | Si | LPS | Urethane 1 | Particulate | 16% | 55% | 0.01% | 0.2 | 1% |
| 8 | Negative electrode | Si | LPS | Urethane 2 | Particulate | 28% | 58% | 0.01% | 0.2 | 1% |
| 9 | Negative electrode | Si | LPS | Urethane 2 | Particulate | 28% | 58% | 0.01% | 0.2 | 1% |
| 10 | Negative electrode | Si | LPS | Urethane 2 | Particulate | 28% | 58% | 0.01% | 0.2 | 1% |
| 11 | Negative electrode | Si | LPS | Urethane 3 | Particulate | 57% | 80% | 0.01% | 0.2 | 1% |
| 12 | Negative electrode | Si | LPS | Urethane 3 | Particulate | 57% | 80% | 0.01% | 0.2 | 1% |
| 13 | Negative electrode | Si | LPS | Urethane 4 | Dissolved | 54% | 76% | 30%/ | 0.2/ | 1% |
| 14 | Negative electrode | Si | LPS | Urethane 4 | Dissolved | 54% | 76% | 30% | 0.2 | 1% |
| 15 | Negative electrode | Si | LPS | Urethane 3 | Particulate | 57% | 80% | 0.01% | 0.2 | 1% |
| 16 | Negative electrode | Si | LPS | Urethane 3 | Particulate | 57% | 80% | 0.01% | 0.2 | 1% |
| 17 | Negative electrode | Si | LPS | Vinyl | Particulate | 57% | 80% | 0.01% | 0.2 | 1% |
| 18 | Negative electrode | Si | LPS | Urethane 3 | Particulate | 57% | 80% | 0.01% | 0.2 | 1% |
| 19 | Negative electrode | Si | LPS | Urethane 3 | Particulate | 57% | 80% | 0.01% | 0.2 | 1% |
| 20 | Negative electrode | Si | LPS | Urethane 3 | Particulate | 57% | 80% | 0.01% | 0.2 | 1% |
| 21 | Negative electrode | Si | LPS | Urethane 3 | Particulate | 57% | 80% | 0.01% | 0.2 | 1% |
| 22 | Negative electrode | Si | LPS | Urethane 3 | Particulate | 57% | 80% | 0.01% | 0.2 | 1% |
| 23 | Negative electrode | Si | LPS | Urethane 6 | Particulate | 57% | 80% | 2% | 0.2 | 1% |
| 24 | Negative electrode | Si | LPS | Urethane 3 | Particulate | 57% | 80% | 0.01% | 0.2 | 1% |
| 25 | Negative electrode | Si | LPS | Urethane 3 | Particulate | 57% | 80% | 0.01% | 0.2 | 1% |
| 26 | Negative electrode | Sn | LPS | Urethane 3 | Particulate | 57% | 80% | 0.01% | 0.2 | 1% |
| 27 | Negative electrode | Sn | LPS | Urethane 3 | Particulate | 57% | 80% | 0.01% | 0.2 | 1% |
| 28 | Positive electrode | NMC | LPS | Urethane 3 | Particulate | 57% | 80% | 0.01% | 0.2 | 1% |
| 29 | Positive electrode | NMC | LPS | Urethane 3 | Particulate | 57% | 80% | 0.01% | 0.2 | 1% |
| 30 | Positive electrode | NCA | LPS | Urethane 3 | Particulate | 57% | 80% | 0.01% | 0.2 | 1% |
| 31 | Positive electrode | NCA | LPS | Urethane 3 | Particulate | 57% | 80% | 0.01% | 0.2 | 1% |
| 32 | SE | — | LPS | Urethane 3 | Particulate | 57% | — | 0.01% | 0.2 | 1% |
| 33 | SE | — | LPS | Urethane 3 | Particulate | 57% | — | 0.01% | 0.2 | 1% |

TABLE 3-2

| | Binder B | | | | | | |
|---|---|---|---|---|---|---|---|
| No. | Polymer | Morphology | Adsorption rate $A_{SE}$ | Adsorption rate $A_{AM}$ | Solubility | Peel strength (N/nm) | Content |
| 1 | SBR/ PVdF | Dissolved/Particulate | 0%/0% | Polymer | 5.0%/ 0.01% | 0.5/0.5 | 0.5%/ 1% |
| 2 | — | — | — | — | — | — | — |
| 3 | SBR | Dissolved | 0% | 2% | 5.0% | 0.5 | 0.5% |
| 4 | SBR | Dissolved | 0% | 2% | 5.0% | 0.5 | 0.5% |
| 5 | Acityl B | Particulate | 4% | 10% | 0.02% | 0.5 | 0.5% |
| 6 | Acityl B | Particulate | 4% | 10% | 0.02% | 0.5 | 0.5% |
| 7 | SBR | Dissolved | 0% | 2% | 5.0% | 0.5 | 0.5% |
| 8 | SBR | Dissolved | 0% | 2% | 5.0% | 0.5 | 0.5% |

TABLE 3-2-continued

| | | Binder B | | | | |
|---|---|---|---|---|---|---|
| No. | Polymer | Morphology | Adsorption rate $A_{SE}$ | Adsorption rate $A_{AM}$ | Solubility | Peel strength (N/nm) | Content |
| 9 | — | — | — | — | — | — | — |
| 10 | SEBS | Dissolved | 11% | 5% | 5.0% | 0.5 | 0.5% |
| 11 | SEBS | Dissolved | 9% | 5% | 5.0% | 0.5 | 0.5% |
| 12 | SBR | Dissolved | 0% | 2% | 5.0% | 0.5 | 0.5% |
| 13 | SBR | Dissolved | 0% | 2% | 5.0% | 0.5 | 0.5% |
| 14 | Urethane 5 | Particulate | 3% | 5% | 0.01% | 0.5 | 0.5% |
| 15 | PVdF-HFP(8:2) | Dissolved | 0% | 7% | 5.0% | 0.5 | 0.5% |
| 16 | PVdF-HFP(6:4) | Dissolved | 2% | 8% | 5.0% | 0.5 | 0.5% |
| 17 | PVdF-HFP(8:2) | Dissolved | 0% | 7% | 5.0% | 0.5 | 0.5% |
| 18 | PVdF-HFP(8:2) | Dissolved | 0% | 7% | 5.0% | 0.5 | 0.5% |
| 19 | PVdF-HFP(8:2) | Dissolved | 0% | 7% | 5.0% | 0.5 | 0.5% |
| 20 | PVdF-HFP(8:2) | Dissolved | 0% | 7% | 5.0% | 0.5 | 0.5% |
| 21 | PVdF-HFP(8:2) | Dissolved | 0% | 7% | 5.0% | 0.5 | 0.5% |
| 22 | PVdF-HFP(8:2) | Dissolved | 0% | 7% | 5.0% | 0.5 | 0.5% |
| 23 | PVdF-HFP(8:2) | Dissolved | 0% | 7% | 5.0% | 0.5 | 0.5% |
| 24 | PVdF-HFP(8:2) | Dissolved | 0% | 7% | 5.0% | 0.5 | 0.5% |
| 25 | PVdF-HFP(8:2) | Dissolved | 0% | 7% | 5.0% | 0.5 | 0.5% |
| 26 | PVdF-HFP(8:2) | Dissolved | 0% | 7% | 5.0% | 0.5 | 0.5% |
| 27 | — | — | — | — | — | — | — |
| 28 | PVdF-HFP(8:2) | Dissolved | 0% | 7% | 5.0% | 0.5 | 0.5% |
| 29 | — | — | — | — | — | — | — |
| 30 | PVdF-HFP(8:2) | Dissolved | 0% | 7% | 5.0% | 0.5 | 0.5% |
| 31 | — | — | — | — | — | — | — |
| 32 | PVdF-HFP(8:2) | Dissolved | 0% | — | 5.0% | 0.5 | 0.5% |
| 33 | — | — | — | — | — | — | — |

TABLE 3-3

| | Organic solvent | | Difference | Slurry | Slurry | Viscosity |
|---|---|---|---|---|---|---|
| No. | Kind | ClogP value | in adsorption rate | viscosity $\eta\alpha$ | viscosity $\eta\beta$ | difference $\eta\alpha$-$\eta\beta$ |
| 1 | Xylene | 3.12 | — | 580 | 280 | 300 |
| 2 | Xylene | 3.12 | — | 620 | 200 | 420 |
| 3 | Xylene | 3.12 | 13% | 620 | 300 | 320 |
| 4 | Xylene | 3.12 | 16% | 720 | 300 | 420 |
| 5 | Xylene | 3.12 | 12% | 730 | 300 | 430 |
| 6 | Xylene | 3.12 | 12% | 720 | 300 | 420 |
| 7 | Xylene | 3.12 | 16% | 720 | 300 | 420 |
| 8 | Xylene | 3.12 | 28% | 720 | 300 | 420 |
| 9 | Xylene | 3.12 | 28% | 680 | 300 | 380 |
| 10 | Xylene | 3.12 | 17% | 800 | 300 | 500 |
| 11 | Xylene | 3.12 | 48% | 800 | 300 | 500 |
| 12 | Xylene | 3.12 | 57% | 770 | 300 | 470 |
| 13 | Xylene | 3.12 | 54% | 770 | 300 | 470 |
| 14 | Xylene | 3.12 | 51% | 900 | 300 | 600 |
| 15 | Xylene | 3.12 | 57% | 1090 | 300 | 790 |
| 16 | Xylene | 3.12 | 55% | 1130 | 300 | 830 |
| 17 | Xylene | 3.12 | 57% | 1090 | 300 | 790 |
| 18 | DIBK | 3.0 | 57% | 1090 | 300 | 790 |
| 19 | MIBK | 1.31 | 57% | 1090 | 300 | 790 |
| 20 | DBE | 2.57 | 57% | 1090 | 300 | 790 |
| 21 | ECH | 3.4 | 57% | 1090 | 300 | 790 |
| 22 | ECH/DBE (30/70) | 2.8 (3.4/2.57) | 57% | 1130 | 300 | 830 |
| 23 | ECH/DBE (30/70) | 2.8 (3.4/2.57) | 57% | 1090 | 300 | 790 |
| 24 | Hep | 4.4 | 57% | 1090 | 300 | 790 |
| 25 | Hep/DIBK (30/70) | 3.6 (4.4/3.0) | 57% | 1090 | 300 | 790 |
| 26 | DIBK | 3.0 | 57% | 940 | 300 | 640 |
| 27 | DIBK | 3.0 | 57% | 670 | 300 | 370 |
| 28 | DIBK | 3.0 | 57% | 790 | 300 | 490 |
| 29 | DIBK | 3.0 | 57% | 650 | 300 | 350 |
| 30 | DIBK | 3.0 | 57% | 800 | 300 | 500 |
| 31 | DIBK | 3.0 | 57% | 630 | 300 | 330 |
| 32 | DIBK | 3.0 | 57% | 790 | 300 | 490 |
| 33 | DIBK | 3.0 | 57% | 620 | 300 | 320 |

<Abbreviations in Table>

In the table, "-" indicates that the corresponding component is not contained.

The unit of the "content" and the "solubility" is "% by mass".

The "difference in adsorption rate" indicates the difference between the adsorption rate $A_{SE}$ of the binder A and the adsorption rate $A_{SE}$ of the binder B with respect to the inorganic solid electrolyte.

In the column of "Morphology", "Negative electrode" represents a composition for a negative electrode, "Positive electrode" represents a composition for a positive electrode, and "SE" represents an inorganic solid electrolyte-containing composition.

Si: Silicon Powder (trade name, particle diameter: 1 to 5 μm, manufactured by Thermo Fisher Scientific, Inc.)

Sn: Tin powder (particle diameter: 3.5 μm, manufactured by Thermo Fisher Scientific, Inc.)

NMC: LiNi1/3Co1/3Mn1/3O2 (lithium nickel manganese cobalt oxide)

NCA: $LiNi_{0.85}Co_{0.10}Al_{0.05}O_2$ (lithium nickel cobalt aluminum oxide)

LPS: Li—P—S-based glass synthesized in Synthesis Example 11

Acryl A1: Acrylic polymer A1 synthesized in Synthesis Example 1

Acryl A2: Acrylic polymer A2 synthesized in Synthesis Example 2

Acryl B: Acrylic polymer B synthesized in Synthesis Example 3

Vinyl: vinyl polymer synthesized in Synthesis Example 4

Urethanes 1 to 6: Polyurethanes 1 to 6 synthesized in Synthesis Examples 5 to 10

SBR: Styrene butadiene rubber

PVdF: Polyvinylidene difluoride

SEBS: Styrene-ethylene-butylene-styrene block copolymer

PVDF-HFP (6-4): Copolymer of polyvinylidene difluoride and hexafluoropropylene (copolymerization ratio [PVdF:HFP] (mass ratio)=6:4)

PVDF-HFP (8-2): Copolymer of polyvinylidene difluoride and hexafluoropropylene (copolymerization ratio [PVdF:HFP] (mass ratio)=8:2)

In the column of "Morphology" of the binder A and the binder B, the state of the binder in the inorganic solid electrolyte-containing composition is indicated. Specifically, a where a binder (a particulate binder) is dispersed in a solid state in an organic solvent is written as "Particulate", and a case where a binder (a soluble type binder) is dissolved in an organic solvent is written as "Dissolved".

In addition, in a case where two kinds of binders are contained as the binder A or B, respective states thereof are written together using "/".

DIBK: Diisobutyl ketone
MIBK: Methyl isobutyl ketone
DBE: Dibutyl ether
ECH: Ethyl cyclohexane
Hep: Heptane In the column of "Organic solvent", in a case where two kinds of organic solvents are contained, the respective abbreviations of organic solvents are written together using "I". Regarding the C log P value, a value as two kinds of organic solvents as a whole, and values of the respective organic solvents are written together using "I".

[Evaluation of Initial Dispersibility of Composition]

The initial dispersibility of each of the prepared compositions was evaluated.

Each composition was placed in a sedimentation tube having an inner diameter of 5 mm and allowed to stand at 25° C. for 24 hours, and then the distance X of the interface between the clear fraction (the supernatant) separated from the composition and the composition (which is in a state in which the dispersed state is maintained after the clear fraction separation) was measured. Specifically, in a case where the distance from the bottom surface of the sedimentation tube to the surface of the clear fraction layer (the surface of the placed composition) was set to 100, the distance X from the bottom surface to the interface was calculated in terms of percentage, and the evaluation was carried out by determining which of the following evaluation standards included the calculated value. The results are shown in Table 4. In this test, it is determined that the initial dispersibility has passed the evaluation in a case of having a rank "E" or higher.

—Evaluation Rank—
AA: 98% or more and 100% or less
A: 95% or more and less than 98%
B: 90% or more and less than 95%
C: 85% or more and less than 90%
D: 80% or more and less than 85%
E: 75% or more and less than 80%
F: 70% or more and less than 75%
G: Less than 70%

[Evaluation of Dispersion Stability of Composition]

The dispersion stability of each of the prepared compositions were evaluated.

Each composition was placed in a sedimentation tube having an inner diameter of 5 mm and allowed to stand at 25° C. for 72 hours, the distance X of the interface between the clear fraction (the supernatant) separated from the composition and the composition (which is in a state in which the dispersed state is maintained after the clear fraction separation) was measured, and the dispersion stability was evaluated according to the same evaluation standards as the initial dispersibility. The results are shown in Table 4. In this test, it is determined that the dispersion stability has passed the evaluation in a case of having a rank "E" or higher.

Example 2

In Example 2, each of the compositions produced in Example 1 was used to produce a solid electrolyte sheet for an all-solid state secondary battery and an electrode sheet for an all-solid state secondary battery, whereby an all-solid state secondary battery was manufactured.

1. Manufacture 1 of all-Solid State Secondary Battery

Each of the above compositions (slurries) was used immediately after the preparation to produce a solid electrolyte sheet for an all-solid state secondary battery and an electrode sheet for an all-solid state secondary battery, which were subsequently used to manufacture each all-solid state secondary battery, which had a coating layer as the solid electrolyte layer and the active material layer immediately after the composition was produced, was produced as described later.

<Production of Negative Electrode Sheets Nos. 1 to 27 for all-Solid State Secondary Battery>

Each of the compositions Nos. 1 to 27 for a negative electrode layer immediately after preparation, obtained as described above, was applied onto a copper foil having a thickness of 20 μm with the above-described baker type applicator (trade name: SA-201 baker type applicator, manufactured by Tester Sangyo Co., Ltd.), and heating was carried out at 100° C. for 1 hour to dry the composition for a negative electrode layer, whereby each of negative electrode sheets Nos. 1 to 27 for an all-solid state secondary battery having a laminated structure of a negative electrode active material layer/copper foil was produced. The thickness of the negative electrode active material layer was 100 μm.

<Production of Positive Electrode Sheets Nos. 28 to 31 for all-Solid State Secondary Battery>

Each of the compositions Nos. 28 to 31 for a positive electrode layer immediately after preparation was applied onto an aluminum form having a thickness of 20 μm with an applicator (trade name: SA-201 baker type applicator, manufactured by Tester Sangyo Co., Ltd.), and heating and drying was carried out at 100° C. for 1 hour to form a positive electrode active material layer, whereby each of positive electrode sheets Nos. 28 to 31 for an all-solid state secondary battery was produced. The thickness of the positive electrode active material layer was 100 μm.

<Production of Solid Electrolyte Sheets No. 32 and 33 for all-Solid State Secondary Battery>

Each of the inorganic solid electrolyte-containing compositions Nos. 32 and 33 immediately after preparation was applied onto an aluminum form having a thickness of 20 μm with an applicator (trade name: SA-201 baker type applicator, manufactured by Tester Sangyo Co., Ltd.), and heating and drying was carried out at 100° C. for 1 hour to form a solid electrolyte layer, whereby each of solid electrolyte sheets Nos. 32 and 33 for an all-solid state secondary battery was produced. The thickness of the solid electrolyte layer was 30 μm.

<Manufacture of Batteries for Evaluation of Negative Electrode Sheets (Nos. 1 to 27) for an all-Solid State Secondary Battery>

Each of the produced negative electrode sheets for an all-solid state secondary battery was punched into a disk shape having a diameter of 10 mm and placed in a cylinder made of polyethylene terephthalate (PET) and having an inner diameter of 10 mm. 30 mg of the LPS synthesized in Synthesis Example 11 was placed on the negative electrode active material layer side in the cylinder, and a stainless steel (SUS) rod having a diameter of 10 mm was inserted from the openings at both ends of the cylinder. The collector side of the negative electrode sheet for an all-solid state secondary battery and the LPS were pressurized by applying a pressure of 350 MPa with a SUS rod. "The SUS rod on the LPS side was once removed, and a disk-shaped indium (In) sheet having a diameter of 9 mm (thickness: 20 μm) and a disk-shaped lithium (Li) sheet having a diameter of 9 mm (thickness: 20 μm) were inserted in this order onto the LPS in the cylinder. The removed SUS rod was inserted again into the cylinder and the sheets were fixed while applying a pressure of 50 MPa. In this way, an all-solid state secondary battery (a half cell) having a structure of a copper foil (thickness: 20 μm)—a negative electrode active material layer (thickness: 80 μm)—a solid electrolyte layer (thickness: 200 μm)—a counter electrode layer (an In/Li sheet, thickness: 30 μm) was obtained.

<Manufacture of Batteries for Evaluation of Positive Electrode Sheets (Nos. 28 to 31) for an all-Solid State Secondary Battery>

Each of the produced positive electrode sheets for an all-solid state secondary battery was punched out into a disk shape having a diameter of 10 mm and was placed in a cylinder made of PET having an inner diameter of 10 mm. 30 mg of the LPS synthesized in Synthesis Example 11 was placed on the positive electrode active material layer side in the cylinder, and a SUS rod having a diameter of 10 mm was inserted from the openings at both ends of the cylinder. The collector side of the positive electrode sheet for an all-solid state secondary battery and the LPS were pressurized by applying a pressure of 350 MPa with a SUS rod. The SUS rod on the LPS side was once removed, and a disk-shaped In sheet having a diameter of 9 mm (thickness: 20 μm) and a disk-shaped Li sheet having a diameter of 9 mm (thickness: 20 μm) were inserted in this order onto the LPS in the cylinder. The removed SUS rod was inserted again into the cylinder and the sheets were fixed while applying a pressure of 50 MPa. In this way, an all-solid state secondary battery (a half cell) having a structure of an aluminum foil (thickness: 20 μm)—a positive electrode active material layer (thickness: 80 μm)—an inorganic solid electrolyte layer (thickness: 200 μm)—a counter electrode layer (an In/Li sheet, thickness: 30 μm) was obtained.

(Manufacture of Batteries for Evaluation of Solid Electrolyte Sheets (Nos. 32 and 33) for all-Solid State Secondary Battery)

The positive electrode sheet (No. 28) for an all-solid state secondary battery was punched out into a disk shape having a diameter of 10 mm and was placed in a cylinder made of PET having an inner diameter of 10 mm. Each solid electrolyte sheet for an all-solid state secondary battery produced on the positive electrode active material layer side in the cylinder was punched into a disk shape having a diameter of 10 mm and placed in the cylinder, and a 10 mm SUS rod was inserted from the openings at both ends of the cylinder. The collector side of the positive electrode sheet for an all-solid state secondary battery and the aluminum foil side of the solid electrolyte sheet for an all-solid state secondary battery were pressurized by applying a pressure of 350 MPa with a SUS rod. The SUS rod on the side of the solid electrolyte sheet for an all-solid state secondary battery was once removed to gently peel off the aluminum foil of the solid electrolyte sheet for an all-solid state secondary battery, and then the negative electrode sheet (No. 22) for an all-solid state secondary battery was punched into a disk shape having a diameter of 10 mm and inserted onto the solid electrolyte layer of the solid electrolyte sheet for an all-solid state secondary battery in the cylinder. The removed SUS rod was inserted again into the cylinder and the sheets were fixed while applying a pressure of 50 MPa. In this way, an all-solid state secondary battery (a full cell) having a structure of an aluminum foil (thickness: 20 μm)—a positive electrode active material layer (thickness: 80 μm)—an inorganic solid electrolyte layer (thickness: 25 μm)—a negative electrode active material layer (thickness: 80 μm)—a copper foil (thickness: 20 μm) was obtained.

2. Manufacture 2 of all-Solid State Secondary Battery

Each composition (slurry) produced in Example 1 was allowed to stand in an environment of a temperature of 25° C. and a dew point of −50° C. for 72 hours and then used to produce a solid electrolyte sheet for an all-solid state secondary battery and an all-solid state secondary battery, which were subsequently used to manufacture each all-solid state secondary battery having a chronologically aged composition-derived coating layer as the solid electrolyte layer and the active material layer in the same manner as in the manufacture 1 of an all-solid state secondary battery.

[Binding Property Test (90° Peeling Test) of Solid Electrolyte Sheet for all-Solid State Secondary Battery and Electrode Sheet for all-Solid State Secondary Battery]

Regarding the solid electrolyte sheet for an all-solid state secondary battery and the electrode sheet for an all-solid state secondary battery produced by using each composition produced in Example 1 immediately after preparation, the binding property of the solid electrolyte layer or the active material layer was evaluated.

Specifically, an average peeling force measured by using a tensile tester (ZTS-50N, manufactured by IMADA Co., Ltd.) when a tape (width: 1 cm, length: 5 cm, trade name: polyimide tape, manufactured by Nitto Denko Corporation) was attached (bound by pressurization at a pressure of 0.1 MPa for 5 minutes) to the surface of the solid electrolyte layer or the active material layer of each sheet, and this tape was peeled off at a speed of 30 mm/s and at an angle of 90° with respect to the surface of the solid electrolyte layer or the active material layer was adopted as the peel strength (unit: N/mm).

The measured peel strength was applied to the following evaluation standards, and the binding property of the solid electrolyte layer or the active material layer was evaluated. In this test, in a case where the peel strength is 0.1 N/mm or more (the evaluation levels A and B), the binding property of the solid particle in the solid electrolyte layer or the active material layer, and furthermore, the binding property between the active material layer and the collector can be said to be excellent. In the present invention, it is more preferable that the peel strength is 0.15 N/mm or more (the evaluation level A).

—Evaluation Standards—

A: 0.15 N/mm or more
B: 0.1 N/mm or more and less than 0.15 N/mm
C: 0.05 N/mm or more and less than 0.1 N/mm
D: Less than 0.05 N/mm

[Evaluation of Battery Performance]

Using the all-solid state secondary battery produced above, charging and discharging of 4.3 V to 3.0 V was carried out once (initialized) under the conditions of a charging current value of 0.13 mA and a discharging current value of 0.13 mA in an environment of 30° C.

Then, as a cycle test, charging and discharging of 4.3 V to 3.0 V was repeated under the condition of a charge and discharge current value of 0.39 mA in an environment of 25° C. One time of charging and discharging is defined as one cycle.

The discharge capacity at the first cycle and the discharge capacity at the 20th cycle were measured, the discharge capacity retention rate was calculated according to the following expression, and this discharge capacity retention rate was applied to the following evaluation standards to evaluate the cycle characteristics of the all-solid state secondary battery.

In this test, it is determined that both the all-solid state secondary battery manufactured using the composition immediately after preparation and the all-solid state secondary battery manufactured using the composition after standing for 72 hours have passed the evaluation in a case of having an evaluation level "F" or higher.

Discharge capacity retention rate (%)=(discharge capacity at 20th cycle/discharge capacity at first cycle)×100

—Evaluation Standards—
AA: 80% or more and 100% or less
A: 70% or more and less than 80%
B: 60% or more and less than 70%
C: 50% or more and less than 60%
D: 40% or more and less than 50%
E: 30% or more and less than 40%
F: 20% or more and less than 30%
G: Less than 20%

The followings can be seen from the results of Table 4.

That is, the inorganic solid electrolyte-containing composition that does not contain the two kinds of binders specified in the present invention is inferior in dispersion stability and may not have sufficient initial dispersibility. For this reason, the battery performance of the all-solid state secondary battery (particularly, the battery characteristics after being left for 72 hours) and furthermore, the binding property are not satisfactory.

On the other hand, the inorganic solid electrolyte-containing composition containing the two kinds of binders specified in the present invention is excellent not only in initial dispersibility but also in dispersion stability. In addition, it can be seen that each of the sheets produced using these inorganic solid electrolyte-containing compositions has a strong binding between solid particles and furthermore, a strong binding property between the active material layer and the collector, and thus all-solid state secondary batteries having these sheets as the constitutional layer exhibit high battery performance (discharge capacity retention rate).

In particular, even in a case where a solid electrolyte layer or an active material, formed using the composition that has been left to stand for 72 hours after preparation, is included, the decrease in battery characteristics can be effectively suppressed with respect to the all-solid state secondary battery including the solid electrolyte layer or the active material, formed using the composition immediately after preparation, and thus the dispersion stability (the prevention of deterioration) of the composition is excellent, which matches with the results of the above dispersion stability test.

TABLE 4

| | Dispersibility | | | Cycle characteristics | | |
|---|---|---|---|---|---|---|
| No. | Initial stage (after 24 H) | Stability (after 72 H) | Binding property | Immediately after preparation | 72 hours after being allowed to stand | Note |
| 1 | D | F | D | F | G | Comparative Example |
| 2 | G | G | C | G | G | Comparative Example |
| 3 | E | G | D | E | G | Comparative Example |
| 4 | E | E | B | D | D | Present invention |
| 5 | E | E | B | D | F | Present invention |
| 6 | D | D | A | D | D | Present invention |
| 7 | E | E | B | C | E | Present invention |
| 8 | D | E | B | B | D | Present invention |
| 9 | G | G | B | G | G | Comparative Example |
| 10 | D | G | B | B | G | Comparative Example |
| 11 | B | D | A | B | D | Present invention |
| 12 | B | C | B | A | B | Present invention |
| 13 | C | D | B | D | E | Present invention |
| 14 | C | E | B | D | F | Present invention |
| 15 | A | A | A | A | A | Present invention |
| 16 | AA | A | A | A | A | Present invention |
| 17 | B | B | A | A | C | Present invention |
| 18 | A | A | A | AA | A | Present invention |
| 19 | C | D | B | C | F | Present invention |
| 20 | AA | A | A | AA | AA | Present invention |
| 21 | A | B | A | A | C | Present invention |
| 22 | AA | AA | A | AA | AA | Present invention |
| 23 | A | B | B | AA | A | Present invention |
| 24 | B | C | B | D | E | Present invention |
| 25 | A | B | A | A | E | Present invention |
| 26 | A | A | A | B | B | Present invention |
| 27 | F | G | B | D | G | Comparative Example |
| 28 | A | A | A | A | A | Present invention |
| 29 | D | F | C | F | G | Comparative Example |
| 30 | A | A | A | A | A | Present invention |
| 31 | D | G | D | E | G | Comparative Example |
| 32 | A | A | A | A | A | Present invention |
| 33 | C | F | C | B | G | Comparative Example |

EXPLANATION OF REFERENCES

1: negative electrode collector
2: negative electrode active material layer
3: solid electrolyte layer
4: positive electrode active material layer
5: positive electrode collector
6: operation portion
10: all-solid state secondary battery

What is claimed is:

1. An inorganic solid electrolyte-containing composition comprising:
   an inorganic solid electrolyte having an ion conductivity of a metal belonging to Group 1 or Group 2 in the periodic table;
   a binder; and
   an organic solvent,
   wherein the binder contains at least two kinds of binder A and binder B which differ in adsorption rate with respect to the inorganic solid electrolyte, and
   an adsorption rate of the binder A is 15% or more, and an adsorption rate of the binder B is less than 10%.

2. The inorganic solid electrolyte-containing composition according to claim 1,
   wherein the adsorption rate of the binder A is 50% or more, and the adsorption rate of the binder B is less than 5%.

3. The inorganic solid electrolyte-containing composition according to claim 1,
   wherein at least one of the binder A or the binder B is particulate.

4. The inorganic solid electrolyte-containing composition according to claim 1,
   wherein the binder A is particulate.

5. The inorganic solid electrolyte-containing composition according to claim 1,
   wherein a solubility of the binder A in a non-polar solvent is 1% by mass or less.

6. The inorganic solid electrolyte-containing composition according to claim 1,
   wherein a solubility of the binder B in a non-polar solvent is 2% by mass or more.

7. The inorganic solid electrolyte-containing composition according to claim 1,
   wherein a content of the binder A in the inorganic solid electrolyte-containing composition is higher than a content of the binder B in the inorganic solid electrolyte-containing composition.

8. The inorganic solid electrolyte-containing composition according to claim 1,
   wherein a polymer that forms the binder B is a fluorine-based polymer, a hydrocarbon-based polymer, polyurethane, or a (meth)acrylic polymer.

9. The inorganic solid electrolyte-containing composition according to claim 1,
   wherein a polymer that forms the binder A is polyurethane or a (meth)acrylic polymer.

10. The inorganic solid electrolyte-containing composition according to claim 1,
    wherein the organic solvent contains at least two kinds of organic solvents.

11. The inorganic solid electrolyte-containing composition according to claim 1,
    wherein the organic solvent contains at least one kind of organic solvent having a C log P value of 1.5 or more and less than 3.

12. The inorganic solid electrolyte-containing composition according to claim 1,
    wherein the organic solvent contains an organic solvent having a C log P value of 3 or more and less than 6, and an organic solvent having a C log P value of 1.5 or more and less than 3.

13. The inorganic solid electrolyte-containing composition according to claim 1, wherein at least one of organic solvents contains at least one selected from an ester compound, a ketone compound, or an ether compound.

14. The inorganic solid electrolyte-containing composition according to claim 1,
    wherein a viscosity difference $\eta\alpha - \eta\beta$ between a slurry viscosity $\eta\alpha$ at a shear rate of 10/s and a slurry viscosity $\eta\beta$ at a shear rate of 200/s is 400 mPa·s or more.

15. The inorganic solid electrolyte-containing composition according to claim 1, further comprising an active material.

16. The inorganic solid electrolyte-containing composition according to claim 15,
    wherein an adsorption rate of the binder A with respect to the active material is 10% or more.

17. The inorganic solid electrolyte-containing composition according to claim 15,
    wherein a peel strength of the binder B with respect to a collector is 0.1 N/mm or more.

18. A sheet for an all-solid state secondary battery, comprising a layer formed of the inorganic solid electrolyte-containing composition according to claim 1.

19. An electrode sheet for an all-solid state secondary battery, comprising an active material layer formed of the inorganic solid electrolyte-containing composition according to claim 15.

20. An all-solid state secondary battery comprising, in the following order:
    a positive electrode active material layer;
    a solid electrolyte layer; and
    a negative electrode active material layer,
    wherein at least one of the positive electrode active material layer, the solid electrolyte layer, or the negative electrode active material layer is a layer formed of the inorganic solid electrolyte-containing composition according to claim 1.

21. A manufacturing method for a sheet for an all-solid state secondary battery, the manufacturing method comprising subjecting the inorganic solid electrolyte-containing composition according to claim 1 to film formation.

22. A manufacturing method for an all-solid state secondary battery, comprising the manufacturing method for a sheet for an all-solid state secondary battery according to claim 21.

* * * * *